(12) United States Patent
Kobayashi et al.

(10) Patent No.: US 7,284,040 B2
(45) Date of Patent: Oct. 16, 2007

(54) INFORMATION PROCESSING APPARATUS FOR PROVIDING IMAGE TO COMMUNICATION TERMINAL AND CONTROL METHOD THEREFOR

(75) Inventors: Makoto Kobayashi, Tokyo (JP); Kenji Maeda, Kanagawa (JP); Kotaro Yamaguchi, Tokyo (JP); Jin Sunata, Kanagawa (JP); Yoko Murase, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 800 days.

(21) Appl. No.: 10/660,654

(22) Filed: Sep. 12, 2003

(65) Prior Publication Data
US 2004/0054963 A1    Mar. 18, 2004

(30) Foreign Application Priority Data
Sep. 13, 2002 (JP) .............................. 2002-268827
Sep. 13, 2002 (JP) .............................. 2002-269250

(51) Int. Cl.
*G06F 15/16* (2006.01)

(52) U.S. Cl. ...................... 709/219; 709/217; 709/203; 715/500

(58) Field of Classification Search ................ 709/203, 709/219, 217; 715/500; 358/2.1; 348/231.6
See application file for complete search history.

(56) References Cited

U.S. PATENT DOCUMENTS

| | | | |
|---|---|---|---|
| 6,453,361 B1 * | 9/2002 | Morris | 709/250 |
| 6,965,404 B2 * | 11/2005 | Hosoda et al. | 348/231.6 |
| 2003/0123079 A1 | 7/2003 | Yamaguchi et al. | 358/1.15 |
| 2003/0177444 A1 | 9/2003 | Sunata | 715/513 |
| 2003/0177445 A1 | 9/2003 | Sunata | 715/513 |
| 2003/0217118 A1 | 11/2003 | Kobayashi et al. | 709/218 |
| 2004/0003351 A1 * | 1/2004 | Sommerer et al. | 715/517 |
| 2004/0111493 A1 | 6/2004 | Yamaguchi et al. | 709/219 |

* cited by examiner

*Primary Examiner*—Frantz B. Jean
(74) *Attorney, Agent, or Firm*—Fitzpatrick, Cella, Harper & Scinto

(57) ABSTRACT

As an apparatus which provides a high-quality service that reduces the service usage load of users, there is disclosed an information processing apparatus accessed from a communication terminal to browse images, which includes an issuing unit that assigns a session identification to a communication terminal, a storage unit that stores the session identification and the communication terminal user's personal information, a receiving unit that receives a session identification and a printing request of images, a determination unit that determines if the session identification is stored in the storage unit, a transmission unit that transmits the personal information to the communication terminal if the determination unit determines that the session identification is stored with the personal information in the storage unit, and an obtaining unit that obtains the user's personal information if the determination unit determines that the session identification is not stored in the storage unit.

5 Claims, 78 Drawing Sheets

FIG. 4

CUSTOMER INFORMATION DATA TABLE 400

| ITEM | TYPE | |
|---|---|---|
| USER ID | INTEGER TYPE | 401 |
| NOTIFICATION E-MAIL ADDRESS | CHARACTER TYPE 64 BYTES | 402 |
| LOGIN NAME | CHARACTER TYPE 64 BYTES | 403 |
| PASSWORD | CHARACTER TYPE 64 BYTES | 404 |
| NAME (FAMILY NAME) | CHARACTER TYPE 64 BYTES | 405 |
| NAME (FIRST NAME) | CHARACTER TYPE 64 BYTES | 406 |
| PHONETIC TRANSCRIPTION (FAMILY NAME) | CHARACTER TYPE 64 BYTES | 407 |
| PHONETIC TRANSCRIPTION (FIRST NAME) | CHARACTER TYPE 64 BYTES | 408 |
| POSTAL CODE 1 | CHARACTER TYPE 8 BYTES | 409 |
| POSTAL CODE 2 | CHARACTER TYPE 8 BYTES | 410 |
| PREFECTURE CODE | INTEGER TYPE | 411 |
| ADDRESS 1 | CHARACTER TYPE 256 BYTES | 412 |
| ADDRESS 2 | CHARACTER TYPE 256 BYTES | 413 |
| TELEPHONE NUMBER 1 | CHARACTER TYPE 8 BYTES | 414 |
| TELEPHONE NUMBER 2 | CHARACTER TYPE 8 BYTES | 415 |
| TELEPHONE NUMBER 3 | CHARACTER TYPE 8 BYTES | 416 |
| USER REGISTRATION STATE | INTEGER TYPE | 417 |

FIG. 5

CUSTOMER STATE DATA TABLE　　　　　　　　　500

| ITEM | TYPE | |
|---|---|---|
| USER ID | INTEGER TYPE | ~501 |
| FINAL DISPLAY ALBUM ID | INTEGER TYPE | ~502 |
| DISK USE LIMIT AMOUNT | INTEGER TYPE | ~503 |
| CUMULATIVE POINT | INTEGER TYPE | ~504 |

FIG. 6

CUSTOMER ALBUM DATA TABLE 600

| ITEM | TYPE | |
|---|---|---|
| USER ID | INTEGER TYPE | ~601 |
| ALBUM ID | INTEGER TYPE | ~602 |
| ALBUM DISPLAY ORDER NUMBER | INTEGER TYPE | ~603 |

FIG. 7

ALBUM INFORMATION DATA TABLE                                                700

| ITEM | TYPE | |
|---|---|---|
| ALBUM ID | INTEGER TYPE | ~701 |
| ALBUM NAME | CHARACTER TYPE 64 BYTES | ~702 |
| COMMENT | CHARACTER TYPE 256 BYTES | ~703 |
| OPEN ENABLE/DISABLE | INTEGER TYPE | ~704 |
| PASSWORD ENABLE/DISABLE | INTEGER TYPE | ~705 |
| ALBUM PASSWORD | CHARACTER TYPE 64 BYTES | ~706 |
| PRINT ENABLE/DISABLE | INTEGER TYPE | ~707 |
| ORIGINAL DISPLAY ENABLE/DISABLE | INTEGER TYPE | ~708 |
| DISPLAY FORMAT NUMBER | INTEGER TYPE | ~709 |
| BROWSING INHIBITION | INTEGER TYPE | ~710 |
| NUMBER OF TIMES OF BROWSING | INTEGER TYPE | ~711 |
| NUMBER OF TIMES OF PORTABLE BROWSING | INTEGER TYPE | ~712 |

FIG. 8

ALBUM IMAGE DATA TABLE

| ITEM | TYPE | |
|---|---|---|
| ALBUM ID | INTEGER TYPE | ~801 |
| IMAGE ID | INTEGER TYPE | ~802 |
| IMAGE DISPLAY NUMBER | INTEGER TYPE | ~803 |

IMAGE INFORMATION DATA TABLE 900

| ITEM | TYPE | |
|---|---|---|
| IMAGE ID | INTEGER TYPE | ~901 |
| USER ID | INTEGER TYPE | ~902 |
| IMAGE NAME | CHARACTER TYPE 64 BYTES | ~903 |
| ORIGINAL IMAGE FILE PATH | CHARACTER TYPE 256 BYTES | ~904 |
| THUMBNAIL FILE PATH | CHARACTER TYPE 256 BYTES | ~905 |
| DISPLAY IMAGE FILE PATH | CHARACTER TYPE 256 BYTES | ~906 |
| COMMENT | CHARACTER TYPE 256 BYTES | ~907 |
| NUMBER OF TIMES OF BROWSING | INTEGER TYPE | ~908 |
| NUMBER OF TIMES OF PRINTING | INTEGER TYPE | ~909 |
| NUMBER OF TIMES OF PORTABLE BROWSING | INTEGER TYPE | ~910 |
| BROWSING INHIBITION | INTEGER TYPE | ~911 |

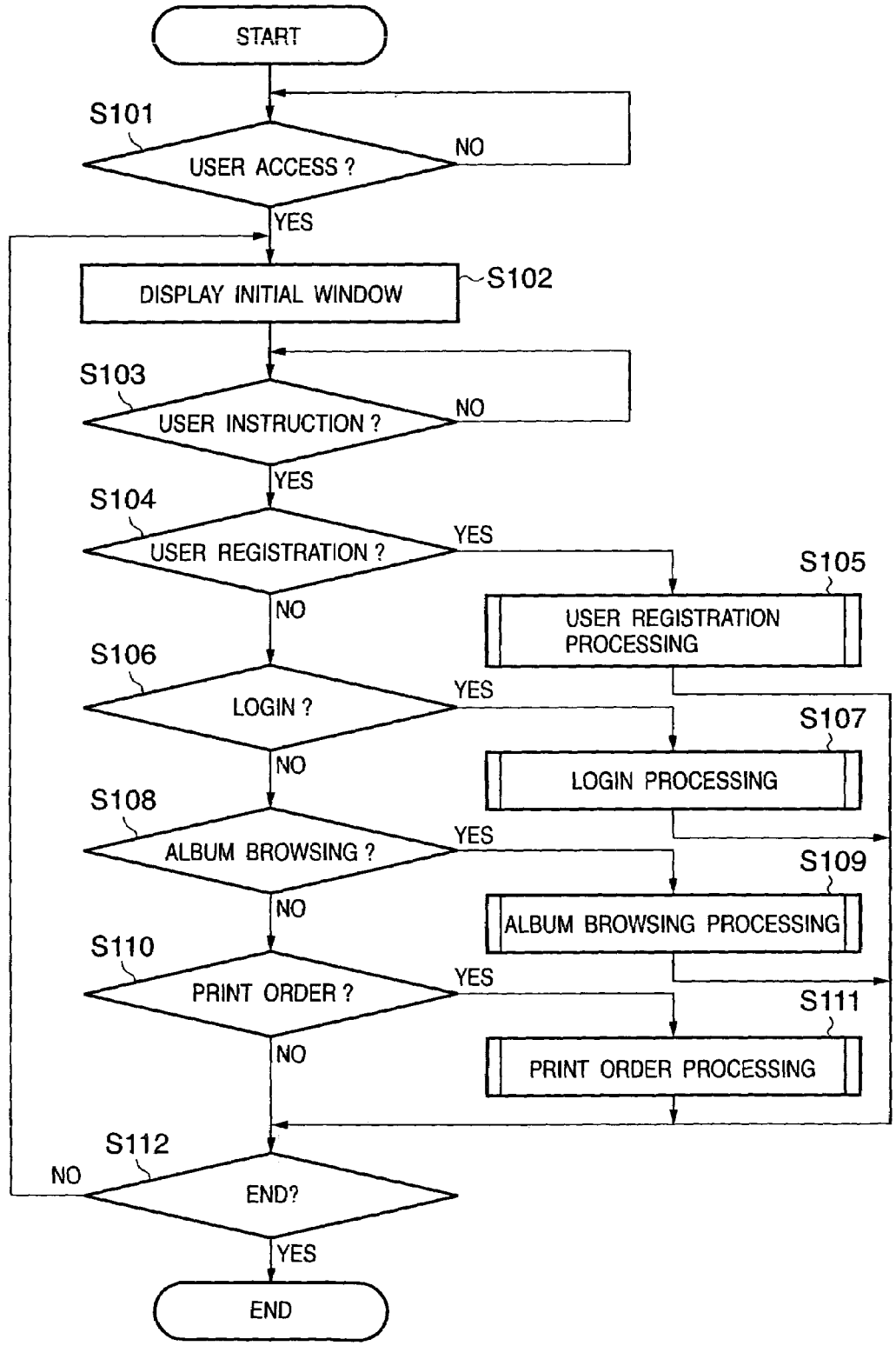

FIG. 17

Date : Sat. 23 Jun 2001 12:13:37+0900
From : PhotoSite <×××@○○○.com>
To : △△△@◇◇◇.ne.jp
Subject : [USER REGISTRATION CONFIRMATION]
    YOU ARE REGISTERED.
Content-Type : text/plain; charset ="ISO-2022-JP"
Content-Transfer-Encoding : 7bit

MR. TARO CANON

YOU ARE REGISTERED IN PHOTO SITE.

YOUR LOGIN NAME IS △△△@◇◇◇.ne.jp

REGISTERED CONTENTS ARE :
NOTIFICATION E-MAIL ADDRESS : △△△@◇◇◇.ne.jp
ADDRESS : 〒AAA-BBBB, ○○-CHO 1-1-2, ○○-KU, TOKYO
TELEPHONE NUMBER : 03-XXXX-XXXX

IF YOU HAVE NOT REGISTERED YET, PLEASE CONTACT
×××-support@○○○.com

FIG. 30

```
Date : Sat. 23 Jun 2001 02:34:55+0900
From : PhotoSite <△△△@eanon.co.jp>
To : aaa@○○.ne.jp
Subject : OPEN ALBUM NOTIFICATION
Error-to : △△△@eanon.co.jp
Content-Type : text/plain ; charset = "ISO-2022-JP"
Content-Transfer-Encoding : 7bit YOU CAN BROWSE OPEN ALBUM IN PHOTO SITE AT FOLLOWING URL
http://www.○○○.com/PhotoSite/UserAlbum/AlbumEntry.cgi?AlbumID = AJNWDMF
http://www.○○○.com/PhotoSite/
YOU CAN ALSO BROWSE ALBUM BY DESIGNATING FOLLOWING NUMBER
TO ALBUM ID
ALBUM ID : AJNWDMF — MESSAGE FROM SENDER —
THANK YOU FOR YOUR CONTINUED PATRONAGE.
WE HAVE UPLOADED PICTURES IN RECENT FAIR.
PLEASE ADVISE US WHEN YOU SEE THEM.
— END OF MESSAGE —
```

MB SESSION INFORMATION TABLE  7000

| ITEM | TYPE | |
|---|---|---|
| SESSION ID | INTEGER TYPE | ~7001 |
| FINAL ACCESS DATE/TIME | CHARACTER TYPE 64 BYTES | ~7002 |
| ACCESS DATE/TIME | CHARACTER TYPE 64 BYTES | ~7003 |
| USER ID | INTEGER TYPE | ~7004 |
| RECORD ATTRIBUTE | CHARACTER TYPE 1 BYTE | ~7005 |
| ORDER NUMBER | INTEGER TYPE | ~7006 |

FIG. 41

MB ALBUM INFORMATION TABLE                         7100

| ITEM | TYPE |
|---|---|
| SESSION ID | INTEGER TYPE |
| ALBUM ID | INTEGER TYPE |
| ALBUM NAME | CHARACTER TYPE 64 BYTES |
| ALBUM COMMENT | CHARACTER TYPE 256 BYTES |

| ITEM | TYPE | |
|---|---|---|
| SESSION ID | INTEGER TYPE | ~7201 |
| IMAGE ID | INTEGER TYPE | ~7202 |
| ALBUM ID | INTEGER TYPE | ~7203 |
| IMAGE NAME | CHARACTER TYPE 64 BYTES | ~7204 |
| IMAGE COMMENT | CHARACTER TYPE 256 BYTES | ~7205 |
| IMAGE PATH | CHARACTER TYPE 256 BYTES | ~7206 |
| IMAGE NUMBER | INTEGER TYPE | ~7207 |
| IMAGE SIZE | INTEGER TYPE | ~7208 |
| NUMBER OF TIMES OF PRINTING | INTEGER TYPE | ~7209 |

7200

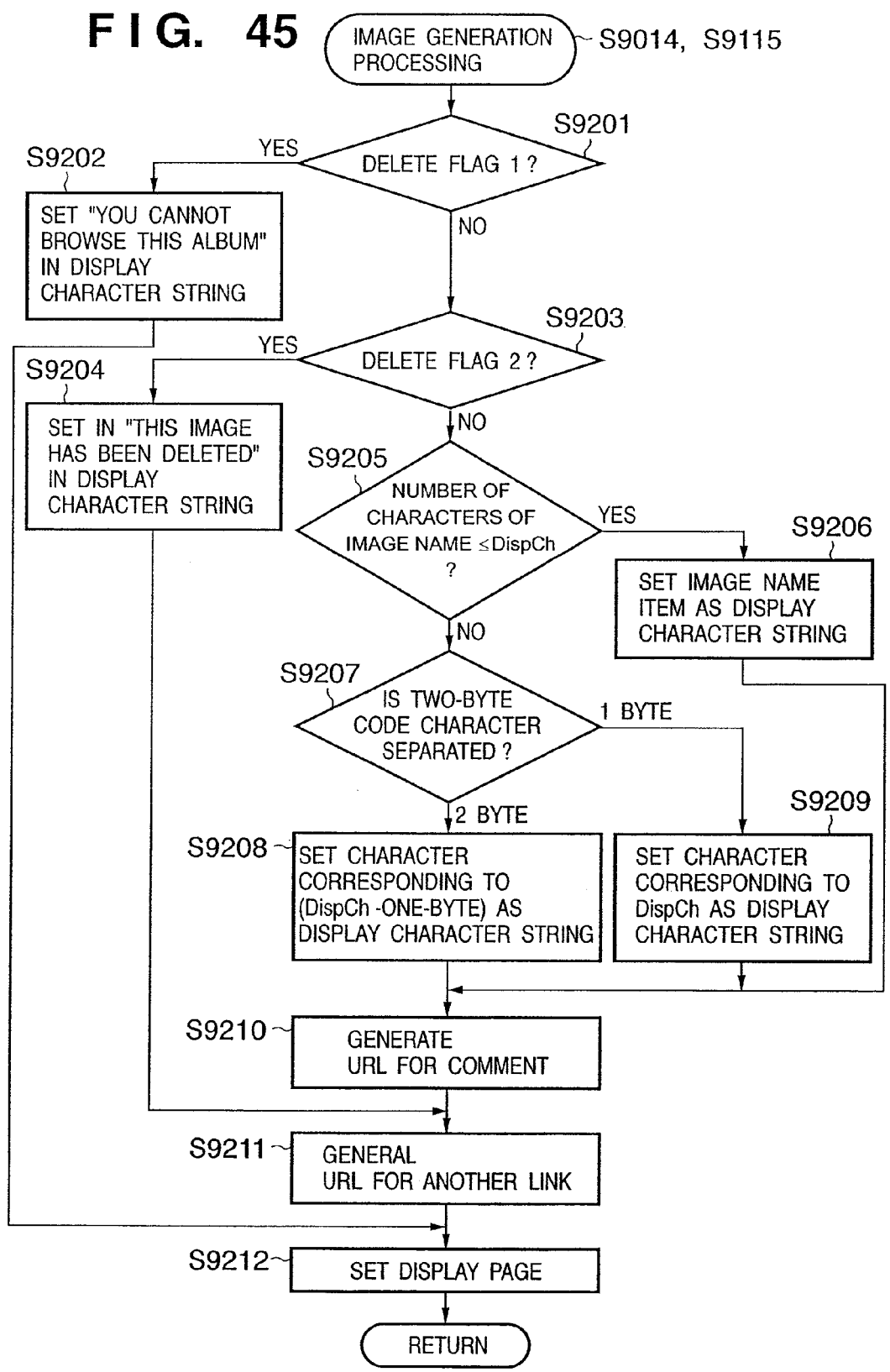

FIG. 46

ORDER INFORMATION DATA TABLE 1000

| ITEM | TYPE | |
|---|---|---|
| ORDER NUMBER | INTEGER TYPE | 1001 |
| ORDERER ID | INTEGER TYPE | 1002 |
| DELIVERY DESTINATION NAME | CHARACTER TYPE 64 BYTES | 1003 |
| DELIVERY DESTINATION POSTAL CODE 1 | CHARACTER TYPE 8 BYTES | 1004 |
| DELIVERY DESTINATION POSTAL CODE 2 | CHARACTER TYPE 8 BYTES | 1005 |
| DELIVERY DESTINATION PREFECTURE CODE | INTEGER TYPE | 1006 |
| DELIVERY DESTINATION ADDRESS 1 | CHARACTER TYPE 256 BYTES | 1007 |
| DELIVERY DESTINATION ADDRESS 2 | CHARACTER TYPE 256 BYTES | 1008 |
| DELIVERY DESTINATION TELEPHONE NUMBER 1 | CHARACTER TYPE 8 BYTES | 1009 |
| DELIVERY DESTINATION TELEPHONE NUMBER 2 | CHARACTER TYPE 8 BYTES | 1010 |
| DELIVERY DESTINATION TELEPHONE NUMBER 3 | CHARACTER TYPE 8 BYTES | 1011 |
| PRINT SITE ID | INTEGER TYPE | 1012 |
| ORDER DATE/TIME | INTEGER TYPE | 1013 |
| STATUS | INTEGER TYPE | 1014 |

FIG. 47

ORDER IMAGE DATA TABLE                                              1100

| ITEM | TYPE | |
|------|------|---|
| ORDER NUMBER | INTEGER TYPE | ~1101 |
| PRINT SITE RECEPTION NUMBER | INTEGER TYPE | ~1102 |
| IMAGE NUMBER | INTEGER TYPE | ~1103 |
| FILE PATH TO COPY OF THUMBNAIL IMAGE | CHARACTER TYPE 256 BYTES | ~1104 |
| FILE PATH TO COPY OF ORIGINAL IMAGE | CHARACTER TYPE 256 BYTES | ~1105 |
| FILE PATH TO COPY OF DISPLAY IMAGE | CHARACTER TYPE 256 BYTES | ~1106 |
| NUMBER OF PRINTS | INTEGER TYPE | ~1107 |
| PRINT SIZE | INTEGER TYPE | ~1108 |
| PRINT TYPE | INTEGER TYPE | ~1109 |
| IMAGE ID | INTEGER TYPE | ~1110 |

FIG. 48

ORDER SETTLEMENT DATA TABLE  1200

| ITEM | TYPE | |
|---|---|---|
| ORDER NUMBER | INTEGER TYPE | ~1201 |
| SETTLEMENT METHOD | INTEGER TYPE | ~1202 |
| TOTAL FEE | INTEGER TYPE | ~1203 |
| PRINT FEE | INTEGER TYPE | ~1204 |
| PRINT FEE TAX | INTEGER TYPE | ~1205 |
| TRANSPORTATION CHARGE | INTEGER TYPE | ~1206 |
| TRANSPORTATION CHARGE TAX | INTEGER TYPE | ~1207 |
| STATUS | INTEGER TYPE | ~1208 |

FIG. 49

ORDERER DATA TABLE

| ITEM | TYPE | |
|---|---|---|
| ORDERER ID | INTEGER TYPE | ~1301 |
| USER ID | INTEGER TYPE | ~1302 |
| NOTIFICATION E-MAIL ADDRESS | CHARACTER TYPE 64 BYTES | ~1303 |
| NAME (FAMILY NAME) | CHARACTER TYPE 64 BYTES | ~1304 |
| NAME (FIRST NAME) | CHARACTER TYPE 64 BYTES | ~1305 |
| PHONETIC TRANSCRIPTION (FAMILY NAME) | CHARACTER TYPE 64 BYTES | ~1306 |
| PHONETIC TRANSCRIPTION (FIRST NAME) | CHARACTER TYPE 64 BYTES | ~1307 |
| POSTAL CODE 1 | CHARACTER TYPE 8 BYTES | ~1308 |
| POSTAL CODE 2 | CHARACTER TYPE 8 BYTES | ~1309 |
| PREFECTURE CODE | INTEGER TYPE | ~1310 |
| ADDRESS 1 | CHARACTER TYPE 256 BYTES | ~1311 |
| ADDRESS 2 | CHARACTER TYPE 256 BYTES | ~1312 |
| TELEPHONE NUMBER 1 | CHARACTER TYPE 8 BYTES | ~1313 |
| TELEPHONE NUMBER 2 | CHARACTER TYPE 8 BYTES | ~1314 |
| TELEPHONE NUMBER 3 | CHARACTER TYPE 8 BYTES | ~1315 |

PRINT SITE DATA TABLE

| ITEM | TYPE | |
|---|---|---|
| PRINT SITE ID | INTEGER TYPE | ~1401 |
| PROVIDER NAME | CHARACTER TYPE 64 BYTES | ~1402 |
| URL TO ORDER NOTIFICATION CGI | CHARACTER TYPE 256 BYTES | ~1403 |

ESTIMATE DISPLAY

| ARTICLE NAME | APPLY | NUMBER OF PIECES | UNIT PRICE | TOTAL |
|---|---|---|---|---|
| DIGITAL PRINT | L SIZE | 8 PIECES | 40 | 320 |
| DIGITAL PRINT | A4 SIZE | 1 PIECE | 300 | 300 |
| SUBTOTAL | | | | 590 |
| CONSUMPTION TAX | | | | 29 |
| PRINT SITE TOTAL | | | | 619 |
| TRANSPORTATION CHARGE | | | | 450 |
| TRANSPORTATION CHARGE CONSUMPTION TAX | | | | 22 |
| TOTAL | | | | 1,071 |

[ ORDER ]   [ CANCEL ]

FIG. 55

```
4600
┌─────────────────────────────────────────────────────────┐
│ ORDERER INFORMATION                                      │
│ ┌─NAME──────────────────────────────────────────────┐   │
│ │              FAMILY NAME: [CANON]  FIRST NAME: [TARO] │ │
│ │  PHONETIC                                          │   │
│ │  TRANSCRIPTION FAMILY NAME: [CANON] FIRST NAME: [TARO]│ │
│ └────────────────────────────────────────────────────┘   │
│ ┌─ADDRESS───────────────────────────────────────────┐   │
│ │  〒: [aaa] — [bbbb]  PREFECTURE: [TOKYO ▼]         │   │
│ │  CITY, STREET, AND HOUSE NUMBER: [○○-CHO 1-1-2, ○○-KU, TOKYO] │
│ │  APARTMENT AND ROOM NUMBER: [               ]     │   │
│ └────────────────────────────────────────────────────┘   │
│ ┌─TELEPHONE NUMBER─────────────────────────────────┐    │
│ │  [03] — [○○○] — [0000]                           │    │
│ └───────────────────────────────────────────────────┘    │
│  CONTACT DESTINATION E-MAIL ADDRESS: [△△△@◇◇◇.ne.jp]    │
│  [ORDER]  [CANCEL]                                       │
└─────────────────────────────────────────────────────────┘
     4601    4602
```

DELIVERY DESTINATION DESIGNATION WINDOW

- ◉ SAME AS ADDRESS OF ORDER CUSTOMER
- ○ DESIGNATE ANOTHER DELIVERY DESTINATION

NAME
FAMILY NAME: [ ]   FIRST NAME: [ ]

ADDRESS
〒: [ ]-[ ]   PREFECTURE: [ ▼]
CITY, STREET, AND HOUSE NUMBER: [ ]
APARTMENT AND ROOM NUMBER: [ ]

TELEPHONE NUMBER
[ ]-[ ]-[ ]

[ORDER] 4701   [CANCEL] 4702

FIG. 57

```
CONFIRMATION OF ORDER CONTENTS

THANK YOU FOR YOUR ORDER.
NOTIFICATION OF ORDER CONTENTS IS ALSO SENT TO
aaa@eanon.co.jp BY E-MAIL.

ORDER NUMBER      : 10242678
ORDER DATE/TIME   : MAY 10, 2001, 7:45 PM
ORDER CONTENTS    : L SIZE WITHOUT BORDER, 8 PIECES
                  : A4 SIZE, 1 PIECE
AMOUNT BILLED     : ¥ 1,071
PAYMENT RECEPTION NUMBER : 1234567
CUSTOMER          : MR. TARO CANON
ADDRESS           : AAA-BBBB, ○○-CHO 1-1-2,
                    ○○-KU, TOKYO

TELEPHONE NUMBER  : 03-XXXX-XXXX

DELIVERY DESTINATION : SAME AS CONTACT
                       ADDRESS OF CUSTOMER

```
Date : Sat. 23 Jun 2001 02:34:56+0900
From : PhotoSite <△△△@eanon.co.jp>
To : aaa@○○.ne.jp
Subject : CONFIRMATION MAIL NOTIFICATION
Error-to : △△△@eanon.co.jp
Content-Type : text/plain; charset ="ISO-2022-JP"
Content-Transfer-Encoding : 7bit

PAYMENT RECEPTION NUMBER FOR ORDER
FROM MR. TARO CANON IS :

PAYMENT RECEPTION NUMBER   1234567
PAYMENT DUE DATE, 200X (YEAR), XX (MONTH), XX (DAY)
ORDERED MERCHANDISE, PRINT
ORDER AMOUNT, ￥999,999

PLEASE PAY AT YOUR NEAREST XXXX.
DATE/TIME OF PAYMENT IS ORDER DAY.

YOU CAN ALSO CONFIRM DETAILS AND SITUATION OF ORDER HERE
http://www.imagegateway.net/o?id=xxxxxxxxxx
YOU CANNOT DIRECTLY REPLY TO THIS MAIL.
IF YOU HAVE NO IDEA OF THIS MAIL OR IF YOU HAVE SOME QUESTIONS,
PLEASE CONTACT FOLLOWING URL.
—END OF MESSAGE—
```

♪ PLEASE DESIGNATE NUMBER OF PRINTS (L SIZE ¥40/PIECE)

1. BALLOON

1200×1600

[　] PIECES

2. SPORTS MEETING

2040×1536

[　] PIECES

3. IN PARK

1200×860

[　] PIECES

4. FOOTBALL

1024×768

[　] PIECES

5. FOUNTAIN

1024×768

[　] PIECES

CURRENT NUMBER OF PRINTS ORDERED IS XX

7910 —— [ ADVANCE ]

[8] CANCEL ORDER

[9] RETURN

◇ PLEASE INPUT CUSTOMER INFORMATION
NAME : (DOUBLE-BYTE)
FAMILY NAME : [ ] — 8102
FIRST NAME : [ ] — 8103
PHONETIC TRANSCRIPTION : (DOUBLE-BYTE)
FAMILY NAME : [ ] — 8104
FIRST NAME : [ ] — 8105
POSTAL CODE : (SEVEN DIGITS)
[ ] — 8106
ADDRESS : (DOUBLE-BYTE)
PREFECTURE
[TOKYO ▼] — 8107
CITY AND STREET
[ ] — 8108
HOUSE NUMBER AND BUILDING NAME
[ ] — 8109
TELEPHONE NUMBER : (SINGLE-BYTE)
[ ] — 8110
MAIL ADDRESS : (SINGLE-BYTE)
[ ] — 8111
DELIVERY METHOD :
⊙ MAIL
○ HOME DELIVERY SERVICE — 8112
DELIVERY DESTINATION :
⊙ SAME AS ADDRESS OF ORDERER
○ DESIGNATE DELIVERY DESTINATION — 8113
[ADVANCE] — 8114
[8] CANCEL ORDER — 8115
[9] RETURN — 8116

FIG. 65

- 8200
- 8201 → ◆ → →
- 🎁 PLEASE INPUT DELIVERY DESTINATION
- NAME : (DOUBLE-BYTE)
- FAMILY NAME : ▭ — 8202
- FIRST NAME : ▭ — 8203
- PHONETIC TRANSCRIPTION : (DOUBLE-BYTE)
- FAMILY NAME : ▭ — 8204
- FIRST NAME : ▭ — 8205
- POSTAL CODE : (SEVEN DIGITS)
- ▭ — 8206
- ADDRESS : (DOUBLE-BYTE)
- PREFECTURE
- [TOKYO ▼] — 8207
- CITY AND STREET
- ▭ — 8208
- HOUSE NUMBER AND BUILDING NAME
- ▭ — 8209
- TELEPHONE NUMBER : (SINGLE-BYTE)
- ▭ — 8210
- MAIL ADDRESS : (ON VOLUNTARY BASIS)
- ▭ — 8211
- 8212 — [ADVANCE]
- 8213 — [8] CANCEL ORDER
- 8214 — [9] RETURN

♪ PLEASE CONFIRM ESTIMATE AMOUNT OF ORDERED MERCHANDISE, ORDERE INFORMATION, AND DELIVERY DESTINATION.
IF OK, PLEASE CLICK ON "ORDER" BUTTON.

[¥] FEE
L SIZE WITHOUT BORDER
   = ¥6000 (INCLUDING TAX)
TRANSPORTATION CHARGE OF HOME DELIVERY SERVICE
   = ¥400(INCLUDING TAX)
SMALL AMOUNT SETTLEMENT COMMISSION
   = ¥200(INCLUDING TAX)
SETTLEMENT COMMISSION
   = ¥100(INCLUDING TAX)
CONSUMPTION TAX= ¥0
TOTAL= ¥1300

◇ORDERER INFORMATION
MR. TARO ○×
〒123-4567
..., OTA-KU, TOKYO
0312345678
taro@print.ne.jp

🎁 DELIVERY DESTINATION
SAME AS ADDRESS OF ORDERER

8302 — [ ORDER ]

8303 — [8] CANCEL ORDER
8304 — [9] RETURN

♥THANK YOU FOR
HAVING VISITED THIS SITE.
YOUR ORDER LOG IS
AS FOLLOWS.

ORDERER :
MR. TARO ○×
ISSUE DATE/TIME OF
RECEPTION NUMBER :
2002.06.06 15:18
ORDERED MERCHANDISE :
L SIZE PRINT WITHOUT BORDER
ORDER AMOUNT :
¥1300
NAME OF SHOP FOR PAYMENT :
△■SHOP
PAYMENT NUMBER :
123456789
PAYMENT DUE DATE :
2002.06.20
USE SITUATION : PRINT SITE
PROCESSING IS PROGRESSING

MERCHANDISE INFORMATION
L SIZE WITHOUT BORDER ×15
 =¥600(INCLUDING TAX)
 . . . .

F I G. 70
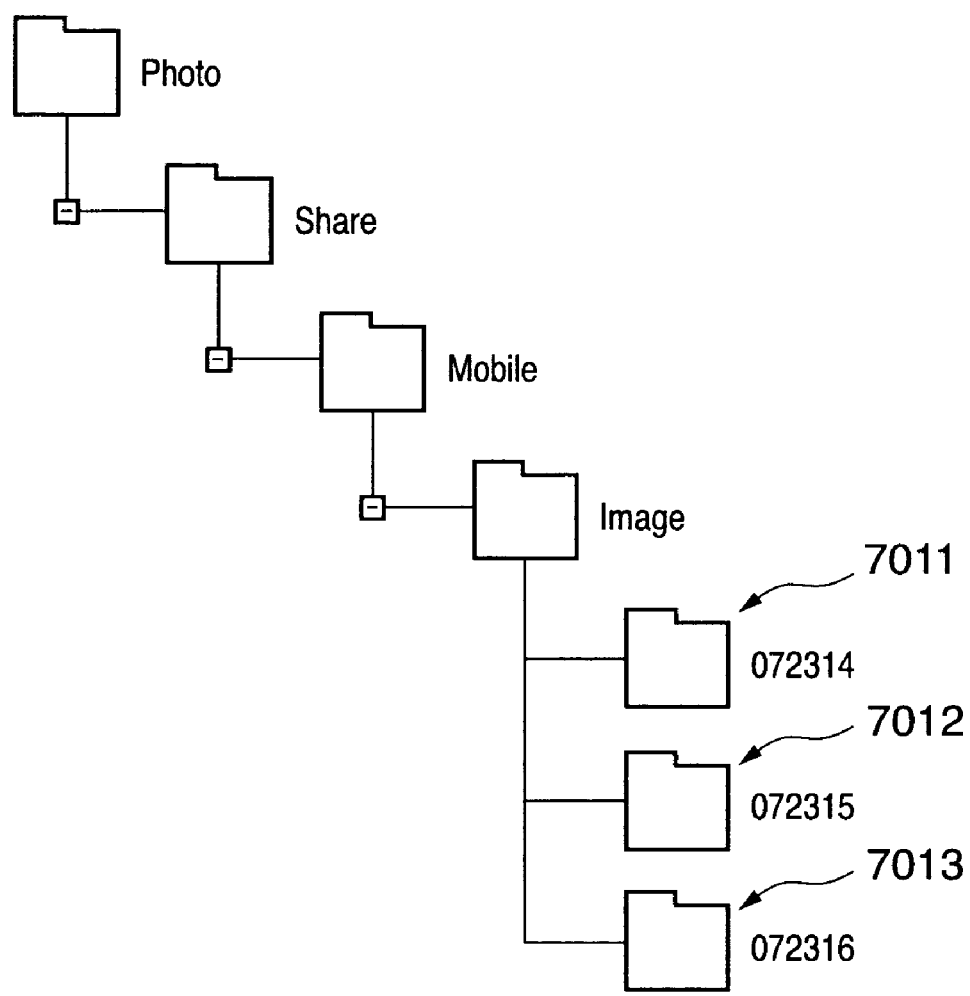

… # INFORMATION PROCESSING APPARATUS FOR PROVIDING IMAGE TO COMMUNICATION TERMINAL AND CONTROL METHOD THEREFOR

FIELD OF THE INVENTION

The present invention relates to an information processing apparatus for providing an image to a communication terminal and, more particularly, a portable terminal and a control method therefor.

BACKGROUND OF THE INVENTION

Along with the recent improvement of communication infrastructure and development of information communication technology, information providing services using the Internet are becoming available.

For example, there are generated systems which offer information providing services, i.e., systems which offer services (image browsing services) in which image service sites (to be referred to as photo sites hereinafter) keep image data which users have taken by using image input devices in the storage areas of servers on the Internet and allow customers to browse again the image data at a desired time. There are also providers that provide such services.

In such a system which acquire input information input from a communication terminal and provides a service on the basis of the input information, a memory area called a cookie is ensured in the communication terminal to hold the input information. With this structure, the user need not repeatedly input the same information from the communication terminal.

That is, the input information input from the communication terminal is temporarily held in the cookie and then transmitted to an information processing apparatus. For this reason, when the system requires the same information again, the user need not input the same information.

However, there are some communication terminals which cannot ensure cookies because of a lack of sufficient memory areas. In this case, the user must input the same information many times. In addition, many portable terminals are inconvenient for character input, resulting in excess load on the user.

A photo site which provides an image browsing service manages a series of session information containing an access time, albums to be browsed, album image information, and the like for each access from a terminal. The photo site must also simultaneously manage actual album images.

The photo site which provides the image browsing service uses a session ID when accessed by a user. When a predetermined time has elapsed from the final access, session timeout occurs. From this time point, access with the previous session ID is refused.

Furthermore, since the number of pixels of a digital camera is increasing in recent years, the number of pixels of an original image also tends to increase. In a portable terminal, when an original image is to be browsed directly, the entire image may not be displayed in a window, or data transfer may be time-consuming. To prevent this, the photo site generates and manages browsing display images, i.e., images whose sizes or data amounts are decreased on the basis of uploaded original images.

At the time of providing the browsing service, the photo site makes a copy of a browsing display image file in the display area of the photo site server. At the end of the service, the photo site erases the browsing display image file that exists in the display area.

However, if the managed session information or the browsing display image file that is copied in the display area should be erased every time session timeout occurs during the image browsing service, a timeout time must be set and managed for each session.

In addition, the browsing display image is copied in the area for display in each session. The browsing display image must be erased after the session timeout of each session. However, to implement this processing, the browsing display image erase must be managed for each session.

SUMMARY OF THE INVENTION

The present invention has been made to solve the problems of the prior art, and has as its object to provide a high-quality service that reduces the service usage load of users. The present invention is also to manage image data or character data, efficiently send browsing images, and efficiently manage session information related to each session of the browsing service or copy images for browsing in providing an image browsing service.

According to the present invention, the foregoing object is attained by providing an information processing apparatus comprising: session information generation means for generating, for each session with a communication terminal, session information containing identification information of the session and storing the session information in storage means; invalidation means for invalidating session information related to a session which has no access for a first predetermined time; accumulation means for accumulating an image; display image copy means for copying display image data corresponding to the image accumulated in the accumulation means to a predetermined area in response to a request from the communication terminal; and deletion means for deleting the display image data which is not referred to for a second predetermined time.

According to another aspect of the present invention, the foregoing object is attained by providing a method of controlling an information processing apparatus, comprising: a session information generation step of generating, for each session with a communication terminal, session information containing identification information of the session and storing the session information in storage means; and an invalidation step of periodically checking the session information stored in the storage means and invalidating session information related to a session which has no access for a first predetermined time; a step of accumulating an image; a step of copying display image data corresponding to the accumulated image to a predetermined area in response to a request from the communication terminal; and a step of deleting the display image data which is not referred to for a second predetermined time.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIG. 4 is a view showing a data table related to customer information managed in the photo site according to the embodiment of the present invention;

FIG. 5 is a view showing a customer state table to be used to manage information that represents the current state of a user who is using the photo site according to the embodiment of the present invention;

FIG. 6 is a view showing a customer album data table managed in the photo site according to the embodiment of the present invention;

FIG. 7 is a view showing an album information data table managed in the photo site according to the embodiment of the present invention;

FIG. 8 is a view showing an album image data table managed in the photo site according to the embodiment of the present invention;

FIG. 9 is a view showing an image information table managed in the photo site according to the embodiment of the present invention;

FIG. 10 is a flow chart showing processing procedures of the photo site for access from a PC in the embodiment of the present invention;

FIG. 17 is a view showing an example of the contents of e-mail that is issued at the time of user registration in the photo site according to the embodiment of the present invention;

FIG. 30 is a view showing an example of album notification mail according to the embodiment of the present invention;

FIG. 32 is a view showing the album detail display window of the photo site according to the embodiment of the present invention;

FIG. 40 is a view showing a table which manages access from a specific portable cellular phone;

FIG. 41 is a view showing a table which stores album information and an album that can be browsed at the time of login;

FIG. 42 is a view showing a table which stores image information in the album at the time of album browsing;

FIG. 45 is a flow chart showing details of processing (S9014 and S9115) for generating data of the image browsing window 7400 in FIGS. 43 and 44;

FIG. 46 is a view showing an order information data table managed in the photo site according to the embodiment of the present invention;

FIG. 47 is a view showing an order image data table managed in the photo site according to the embodiment of the present invention;

FIG. 48 is a view showing an order settlement data table managed in the photo site according to the embodiment of the present invention;

FIG. 49 is a view showing an order data table managed in the photo site according to the embodiment of the present invention;

FIG. 50 is a view showing a print site data table managed in the photo site according to the embodiment of the present invention;

FIG. 54 is a view showing an estimate display window at the time of image print order according to the embodiment of the present invention;

FIG. 55 is a view showing an orderer information input display window at the time of image print order according to the embodiment of the present invention;

FIG. 56 is a view showing a delivery destination information input display window at the time of image print order according to the embodiment of the present invention;

FIG. 57 is a view showing an order content confirmation window displayed in an information providing system according to an embodiment of the present invention;

FIG. 58 is a view showing an example of e-mail sent at the time of print order according to the embodiment of the present invention;

FIG. 62 is a view showing an individual print order window (having one page) in the print order processing from the portable terminal according to the embodiment of the present invention;

FIG. 64 is a view showing an orderer information input window in the print order processing from the portable terminal according to the embodiment of the present invention;

FIG. 65 is a view showing a delivery destination input window in the print order processing from the portable terminal according to the embodiment of the present invention;

FIG. 66 is a view showing an estimate window in the print order processing from the portable terminal according to the embodiment of the present invention;

FIG. 68 is a view showing an order status window in the print order processing from the portable terminal according to the embodiment of the present invention;

FIG. 70 is a view showing a file server temporary area (file system) exclusively used by an application server according to the embodiment of the present invention;

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

An information providing system which shares and provides digital image data through the Internet will be described as an embodiment of the present invention.

<Outline of Information Providing System of Embodiment>

Figure 1:
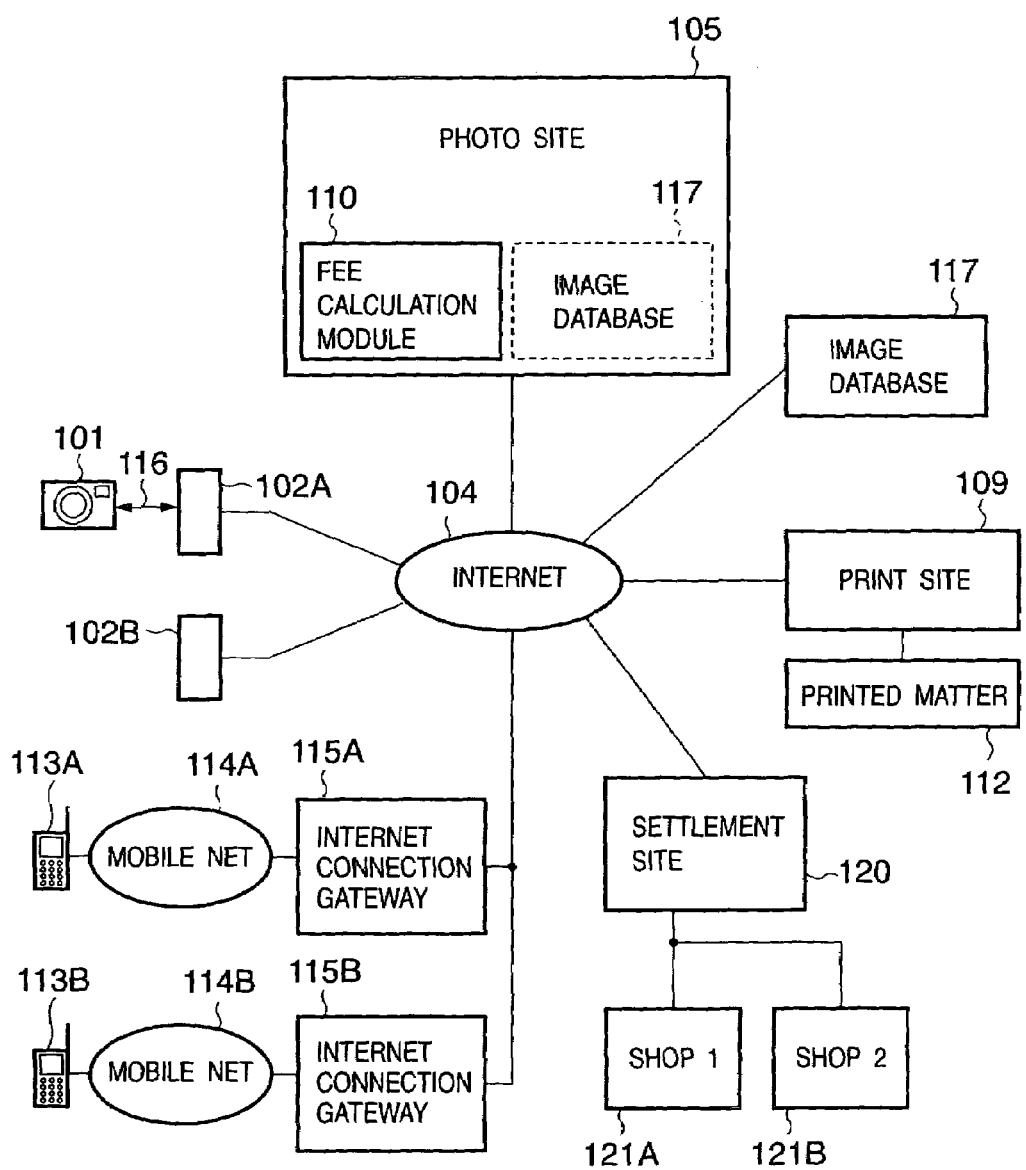
FIG. 1 is a block diagram showing the schematic arrangement of an entire information providing system according to an embodiment of the present invention.

FIG. 1 is a block diagram showing the arrangement of an information providing system according to the embodiment of the present invention, which uses an information providing server.

The information providing system has a PC (Personal Computer) 102 (to be referred to as a user PC hereinafter)

serving as a user terminal used by a user who receives the service, a portable terminal 113, a photo site 105 serving as an information providing server which manages user's images and personal information and provides an information providing system such as an image browsing service, a print site 109 which prints images managed in the photo site 105, a shop 121 which directly receives money from the user as a compensation for prints, and a settlement site 120 which executes receipts processing. In this embodiment, these constituent elements are connected to be communicable through Internet 104. However, the network may be any other computer network.

In this embodiment, as the portable terminal 113, an arbitrary terminal can be used as long as it has a function that allows communication with the photo site 105 through the Internet 104. For example, a portable cellular phone, a PHS, or a personal digital assistant (PDA) which has an internal or external communication adapter can be used.

In this embodiment, the portable terminal 113 is connected to the Internet 104 through a mobile network 114 and Internet gateway 115. However, the portable terminal 113 may be connected to the Internet 104 by any other arrangement.

The photo site 105 provides a service in which image data that a user has taken by using an image input device are kept in the storage area of a server on the Internet, and a customer can browse the image data at any time. The photo site 105 according to this embodiment provides no print service by itself. Instead, the photo site 105 cooperates with the print site 109 that can provide various print services.

The photo site 105 according to this embodiment provides no settlement service by itself. Instead, the photo site 105 cooperates with the settlement site 120 that collects fees. The photo site 105 of this embodiment waits for the payment information of the fee of prints and requests the print site 109 to executes printing. The print site 109 also prints electronic documents such as New Year's cards, word processor documents, and images, which are transferred using the Internet, and provides the prints to users as merchandise.

When a user wants to print an image that is uploaded to the photo site 105, he/she accesses the photo site 105 using a web browser that runs on the user terminal, e.g., the user PC 102 and requests browsing of the image saved in the photo site 105. In response to the request, the photo site 105 causes the web browser that is running on the user PC to display images under predetermined conditions. The user selects the image to be printed from the images browsed on the web browser and inputs a print instruction. In response to the print instruction, the photo site 105 transfers the identification information of the selected image to the print site 109. The print site 109 acquires image data by using the identification information and executes print processing.

(Image Upload)

Referring to FIG. 1, reference numeral 101 denote an image input device which converts an optical image as image information into an electrical signal, executes predetermined image processing, and records/reproduces the signal as digital information. This image input device may be either a digital still camera which can photograph a still image and record it as image data or a digital video camera which can sense a moving image and record it as moving image data.

A data transfer interface 116 is an interface used to transfer sensed image data between the image input device 101 and the user PC 102. The data transfer interface 116 is a cable interface represented by USB (Universal Serial Bus) or IEEE 1394 or a wireless interface represented by IrDA or Bluetooth.

Image data photographed by the image input device 101 and stored as digital information is transferred to the storage area of an information storage device represented by the HDD of the user PC 102 through the data transfer interface 116. In image data transfer from the image input device 101 to the user PC 102, image data stored in the information storage device in the image input device 101 are transferred at once in accordance with an instruction from OS or dedicated software installed in the user PC 102. Alternatively, in accordance with a transfer command sent from the image input device 101, the OS or dedicated software in the user PC 102 ensures a data recording area in the information recording section of the user PC 102 and transfer the image data.

On the user PC 102, a web browser which supports standard protocols (HTTP, FTP, and the like) that can transfer information through the Internet 104 can operate. The web browser can access the photo site 105 by using a standard protocol such as HTTP (HyperText Transfer Protocol) and display Web information created using a description language such as HTML or XML. The Web information is linked to multimedia information such as image and voice data managed in the photo site 105. With this operation, the user of the user PC 102 can receive the service provided by the photo site 105 using the Internet 104.

Image data photographed by the image input device 101 and stored in the information storage area of the user PC 102 is transferred to the photo site 105 in accordance with the request from the user of the user PC 102 (this transfer will be referred to as image upload hereinafter). As a method of executing image upload, image data to be transferred is selected using the above-described web browser, and the image data is transferred in synchronism with an image upload request action. Alternatively, image data is directly selected and transferred by using software dedicated to image upload. Both methods are executed on the basis of a protocol such as HTTP or FTP that can be used on the Internet.

The photo site 105 checks whether the uploaded image data is image data that can be used there. If it is determined that the image data is usable, the uploaded image data and attribute information are stored. The photo site 105 can also put a plurality of uploaded image data together and manage them as an album.

At this time, the photo site 105 notifies the user PC 102 that the image data has normally been uploaded. In this way, the user of the user PC 102 can upload image data through the web browser.

The photo site 105 systematically manages various kinds of data in addition to the attribute information of the image data. Examples of the data are the data of user attribute information registered in advance and the data of print site attribute information to which print requests of the uploaded image data are to be sent.

In the above description, a PC has been exemplified as a terminal from which images are uploaded. However, the information providing system according to the present invention is not limited to this. Images may be uploaded from a portable terminal such as a portable cellular phone. Alternatively, images may be uploaded directly from an image input device such as a digital camera, digital video recorder, scanner, or copying machine through a cable or wireless communication.

(Image Browsing Service)

A method of causing a person other than the user who has uploaded image data to the photo site 105 to browse the stored image data through the Internet 104 will be described next.

The photo site 105 provides a browsing service to a third party designated by the user who has uploaded image data so that the third party can browse an uploaded image or an album that manages a plurality of uploaded images as one archive. The user who has uploaded image data to the photo site 105 notifies the photo site 105, using the web browser, of the e-mail address of a user (to be referred to as a browsing user hereinafter) to which he/she grants permission to browse image data.

To make the image open to the browsing user, the photo site 105 generates a URL (Uniform Resource Locator) necessary for making the image open. As the URL to be generated, a unique address using a random number or the like, which cannot be uniquely predicted (the URL that cannot be uniquely predicted will be referred to as a random URL hereinafter) is assigned. An example will be described below.

http://○ ○ o.com/PhotoSite/Album/
AlbumEntry.cgi?AlbumID=AJNWDMF

The photo site 105 adds password information necessary for browsing to the generated random URL, as needed, and notifies the browsing user of the random URL by e-mail through the Internet 104. The browsing user who has received the e-mail can browse the image or album designated by the user who has uploaded the image by accessing the Internet 104 from, e.g., a user PC 102B and inputting the random URL notified on the web browser by e-mail.

The photo site 105 can also provide an image (or album) browsing notification or a browsing function service to a portable terminal holder designated by the user who has uploaded the images. In this case, the photo site 105 sends an e-mail notification to the portable terminal 113 like the above-described e-mail notification to the browsing user. The user (the user who uses the photo site 105 from a portable terminal will be referred to as a portable terminal user hereinafter) who has received the e-mail can also browse the images and album.

The e-mail to be sent to the portable terminal user is sent from a mail distribution sever in the photo site 105 to a mobile network 114A capable of exchange various kinds of data with a portable terminal 113A through the Internet 104 and an Internet connection gateway 115A. Then, the e-mail is transferred to the portable terminal 113A. The portable terminal user who has received the e-mail inputs the random URL address sent to the dedicated web browser of the portable terminal 113A. With this operation, the user accesses the photo site 105 through a route of mobile network 114A→Internet connection gateway 115A→Internet 104.

In response to the access from the browsing user, the photo site 105 returns web data created by using the description language such as HTML or XML that can be displayed on the web browser that is operating on the PC 102.

On the other hand, in response to the access from the portable terminal user, the photo site 105 returns web data created by using a description language such as WML or Compact HTML that can be displayed on the web browser that is operating on the portable terminal 113A. At this time, the photo site 105 discriminates the model of the portable terminal 113A used by the portable terminal user and sends web data created by a description language suitable for the model. Models that can browse include not only the portable terminal 113A but also a portable terminal 113B which has a different communication protocol, information description language, and mobile network environment. Hence, the photo site 105 can create and send web data by using description languages suitable for various portable terminals. For the descriptive convenience, only the two portable terminals 113A and 113B are illustrated in FIG. 1 as usable portable terminal models. Actually, the number of usable models is larger, as a matter of course.

<Functional Arrangement of Photo Site>

Figure 2:
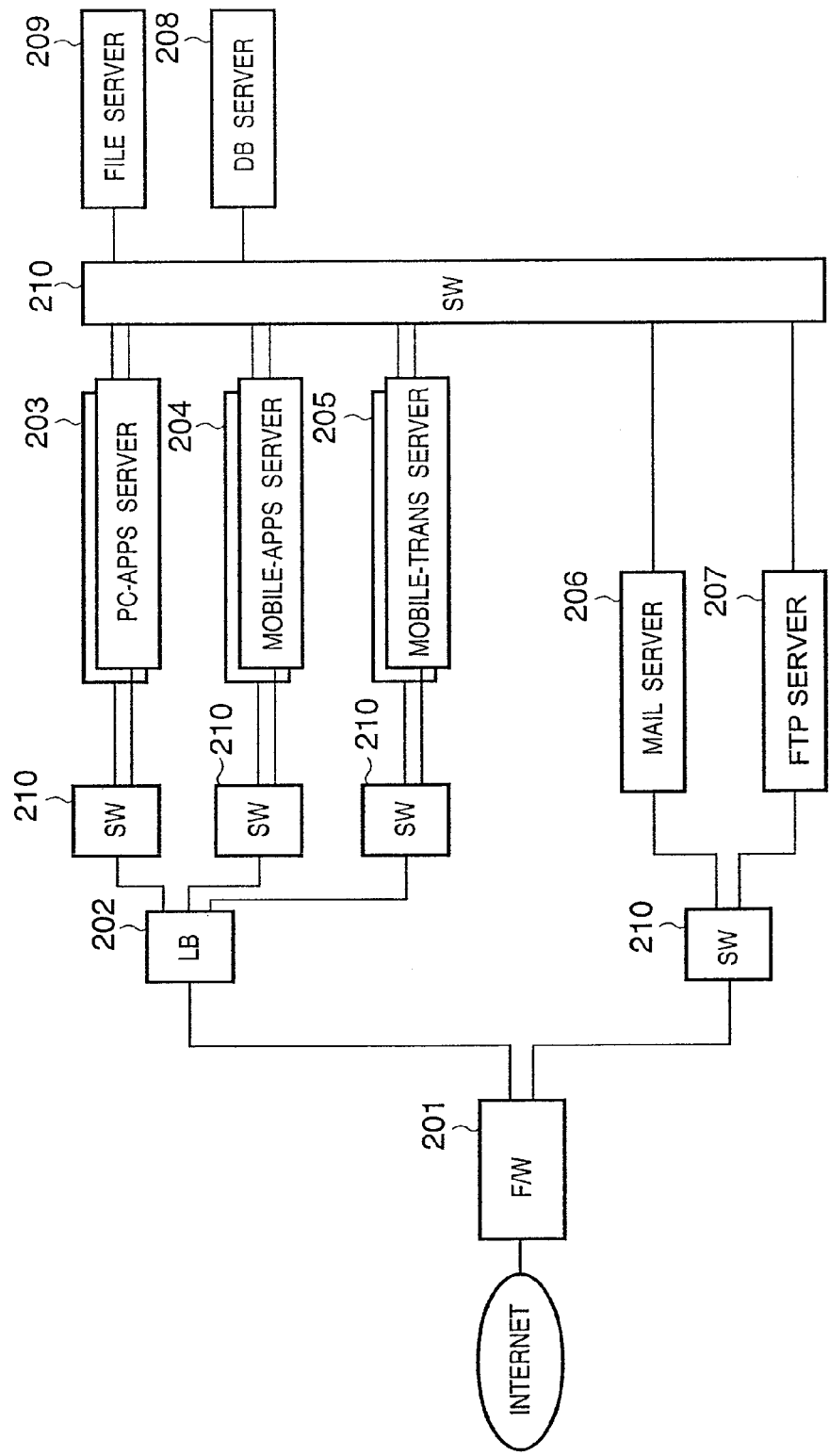
FIG. 2 is a block diagram showing the arrangement of a photo site according to the embodiment of the present invention.

FIG. 2 is a block diagram showing the arrangement of the photo site 105 according to this embodiment.

The photo site 105 mainly comprises a firewall (F/W) 201, load balancer (LB) 202, application servers 203 and 204, content conversion server 205, mail server 206, FTP server 207, database (DB) server 208, file server 209, and Ethernet (registered trademark) switch (SW) 210.

In the photo site 105, the firewall 201 has a function of blocking any invasion or attack from the outside. The firewall 201 is used to safely operate the servers on the intranet in the photo site 105.

The photo site 105 mainly has the application server (PC-APPS) 203 which provides a service to the PC 102 and the application server (Mobile-APPS) 204 which provides a service to the portable terminal 113. Each application server functions as a WWW server. The application servers 203 and 204 acquire image information or user information in cooperation with the DB 208 any time and generate pages.

The load balancer 202 is a load distributor which has a load distributing function of distributing access to the photo site 105 to a plurality of servers in the intranet. The load balancer 202 also has a function of acquiring the terminal information of an access source and determining whether the access is a browsing request from the portable terminal 113 or a browsing request from the PC 102. In accordance with the determination result, a browsing request from the PC is distributed to the application server 203. A browsing request from the portable terminal is distributed to the content conversion (Mobile-Trans) server 205.

The application server 203 has a homepage of a net image storage service corresponding to access from the PC 102. The application server 203 also provides a user homepage for each user so that the user can use an image keeping service that enables image browsing, password setting, and browsing invitation mail sending.

The content conversion server 205 operates as a proxy server which relays the portable terminal application server 204 in response to access from the portable terminal 113. Upon receiving a request from the portable terminal 113, the content conversion server 205 relays the received request to the portable terminal application server 204.

The application server 204 communicates with the back-end (the DB 208 and file server 209 which store information such as user IDs, image information, and browsing image open password), dynamically generates portable terminal display window data corresponding to the request, and returns the portable terminal display window data to the content conversion server 205. The application server 204 provides an image browsing service corresponding to access from the portable terminal 113 and generates a page for each user.

The content conversion server 205 content-converts the received portable terminal display window data in accordance with the portable terminal of the request source and returns the converted display window data to the portable terminal 113. The content conversion server 205 has a table corresponding to various kinds of portable terminals. In the table, pieces of model information of portable terminals are associated with image information and markup languages to be converted. In response to a request, the content conversion server 205 executes data conversion including image formation conversion for each portable terminal 113 corresponding to another markup language. More specifically, when a request from the portable terminal 113 is received as HTTP, the content conversion server 205 acquires model information as User-Agent information contained in the request, and executes data conversion in accordance with the set information by looking up the table.

In accordance with an instruction from the application server 203, the mail server 206 transmits service registration confirmation mail or image browsing invitation mail.

An image from a user is received by the FTP server 207 by the FTP protocol. The received image data is stored in the file server 209 that functions as a main storage.

The photo site 105 according to this embodiment has the following functions.

(1) User registration: A user executes use registration in the photo site 105 using a user PC 102A. The photo site 105 issues a user ID to the registered user.

(2) Image data upload: Images are transferred from the user PC 102A to the photo site 105.

(3) Print order: The user PC 102A or portable terminal 113A or 113B sends an image data print instruction to the photo site 105 so that images are printed through the print site 109.

(4) Browsing permission notification: The user PC 102A transmits e-mail to the user PC 102B and portable terminal 113A to grant permission to browse image data stored in the photo site 105.

(5) Image data browsing: The image data stored in the photo site 105 are browsed from the user PC 102B.

(6) Image browsing from portable terminal: The image data stored in the photo site 105 are browsed from the portable terminal 113A.

<Hardware Configuration of Photo Site>

Figure 3:
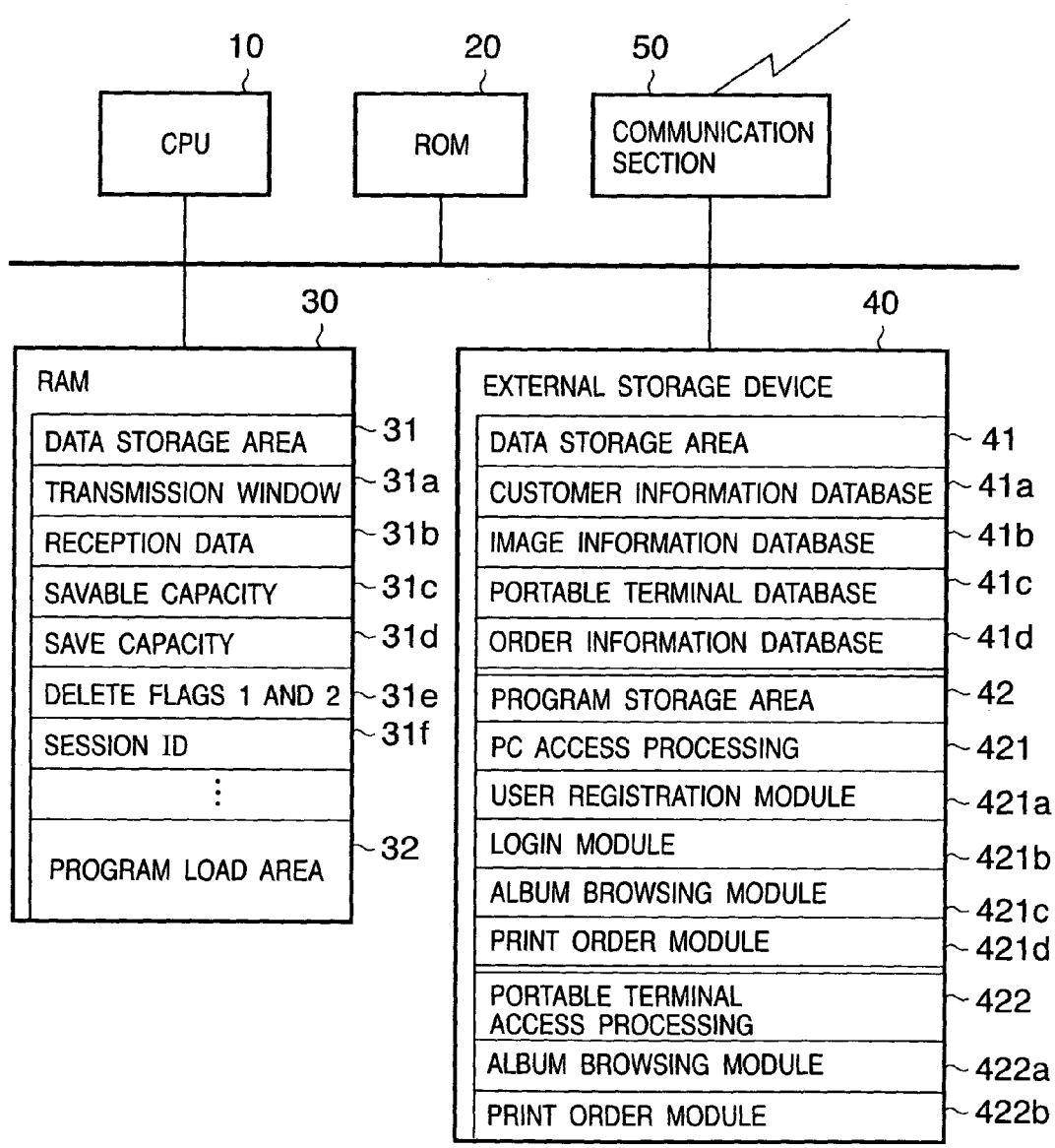
FIG. 3 is a block diagram showing the hardware configuration of the photo site according to the embodiment of the present invention.

FIG. 3 is a block diagram showing the hardware configuration of the photo site 105 according to this embodiment. FIG. 3 mainly shows a control section, and input and output devices are not illustrated.

Reference numeral 10 denotes a CPU serving as the control unit in FIG. 1. The CPU 10 controls the entire photo site. A ROM 20 stores programs and parameters, which need not be changed. A RAM 30 serves as a storage area which temporarily stores programs and data. The RAM 30 has a data storage area 31 and a program load area 32.

In the program load area 32, a system program such as an OS or printer driver from an external storage device 40, or an application program provided from the user is loaded and executed by the CPU 10.

In the data storage area 31, for example, a transmission window 31a generated to be provided to a user's communication terminal, reception data 31b received from the user's communication terminal, an image data savable capacity 31c to be used to check whether image data can be saved, a save capacity 31d that is currently being used, an area 31e where a delete flag 1 or 2 used at the time of browsing from a portable terminal is stored, and a session ID 31f are ensured as areas used in this embodiment.

The external storage device 40 includes a stationary hard disk or memory card, a detachable portable floppy (registered trademark) disk or an optical disk such as a CD, a magnetic or optical card, an IC card, and a memory card. The external storage device 40 has a data storage area 41 and program storage area 42.

The data storage area 41 stores a customer information database 41a which manages customer information of customers who have requested saving, an image information database 41b which manages saved image information, a portable terminal database 41c which manages information for portable terminals, and an order information database 41d which manages print orders of saved image information. The structures of these databases will be described below in more detail with reference to, e.g., FIGS. 4 to 9 or FIGS. 40 to 42, or FIGS. 46 to 50.

The program storage area 42 stores programs which are loaded and executed in the program load area 32 of the RAM 30 (the programs may be directly executed in a memory card or the like). Although not illustrated in FIG. 3, system programs such as an OS and BIOS used in this embodiment are also stored. Referring to FIG. 3, a user registration module 421a, login module 421b, album browsing module 421c, and print order module 421d are stored as a PC access processing program 421. In addition, an album browsing module 422a and print order module 422b as a characteristic feature of this embodiment are stored as a portable terminal access processing program 422.

The above-described photo site has a hardware configuration constituted by a single apparatus. However, photo site may have a system configuration in which the respective servers shown in FIG. 2 are connected by a LAN or the like. The storage section and, more particularly, the external storage device 40 may be distributed to a plurality of devices.

<Database Structure>

FIGS. 4 to 9 and FIGS. 46 to 50 are views showing the contents of the database 208 managed in the photo site 105 according to this embodiment.

(Customer Information Database)

FIGS. 4 to 6 are views showing the contents of customer tables managed in the database 208.

FIG. 4 is a view showing a data table related to customer information managed in the photo site according to this embodiment.

When a user executes user registration, a customer information data table 400 is generated as one record, and registered and managed in the database 208. The registered user obtains a user ID that is uniquely defined. On the database, he/she is managed in the customer information data table 400 using a user ID 401 as a key. Information managed as customer information contains a notification mail address 402, a login name 403, a password 404, a name (family name) 405, a name (first name) 406, a phonetic transcription (family name) 407, a phonetic transcription (first name) 408, postal codes (1 and 2) 409 and 410, a prefecture code 411, addresses (1 and 2) 412 and 413, telephone numbers (1, 2, and 3) 414, 415, and 416, and a user registration state 417. As the user registration state 417, "1" represents that the user has already been registered and can use the service, and "0" represents a use inhibited state.

FIG. 5 is a view showing a customer state table to be used to manage information that represents the current state of a user who is using the photo site 105 according to this embodiment.

When the user executes user registration, a customer state data table 500 is generated as one record, and registered and managed in the database 208. The set values in this record are occasionally updated in accordance with the operation executed by the user during use of the photo site. When the user logs in, the previous use state of the user should have been stored in the customer state data table 500. In the customer state data table 500, an album ID 502 of the album previously displayed for the user, a disk use limit amount 503, and a point 504 accumulated when print order is used are stored using a user ID 501 as a key. If the user is the same, the user ID 501 has the same value as that of the user ID 401.

FIG. 6 is a view showing a customer album data table managed in the photo site 105 according to this embodiment.

When the user generates a new album in using the photo site 105, a customer album data table 600 is generated as one record, and registered and managed in the database 208. When the user deletes the album, the record is deleted from the database 208. In the customer album data table 600, an ID 602 of the album generated by the user and a display order number 603 of the album are stored using a user ID 601 of the registered user as a key. If the user is the same, the user ID 601 has the same value as that of the user ID 401.

(Image Information Database)

FIGS. 7 to 9 are views showing the contents of image information management tables managed in the database 208.

FIG. 7 is a view showing an album information data table managed in the photo site 105 according to this embodiment. When the user generates a new album in using the photo site 105, an album information data table 700 is generated as one record, and registered and managed in the database 208. When the user deletes the album, the record is deleted from the database 208. In the album information data table 700, an album name 702, a file path 703 to a comment for the album, an album open enable/disable flag 704, a password enable/disable flag 705, an album password 706, a print enable/disable flag 707, an original image display enable/disable flag 708, and a display format 709 are managed using an album ID 701 as a key.

As the album open enable/disable flag 704, "1" represents that the album can be made open, "0" represents that the album is inhibited to be made open, and "−1" represents that the site operator has inhibited the album from being made open. As the password enable/disable flag 705, "1" represents the presence of a password, and "0" represents the absence of a password. When the password enable/disable flag 705 is "1", the password is saved in the album password 706. As the print enable/disable flag 707, "1" represents that printing is possible, and "0" represents that printing is impossible. As the original image display enable/disable flag 708, "1" represents that display is possible, and "0" represents that display is impossible. As the display format number, "1" represents list display, and "2" represents detail display. For the same album, the album ID 701 stores the same value as that of the album ID 602. As an album browsing inhibition flag 710 from a portable terminal, "1" represents that display is possible, and "0" represents that display is impossible. This flag is controlled by the service manager. The album information data table 700 also saves a number 711 of times of album browsing from the PC 102 and a number 712 of times of album browsing for a portable terminal.

FIG. 8 is a view showing an album image data table managed in the photo site 105 according to this embodiment.

When the user uploads an image to an album, an album image data table 800 is generated as one record corresponding to one image, and registered and managed in the database 208. When the image corresponding to the record is deleted, the record is deleted from the database 208. In the album image data table 800, an image ID 802 stored in an album ID 801 and an image display number 803 represents the display position of the image in the album are managed. For the same album, the album ID 801 stores the same value as that of the album ID 701.

FIG. 9 is a view showing an image information table managed in the photo site 105 according to this embodiment.

When the user uploads an image to an album, an image information data table 900 is generated as one record corresponding to one image, and registered and managed in the database 208. When the image corresponding to the record is deleted, the record is deleted from the database 208. In the image information data table 900, a user ID 902 of the user who owns the image, an image name 903, a file path 904 to the original image, a path 905 to a thumbnail image file, a file path 906 to a display image, a path 907 to a comment file of the image, a number 908 of times of image browsing, and a number 909 of time of image printing are saved using an image ID 901 as a key. For the same image, the image ID 901 stores the same value as that of the image ID 802. For the same user, the user ID 902 stores the same value as that of the user ID 401. As a number 910 of times of image browsing from a portable terminal or a browsing inhibition flag 911, "1" represents that display is possible, and "0" represents that display is impossible.

(Order Information Database)

FIGS. 46 to 50 are views showing the contents of tables related to print order, which are managed in the database 208.

FIG. 46 is a view showing an order information table managed in the photo site 105 according to this embodiment.

When an album print order is placed, an order information table 1000 is generated as one record corresponding to one order, and registered and managed in an image database 117. An orderer ID 1002, a delivery destination name 1003, delivery destination postal codes (1 and 2) 1004 and 1005, a delivery destination prefecture code 1006, delivery destination addresses (1 and 2) 1007 and 1008, delivery destination telephone numbers (1, 2, and 3) 1009, 1010, and 1011, a print site ID 1012, an order date/time 1013, and an order status 1014 are saved using an order number 1001 issued for each print order as a key. As the order status 1014, "0" represents that order giving to the print site has not been done yet (default value), "1" represents that order giving to the print site has already been done, and "2" represents that delivery has already been done.

FIG. 47 is a view showing an order image data table managed in the photo site 105 according to this embodiment.

When an album print order is placed, order image data tables 1100 are generated in correspondence with notified images as records equal in number to the images, and registered and managed in the image database 117. The order image data table 1100 manages a reception number 1102 of the print site 109, an image number 1103 managed for each print order, file paths 1104, 1105, and 1106 to thumbnail images, original images, and preview display images, which are copied for print order, a number 1107 of prints, a print size 1108, a print type 1109, and an image ID 1110 are managed by using an order number 1101 as a key. As the print size 1108, "1" represents the L size, "2" represents the 2L size, "3" represents the official postcard size, "4" represents an unofficial postcard size, and "5" represents the A4 size. As the print type 1109, "0" represents a print with a border, and "1" represents a print without border. For the same order, the order number 1101 stores the same value as that of the order number 1001. The image ID 1110 is the image ID before copy and holds the same value as that of the image ID 901.

FIG. 48 is a view showing an order settlement data table managed in the photo site 105 according to this embodiment.

When an album print order is placed, an order settlement data table 1200 is generated as one record corresponding to one order, and registered and managed in the image database 117. The order settlement data table 1200 manages a settlement method 1202, a total fee 1203, a print fee 1204, a print fee tax 1205, a transportation charge 1206, a transportation charge tax 1207, and a status 1208 by using an order number 1201 as a key. As the settlement method 1202, "1" represents remittance, "2" represents cash on delivery, "3" represents credit card payment, and "4" represents settlement agency at a shop. In this embodiment, the flow will be described only for the settlement agency at a shop "4". As the status 1208, "0" represents that payment order is unsettled (default value), "1" represents outstanding order is pending, and "2" represents that settlement is completed. For the same order, the order number 1201 stores the same value as that of the order number 1001.

FIG. 49 is a view showing an orderer data table managed in the photo site 105 according to this embodiment.

When an album print order is placed, an orderer data table 1300 is generated as one record corresponding to one order, and registered and managed in the image database 117. The orderer data table 1300 manages a user ID 1302, a notification mail address 1303, a name (family name) 1304, a name (first name) 1305, a phonetic transcription (family name) 1306, a phonetic transcription (first name) 1307, postal codes (1 and 2) 1308 and 1309, a prefecture code 1310, addresses (1 and 2) 1311 and 1312, and telephone numbers (1, 2, and 3) 1313, 1314, and 1315 by using an orderer ID 1301 as a key. When the print orderer is not a registered user of the photo site, "0" is substituted into the user ID 1302. For the same order, the orderer ID 1301 stores the same ID as that of the orderer ID 1002. When the orderer is a member of the photo site, the user ID 1302 and user ID 401 store the same ID representing the same orderer. In this case, the values input to corresponding pieces of user information in the customer information data table 400 having the same user ID 401 are copied to the user information 1303 to 1315.

FIG. 50 is a view showing a print site data table managed in the photo site 105 according to this embodiment.

This embodiment will be described by exemplifying one print site. However, every time a new print site connectable to the photo site 105 is created, a print site data table 1400 is generated as a new record corresponding to the print site, and registered and managed in the image database 117. The print site data table 1400 manages a provider name 1402 and a URL 1403 to a print order notification CGI by using a print site ID 1401 as a key.

<Operation of Photo Site>

FIG. 10 shows the entire operation in the photo site 105 and, more particularly, an operation for access from a PC.

First, in step S101, access from the user is waited. When an access request from a PC is received, the initial window (FIG. 11) is displayed in step S102. When an instruction from the user is input in response to the initial window, it is determined in steps S104, S106, S108, and S110 whether "user registration" is selected, "login" is selected, "album browsing" is selected, and "print order" is selected. For "user registration", user registration processing is executed in step S105. For "login", login processing is executed in step S107. For "album browsing", album browsing processing is executed in step S109. For "print order", print order processing is executed in step S111.

When each processing is ended, or when no processing is executed, it is determined in step S112 whether site access is to be ended. If NO in step S112, the flow returns to step S102 to display the initial window again. When an end instruction is received, the service is ended.

The detailed service of the application server 203 for the PC 102 will be described below. In the following description, the user PC 102A executes upload (saving of images), and the user PC 102B or the portable terminal 113A or 113B executes image browsing.

(Top Page)

Figure 11:
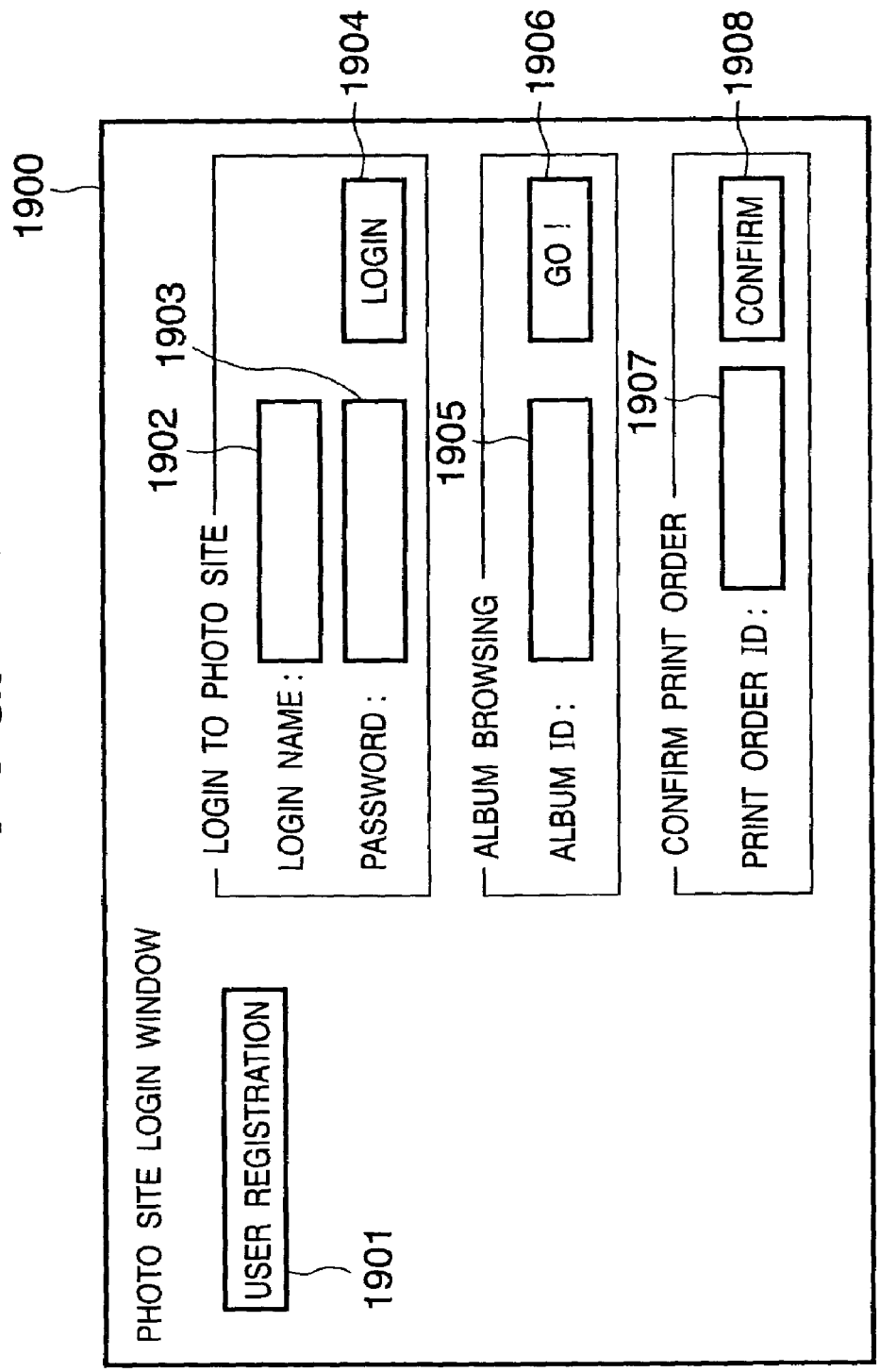
FIG. 11 is a view showing a window displayed when a server service is started from the photo site according to the embodiment of the present invention.

FIG. 11 shows the initial window displayed first when a user is going to receive the service of the photo site 105 according to this embodiment.

The storage section of the photo site 105 stores HTML data to display a window 1900. The HTML data can freely be downloaded through the Internet 104. Hence, when the user PC 102A activates the web browser and designates a URL representing the address of the web server of the photo site 105, the window 1900 shown in FIG. 11 is displayed.

A user registration button 1901, an input region 1902 for a login name that is used by the registered user to use the photo site 105, a password input region 1903, a login button 1904, an album ID input region 1905 for album browsing, an album browsing button 1906, a print order ID input region 1907 for print order status confirmation, and a print order confirmation button 1908 are laid out in the window 1900.

Processing executed when the user clicks on each button in the window 1900 will be described below.

(User Registration)

Figure 12:
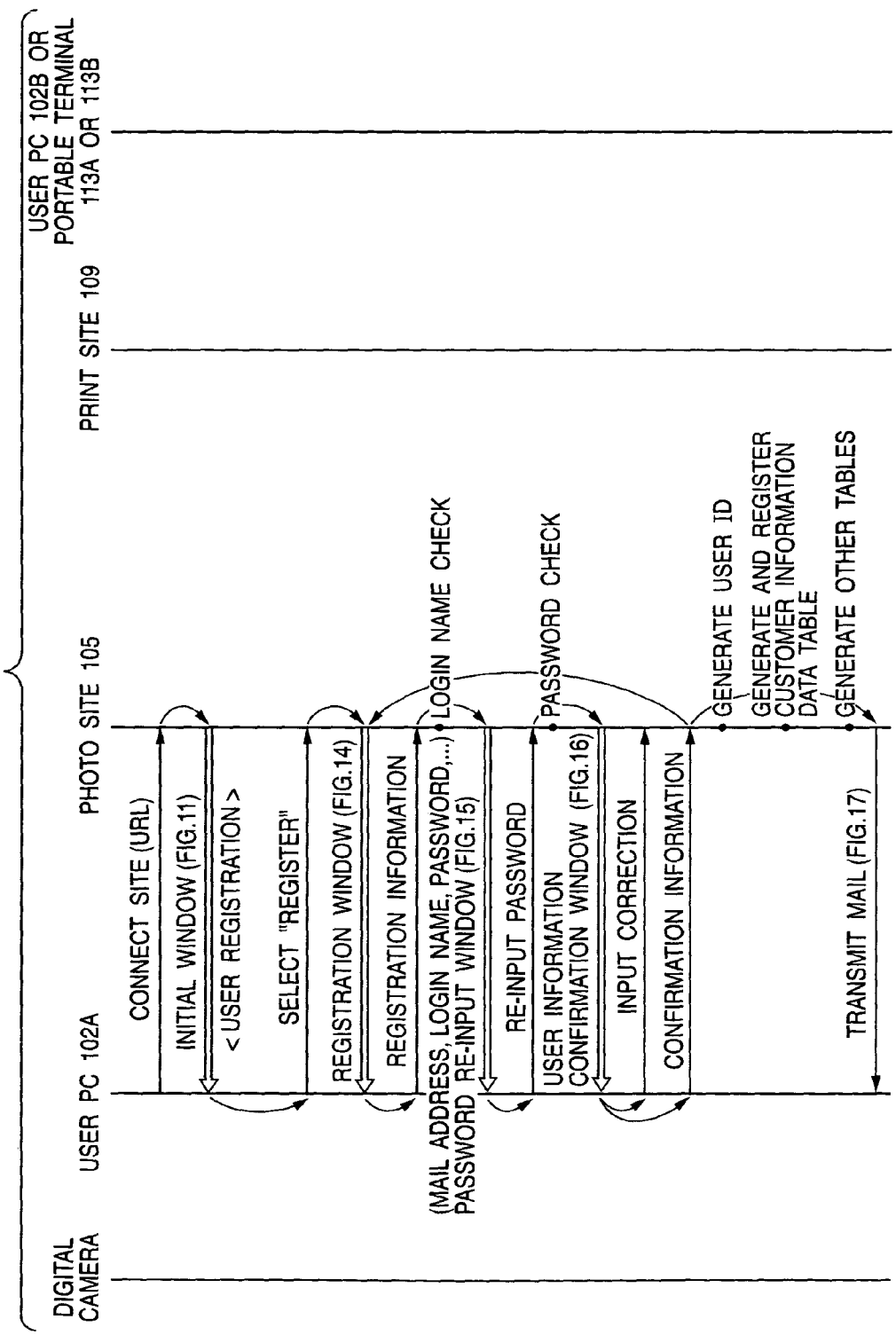
FIG. 12 is a chart showing communication when user registration is executed from a user PC to the photo site according to the embodiment of the present invention.

Procedures of user registration will be described first. FIG. 12 is a chart showing communication between the user PC 102A and the photo site 105 at the time of user registration of this embodiment.

Figure 13:
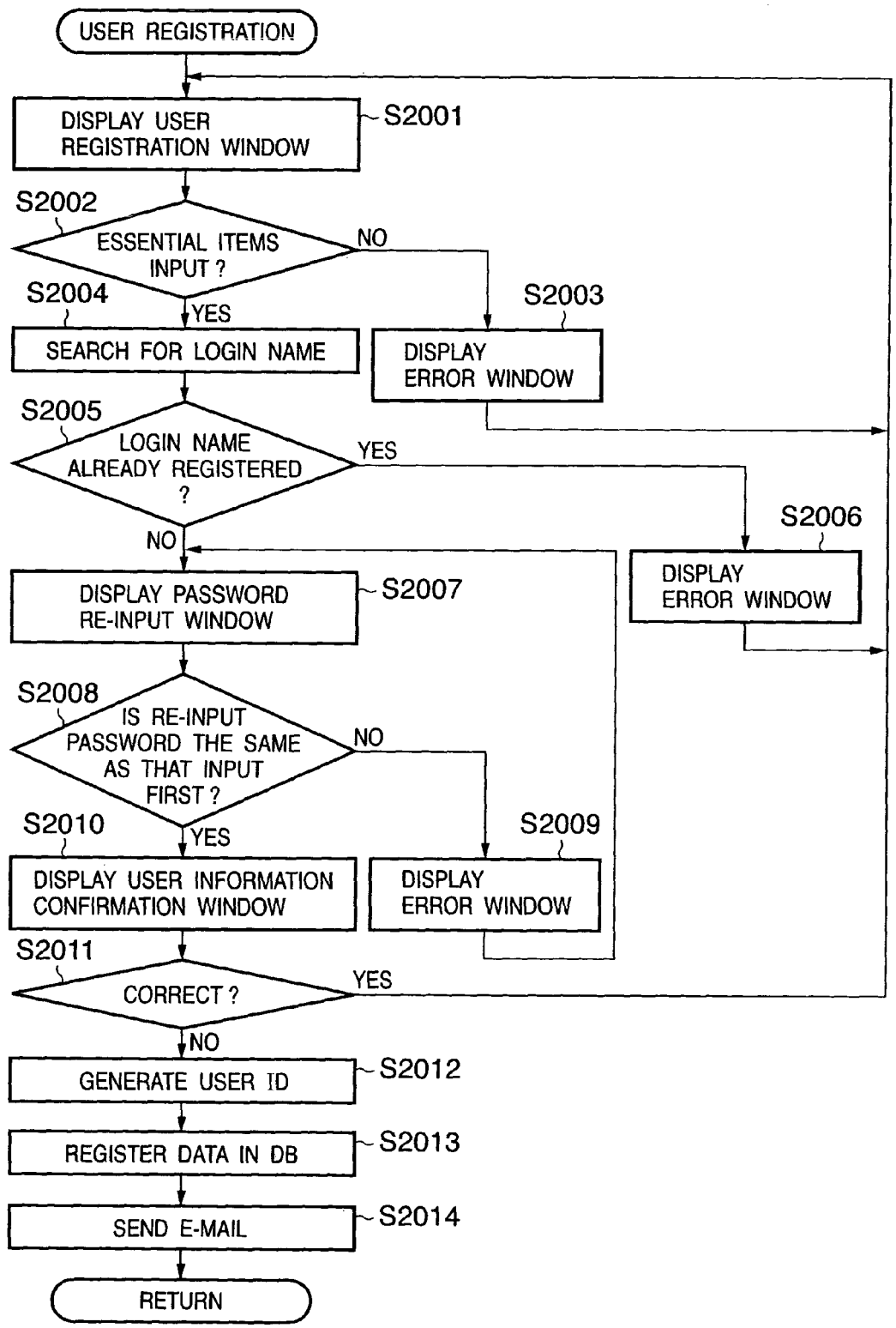
FIG. 13 is a flow chart showing the processing of the photo site at the time of user registration in the embodiment of the present invention.

When the user registration button 1901 in the window 1900 is clicked on, processing is executed in accordance with the flow chart shown in FIG. 13 which shows the processing of the photo site 105 at the time of user registration. When the user registration button 1901 is clicked on in the window 1900, a window 2100 shown in FIG. 14 is displayed, and user registration is started (step S2001).

Figure 14:
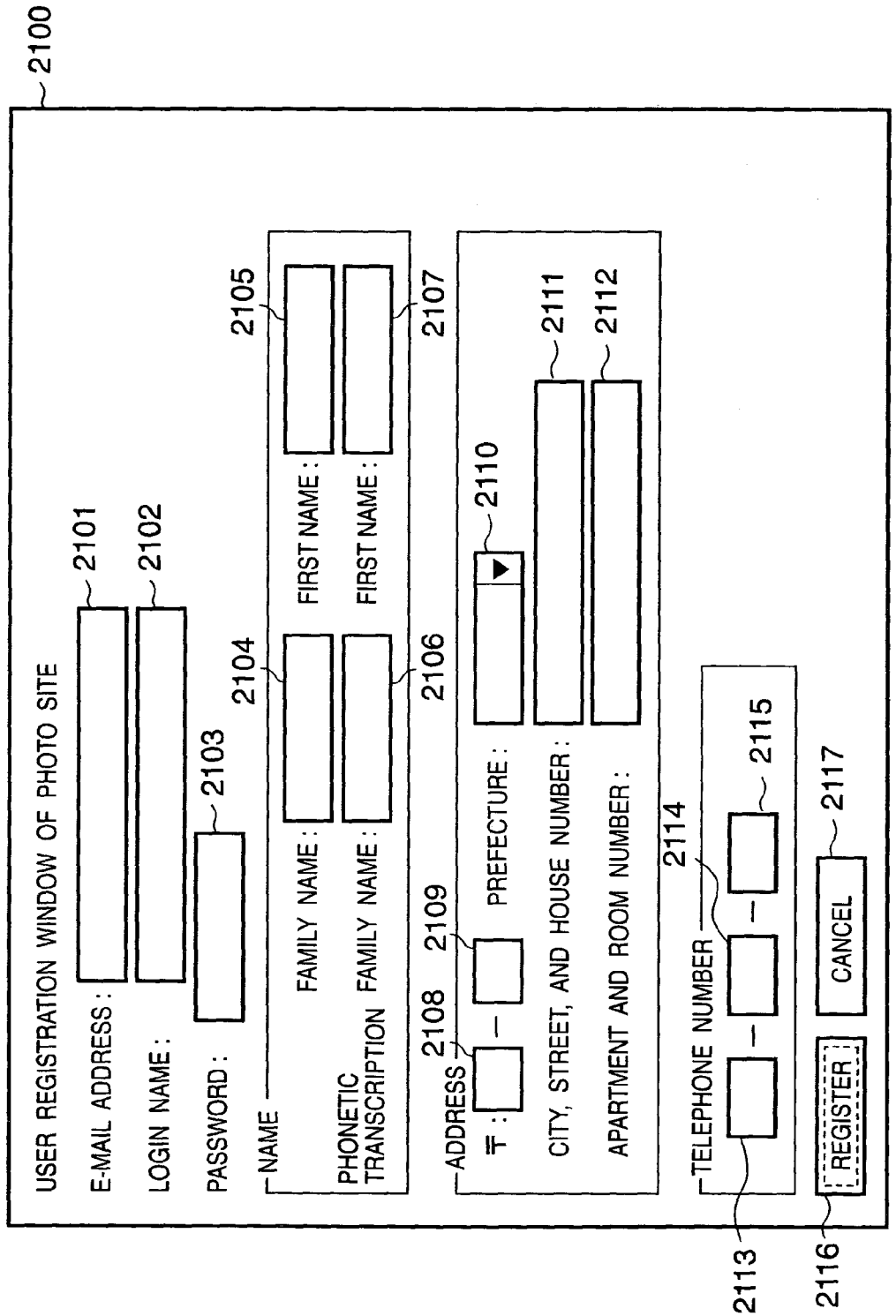
FIG. 14 is a view showing a window in which user registration is executed in the embodiment of the present invention.

The window 2100 shown in FIG. 14 is a window for user registration in this embodiment. The window 2100 has an input region 2101 for the notification mail address of the user to be registered, an input region 2102 for the user's login name, a password input region 2103, name input regions 2104 and 2105, phonetic transcription input regions 2106 and 2107, input regions 2108 and 2109 for the postal codes of the user to be registered, a prefecture selection region 2110, address input regions 2111 and 2112, and telephone number input regions 2113, 2114, and 2115. When a cancel button 2117 is clicked on, the user registration processing is not executed, although not illustrated in FIG. 13. The window returns to the window 1900.

When a "register" button 2116 is clicked on, it is checked in step S2002 whether essential items are input. In this embodiments, the essential items are the mail address 2101, login name 2102, password 2103, names (2104 and 2105), and telephone numbers 2113, 2114, and 2115. When it is determined by the photo site 105 that some essential items are not input, an error window is displayed in step S2003.

When it is determined in step S2002 that all the essential items are input, the photo site 105 searches the customer information data table 400 in the database 208 (step S2004) and determines whether the login name input to the input region 2102 has already been used (step S2005). When the login name input to the input region 2102 has already been used, an error window is displayed in step S2006.

Figure 15:
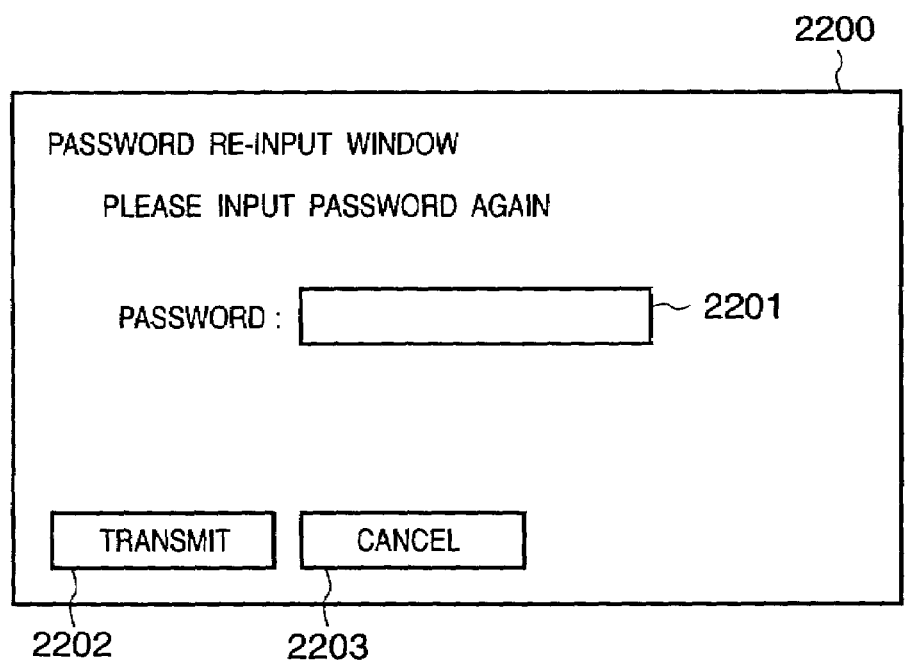
FIG. 15 is a view showing a window in which a password is re-input in the embodiment of the present invention.

When the login name input to the input region 2101 is not found in the database 208, a display window 2200 shown in FIG. 15 is displayed to prompt to re-input the password (step S2007). A password input region 2201, a "password transmission instruction" 2202, and a "cancel" 2203 are displayed in the display window 2200 shown in FIG. 15. In canceling, the registration processing is interrupted, although not illustrated in FIG. 13, and the window 2100 is displayed. It is determined in step S2008 whether the password input to the password input region 2201 has the same characters as those input to the password input region 2103 in the window 2100. If NO in step S2008, an error window is displayed (step S2009).

Figure 16:
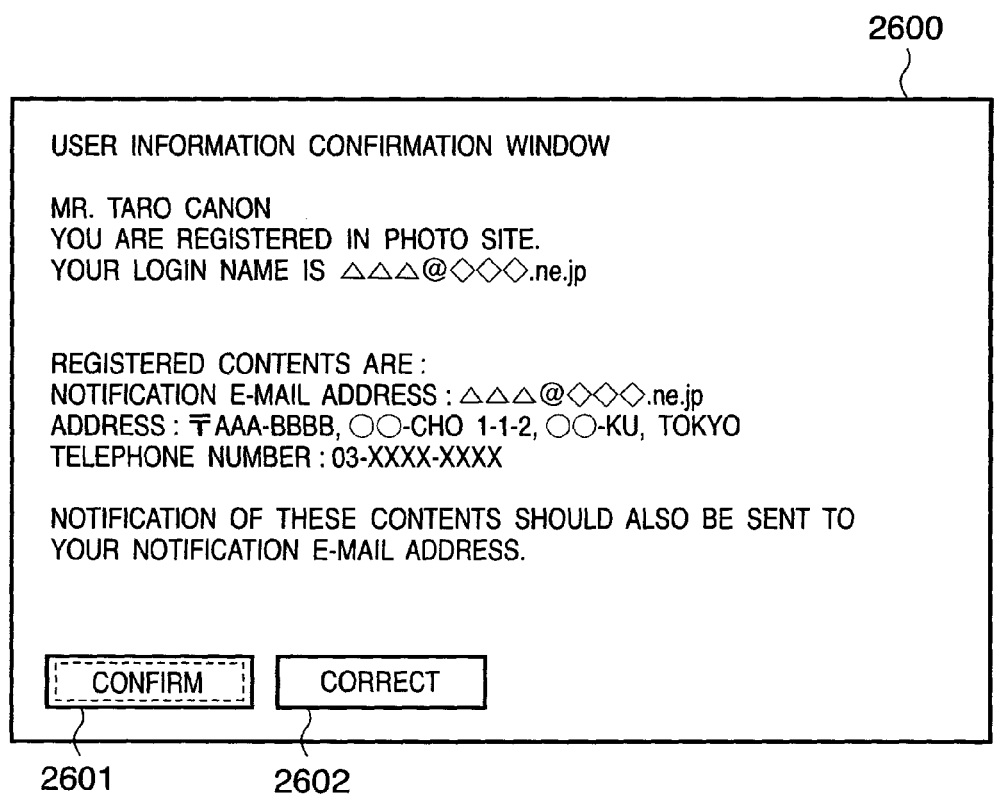
FIG. 16 is a view showing the user registration confirmation window of the photo site according to the embodiment of the present invention.

If YES in step S2008, the flow advances to step S2010. Since it is determined that all pieces of information necessary for user registration are input, a user information confirmation window 2600 shown in FIG. 16 is displayed. The pieces of information input by the user in the window 2100 are displayed in the user information confirmation window 2600. When a "correct" button 2602 is clicked on, the flow returns to step S2001 to display the window 2100 again so that the user can edit the input information.

When an "OK" button 2601 is clicked on, the maximum value of user IDs issued in the past is acquired from the customer information data table 400 in the database 208. A value obtained by adding 1 to the maximum value is issued as the user ID of the user to be newly registered (step S2012).

In step S2013, a new customer information data table 400 is generated on the basis of the user ID obtained in step S2012. The pieces of information input in the window 2100 are registered in the customer information data table 400. More specifically, the contents of the input region 2101 shown in FIG. 14 are stored in the region 402 shown in FIG. 4. The contents of the input region 2102 are stored in the region 403. The contents of the input region 2103 are stored in the region 404. The contents of the input region 2104 are stored in the region 405. The contents of the input region 2105 are stored in the region 406. The contents of the input region 2106 are stored in the region 407. The contents of the input region 2107 are stored in the region 408. The contents of the input region 2108 are stored in the region 409. The contents of the input region 2109 are stored in the region 410. The contents of the input region 2110 are stored in the region 411. The contents of the input region 2111 are stored in the region 412. The contents of the input region 2112 are stored in the region 413. The contents of the input region 2113 are stored in the region 414. The contents of the input region 2114 are stored in the region 415. The contents of the input region 2115 are stored in the region 416. In addition, "1" is set as the user registration state 417.

In a new user registration state, neither albums not uploaded images created by the user are present. At the time of new registration, each of the customer album data table 600 shown in FIG. 6 and the album information data table 700 shown in FIG. 7 may be generated as one record and registered in the database 208. In this case, a value obtained by adding 1 to the maximum value of album IDs issued so far in the database 208 is stored as the album ID 602. The display order number 603 is set to "1". As the album name 702, for example, "my album" is set as a default value for a temporary album title. In addition, initial values determined in the photo site 105 are set in the album information data table 700.

When registration in the database 208 is ended, an e-mail text having the same contents as those displayed in the user information confirmation window 2600 shown in FIG. 16 is created. The e-mail is issued to the e-mail address registered in the customer information data table 400 shown in FIG. 4 (step S2014). FIG. 17 shows an example of the contents of the e-mail issued at this time.

(Login)

Procedures for causing the user registered in the photo site 105 to receive the actual service of the photo site 105 will be described next. In this embodiment, all user's images are managed in folders named albums in the photo site 105.

In the window 1900; the user inputs the login name and password to the login name input region 1902 and password input region 1903 and clicks on the login button 1904. In the photo site 105, the customer information data table 400 is searched in the database 208. If the login name is not found in the customer information data table 400, or the password of the found record does not coincide with the character string input to the password input region 1903, a warning window is displayed.

When the password of the found record coincides with the character string input to the input region 1903, it is determined that the photo site input user is normally authenticated. In this case, a window 2900 (this window will also be referred to as a main menu hereinafter) shown in FIG. 18 is displayed.

In the window 2900, a button 2901 is a user information change button. A button 2902 is a logout button. In a region 2903, buttons to be used for editing operation for an album displayed in this window are laid out. A button 2904 is a button to be used to set the properties of an album. A button 2905 is an album notification button. A button 2906 is a button to be used to create a new album. A button 2907 is a button to be used to delete an album. A button 2908 is a button to be used to upload images. A button 2909 is a print order button. A region 2910 is a region where buttons for album selection are displayed. At the uppermost position of this region, the size of image which the user are saving on the photo site and the ratio of the image size to the available capacity. On the lower side of this portion, buttons equal in number to albums created by the user are laid out.

Figure 18:
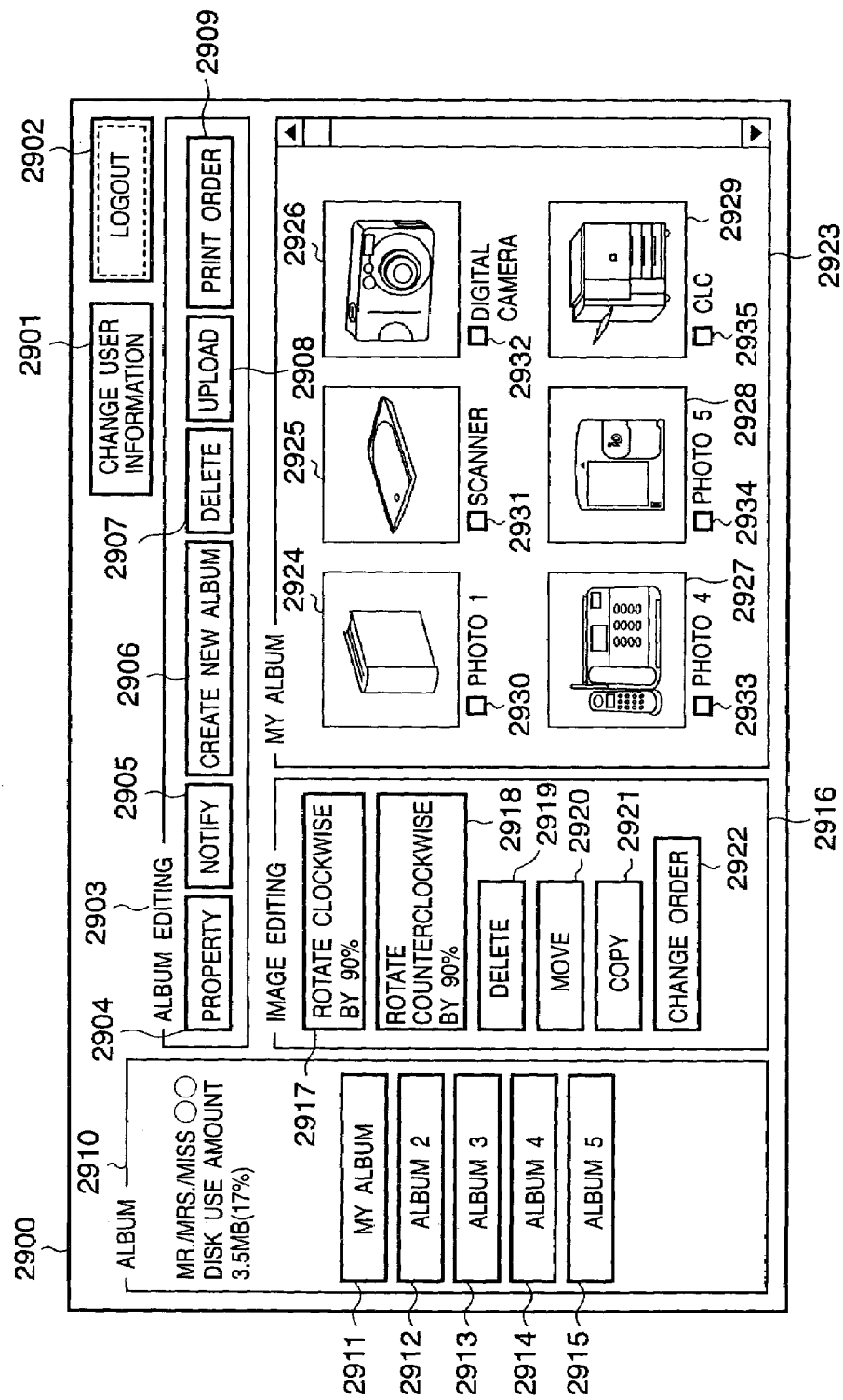
FIG. 18 is a view showing a window that is displayed when the user is normally login-authenticated in the photo site according to the embodiment of the present invention.

Referring to FIG. 18, it can be confirmed from buttons 2911 to 2915 that the user has created five albums. When one of the buttons is clicked on, the photo site 105 changes the images displayed in an album display region 2923 in accordance with the selected album and displays the album name of the album at the upper left corner of the album display region. A region 2916 is a region where buttons to be used to edit each image in the album are laid out. When one of buttons 2917 to 2922 is clicked on, editing processing corresponding to the button is executed for each of the images having checked boxes and displayed in the region 2923. The region 2923 is an album image display region. In this region, images stored in the album are sequentially displayed, and check boxes are laid out in correspondence with the images. When one of the images is clicked on, the property setting window of the image is displayed.

Figure 19:
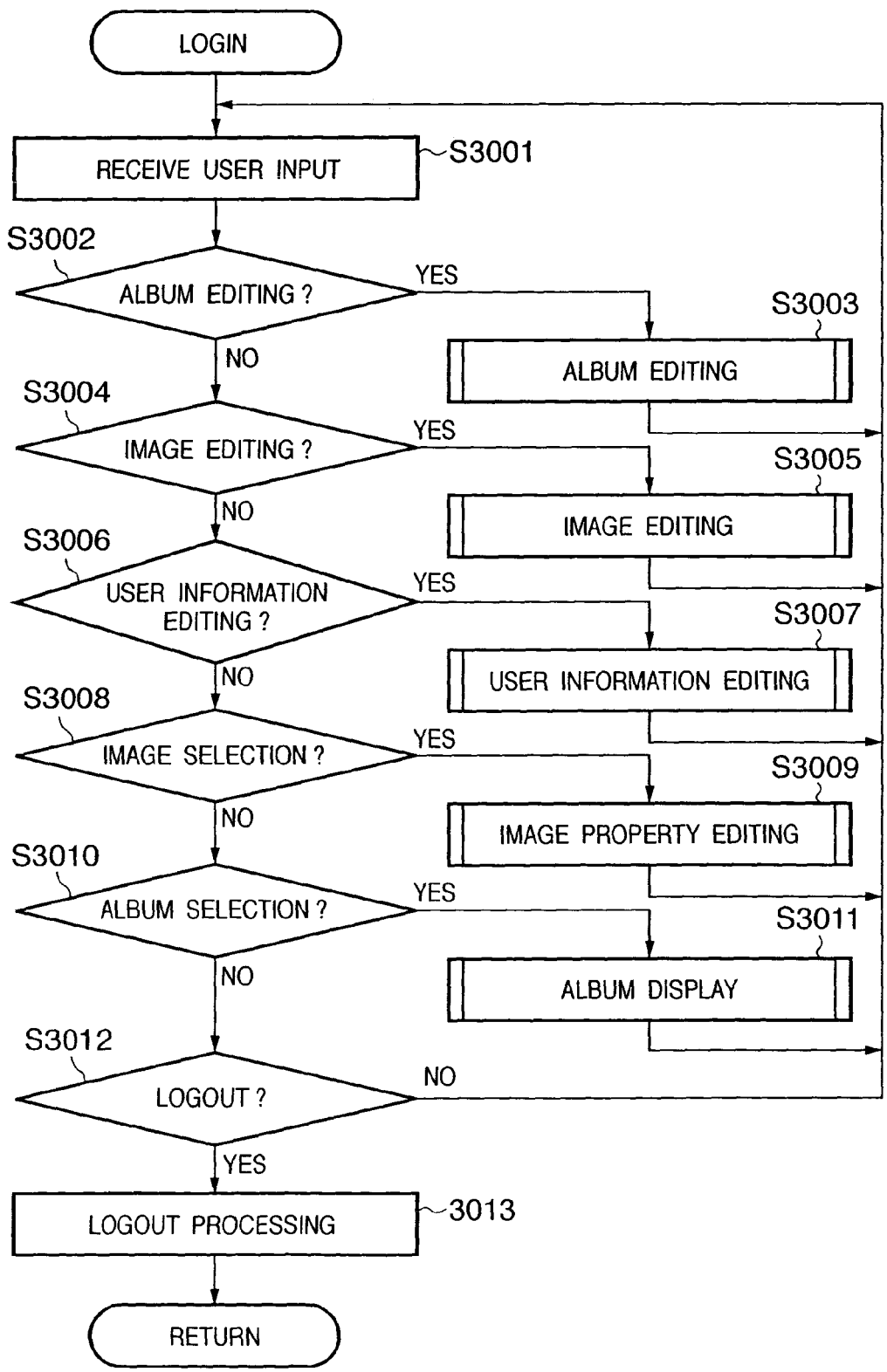
FIG. 19 is a flow chart showing processing related to a user editing operation in the photo site according to the embodiment of the present invention.

FIG. 19 is a flow chart showing a processing method related to a user editing operation after the window 2900 shown in FIG. 18 is displayed. The following processing is executed in correspondence with a user operation in the window 2900.

When user input is received in step S3001, it is determined in step S3002 whether the user input is album editing. When a button in the region 2903 of the window 2900 is clicked on, it is determined that the user input is album editing. In this case, the flow advances to album editing processing in step S3003.

If NO in step S3002, the flow advances to step S3004 to determine whether the user input is image editing. When a button in the region 2916 of the window 2900 is clicked on, it is determined that the user input is image editing, and the flow advances to step S3005. In step S3005, processing such as 900 right/left rotation, delete, move, copy, or order change is executed for an image selected in the album in correspondence with click of a button in the region 2916 shown in FIG. 18.

If NO in step S3004, the flow advances to step S3006 to determine whether the user input is user information editing. When the button 2901 in the window 2900 is clicked on, it is determined that the user input is user information editing. When this button is clicked on, the window 2100 shown in FIG. 14 is displayed in step S3007 so that the user can change the registered information. The user information editing processing at this time is almost the same as the user registration processing described in the section (User Registration). Different points are that the pieces of information registered by the user are displayed as initial values when the window is displayed, the window displayed when the "register" button 2116 or cancel button 2117 is clicked on is the window 2900, and user information registration to the database is not new registration but updating of existing user information.

If NO in step S3006, the flow advances to step S3008 to determine whether the user input is image selection. When the user selects an image by mouse click on an image in the region 2923 of the window 2900, it is determined that image selection is done. Then, the flow advances to image property editing processing in step S3009. As the image property editing processing, the image file name or comment can be edited.

If NO in step S3008, the flow advances to step S3010 to determine whether the user input is album selection. When a button in the region 2910 of the window 2900 is clicked on, it is regarded that album selection is done, and album display processing in step S3011 is executed.

If NO in step S3010, it is determined in step S3012 whether the user input is logout. When the button 2902 in the window 2900 is clicked on, it Is determined that the user input is logout. The flow advances to step S3013 to execute logout processing. When the logout processing is to be executed, the photo site 105 registers and updates the album ID of the album that is currently being displayed to the final display album ID 502 of the user state table 500 in the database 208. After that, the display window is returned to the window 1900.

If NO in step S3012, the flow returns to step S3001 to wait for the next user input.

Step S3003 (album editing) and step S3011 (album display) will be described below in detail.

(Album Editing)

Figure 20:
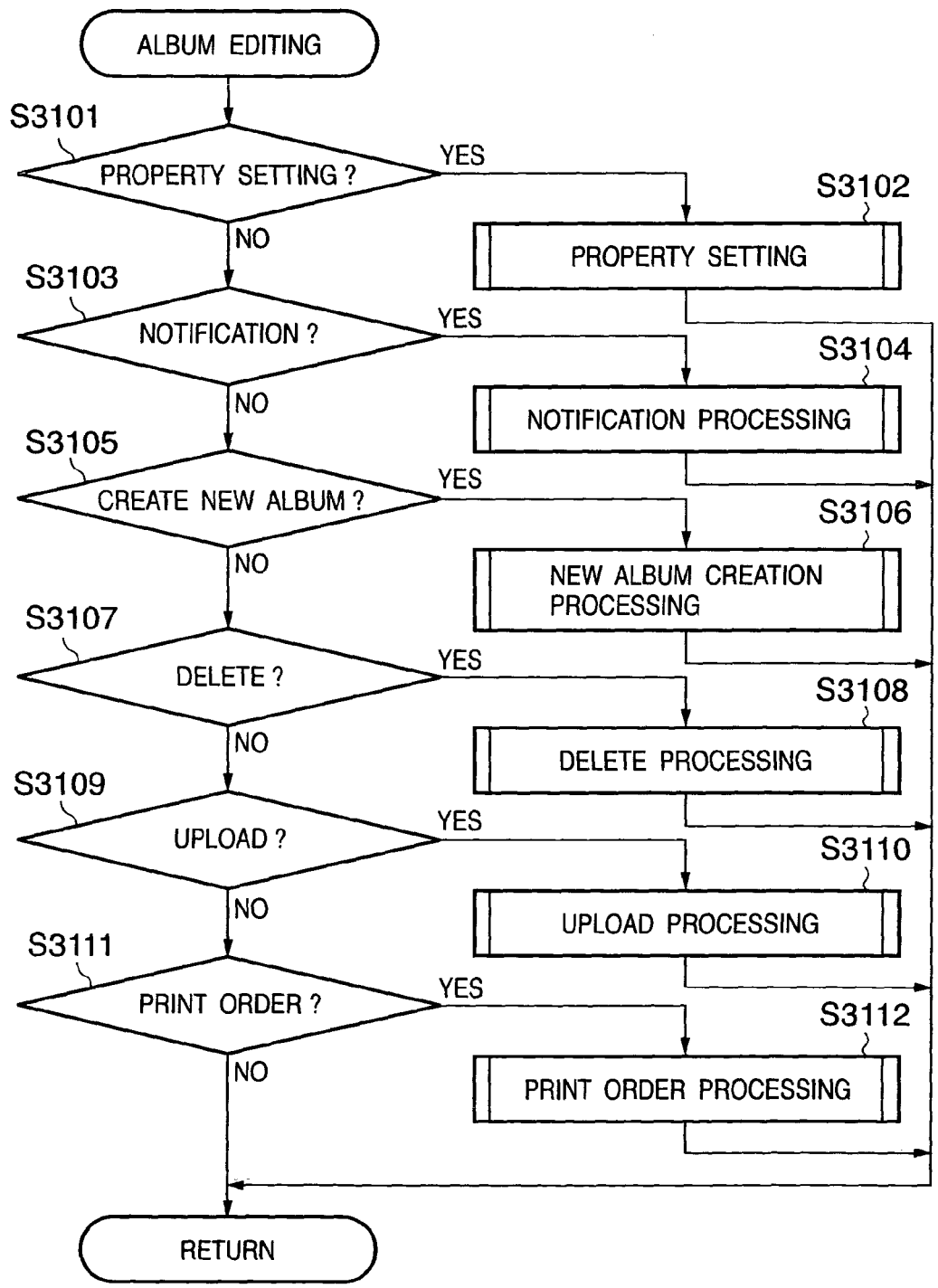
FIG. 20 is a flow chart showing the procedures of album editing processing in the photo site according to the embodiment of the present invention.

FIG. 20 is a flow chart showing the procedures of album editing processing in the photo site 105.

Figure 22:
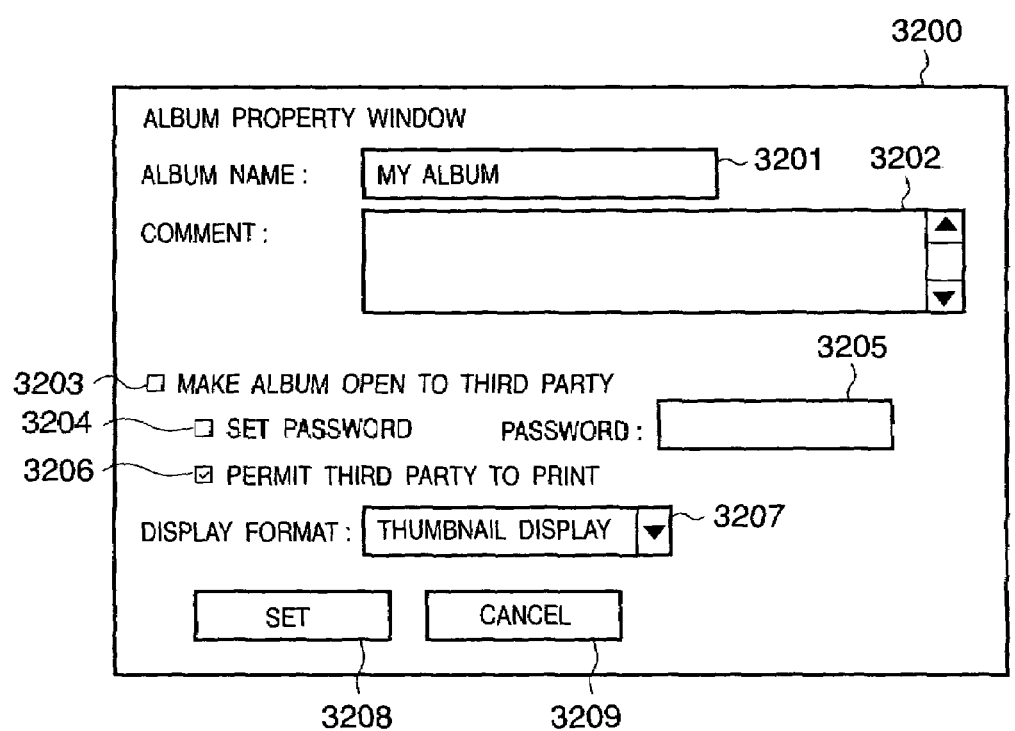
FIG. 22 is a view showing the album property setting window of the photo site according to the embodiment of the present invention.

It is determined in step S3101 whether property setting is to be executed. When the button 2904 in the window 2900 is clicked on, it is determined that property setting is selected, and the flow advances to step S3102. A window 3200 shown in FIG. 22 is displayed so that various attributes can be set for the selected album (the album that has been displayed in the region 2923 shown in FIG. 18 immediately precedingly).

Figure 29:
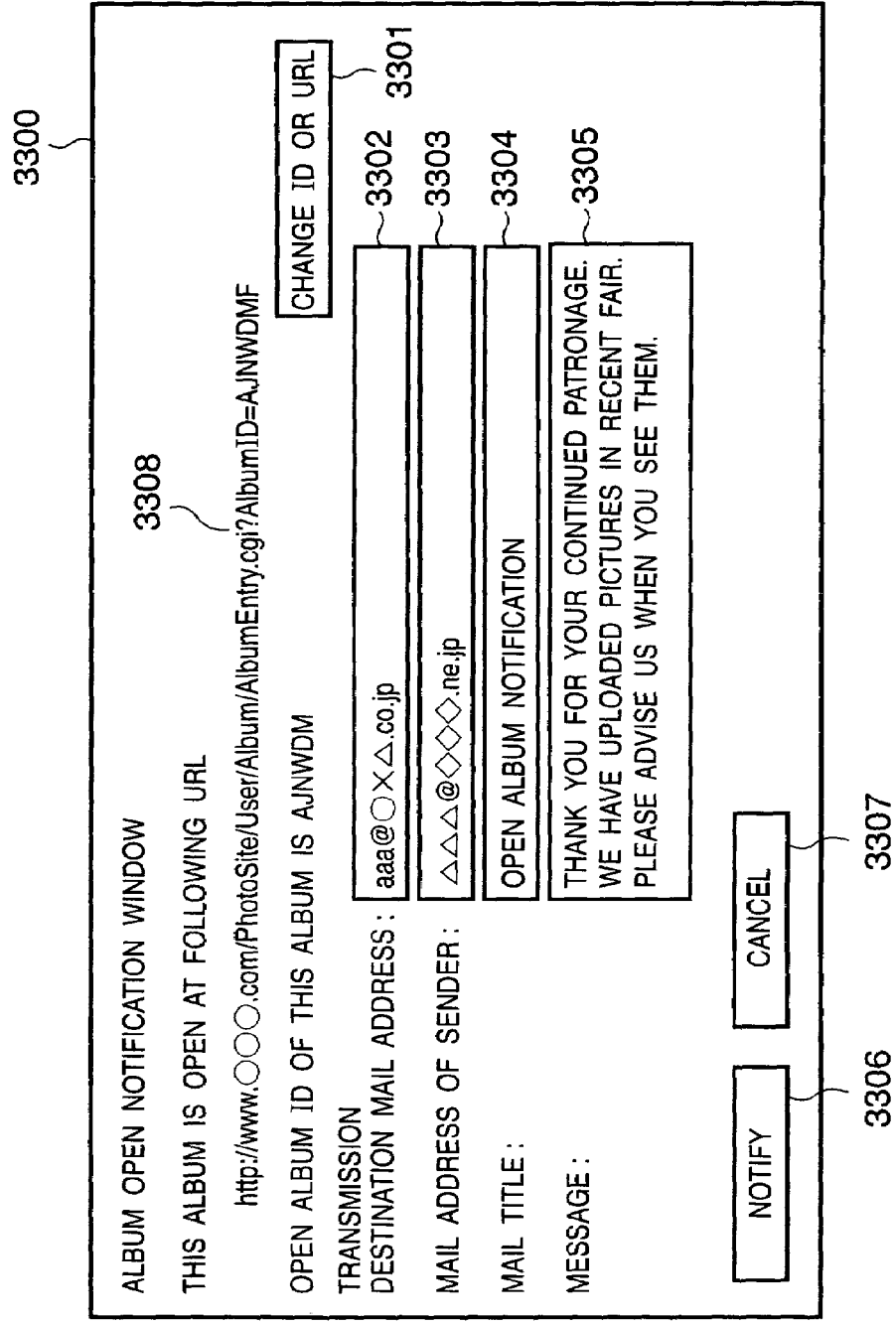
FIG. 29 is a view showing an album e-mail notification setting window of the photo site according to the embodiment of the present invention.

If NO in step S3101, the flow advances to step S3103 to determine whether album notification is to be performed. When the button 2905 in the window 2900 is clicked on, it is determined that album notification is selected, and the flow advances to step S3104. A window 3300 shown in FIG. 29 is displayed. Setting can be executed to notify by e-mail a third party of a method of browsing the selected album.

If NO in step S3103, it is determined in step S3105 whether a new album is to be created. When the button 2906 in the window 2900 is clicked on, it is determined that new album creation processing is selected, and the flow advances to step S3106. The same window 3200 as in FIG. 22 is displayed. When a new album name (an album name that is not registered by the login user yet) is input to an input region 3201 of the album name in the window 3200, and a "set" button 3208 is clicked on, a new album is created.

Figure 23:
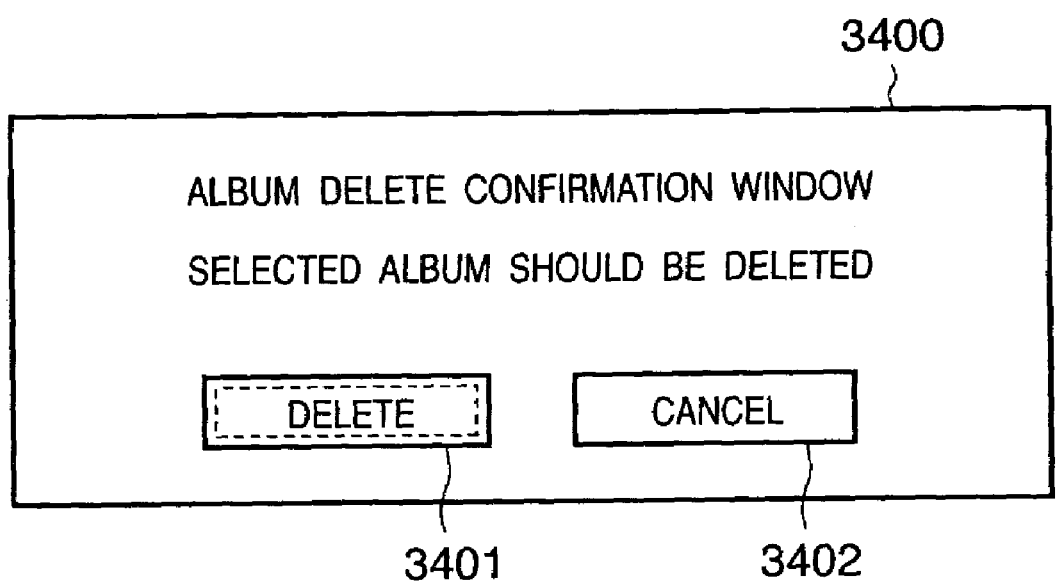
FIG. 23 is a view showing the album delete conformation window of the photo site according to the embodiment of the present invention.

If NO in step S3105, it is determined in step S3107 whether album deletion is to be executed. When the button 2907 in the window 2900 is clicked on, it is determined that album deletion is selected, and the flow advances to step S3108. When the button 2907 is clicked on, a window 3400 shown in FIG. 23 is displayed so that the selected album can be deleted.

If NO in step S3107, it is determined in step S3109 whether image upload to the currently selected album is to be executed. When the button 2908 in the window 2900 is clicked on, it is determined that image upload is selected. The flow advances to step S3110 to execute upload processing.

If NO in step S3109, it is determined in step S3111 whether album print order is to be executed. When the button 2909 in the window 2900 is clicked on, it is determined that album print order is selected. The flow advances to step S3112 to execute print order processing.

Figure 21:
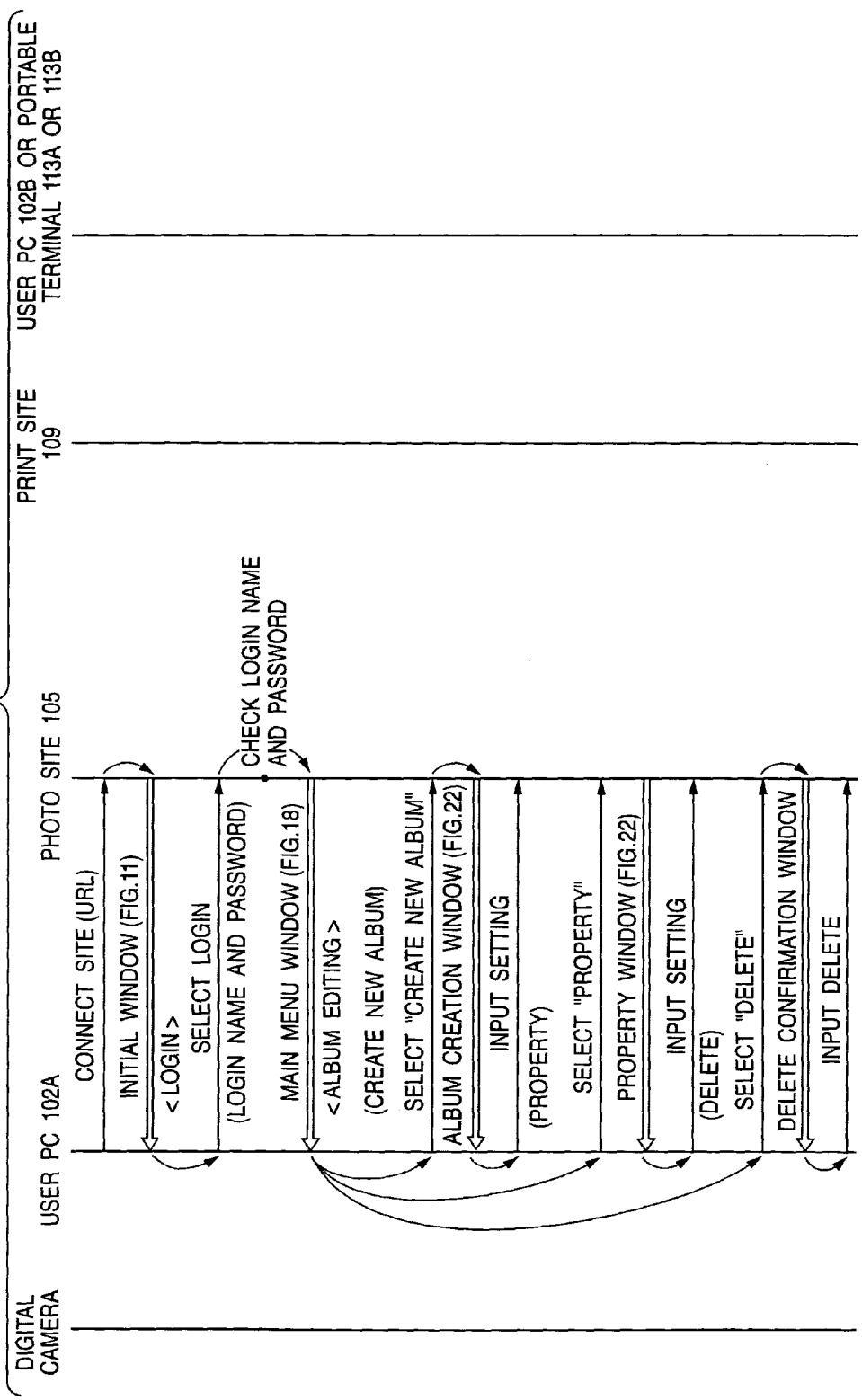
FIG. 21 is a chart showing communication when the user PC sends a new album registration, property setting, and delete instructions from the user PC to the photo site in the embodiment of the present invention.

FIG. 21 is a chart showing communication between the user PC 102A and the photo site 105 in new album creation, property setting, and delete processing according to the procedures shown in FIG. 20.

Figure 24:
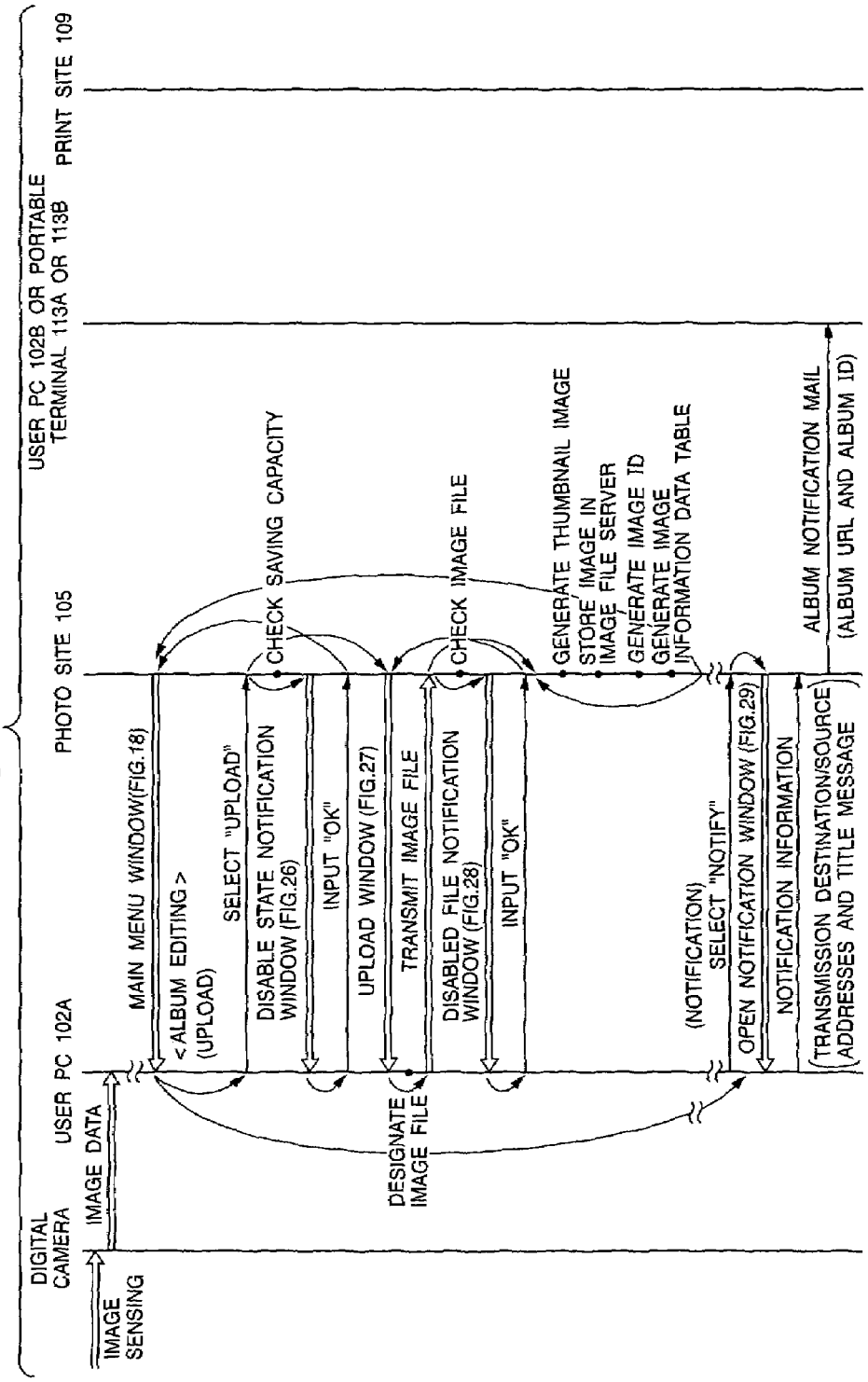
FIG. 24 is a chart showing communication when the user PC sends upload and browsing notification instructions from the user PC to the photo site in the embodiment of the present invention.

Of the above processes, upload and browsing notification will be described below in more detail. FIG. 24 is a chart showing communication between the user PC 102A and the photo site 105 in upload and browsing notification.

The print order processing in step S3112 will be described later in more detail in a section (Print Order).

(Image Upload)

Figure 25:
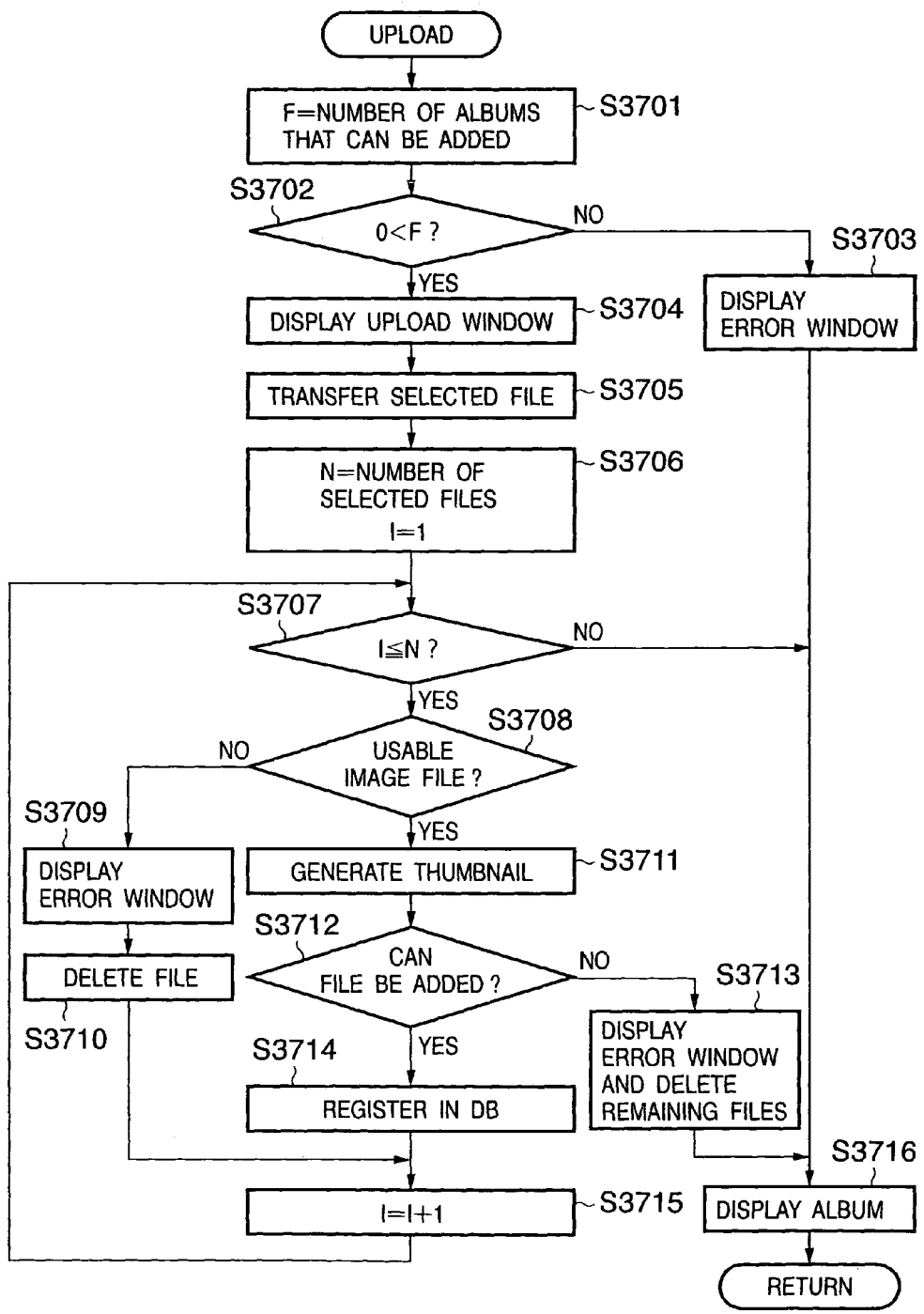
FIG. 25 is a flow chart showing procedures for uploading an image to an album that is currently being displayed and editing in the photo site according to the embodiment of the present invention.

Image upload processing for a selected album will be described. When the upload button 2908 in the window 2900 is clicked on, image upload processing is started. FIG. 25 is a flow chart showing the flow of processing for uploading an image to a selected album.

First, when the button 2908 in the window 2900 is clicked on, in step S3701, the photo site 105 calculates the number of files (Files) that the current login user can add to the photo site 105. Since the resources of the photo site 105 are limited, the storage capacity of images of each login user is limited. If the file size exceeds the capacity, no image files can be uploaded.

Figure 26:
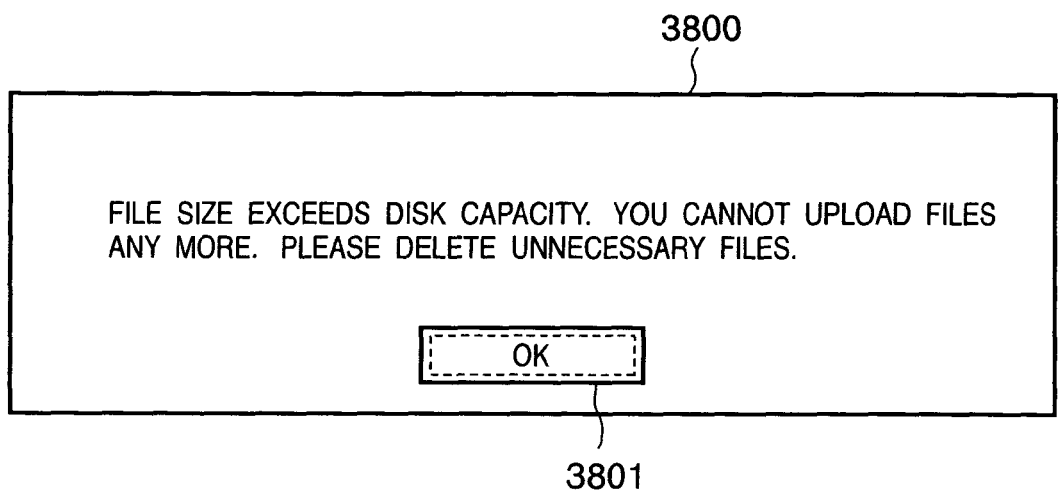
FIG. 26 is a view showing a warning window that indicates that upload is impossible in the photo site according to the embodiment of the present invention.

More specifically, it is determined in step S3702 whether Files has a positive value, thereby determining whether upload is possible. When Files is smaller than "1", it is regarded that upload is impossible, and a window 3800 shown in FIG. 26 is displayed (step S3703). When an OK button 3801 in the window 3800 is clicked on, the display returns to the window 2900.

Figure 27:
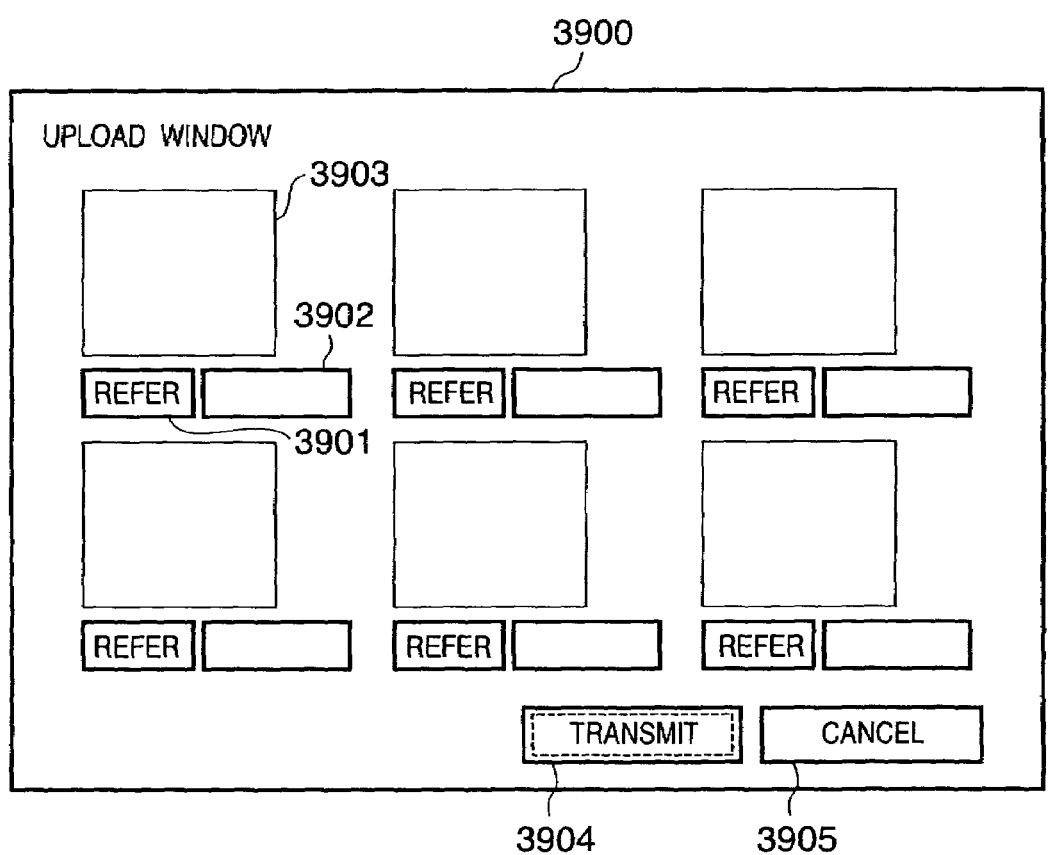
FIG. 27 is a view showing an upload image selection window according to the embodiment of the present invention.

When Files is 1 or more, an upload window 3900 shown in FIG. 27 is displayed in step S3704. In this window, reference buttons 3901 with which the user selects files on the user PC 102A, input regions 3902 to which files paths are input, and preview display regions 3903 in which the thumbnails of the selected images are displayed are displayed in numbers equal to the number (Files) calculated in step S3701. When a transmission button 3904 is clicked on, the flow advances to step S3705 to transfer the selected image files from the user PC 102A to the working area in the photo site 105. Although not illustrated in the flow chart shown in FIG. 25, when a cancel button 3905 is clicked on, the upload processing is ended, and the window 2900 is displayed.

The image files transferred to the photo site 105 are stored in the file server 209. Let N be the number of transferred files. A processing variable I is defined as "1" (step S3706). It is determined in step S3707 whether I<=N. If I>N, the window 2900 is displayed in step S3716, and the processing is ended.

Figure 28:
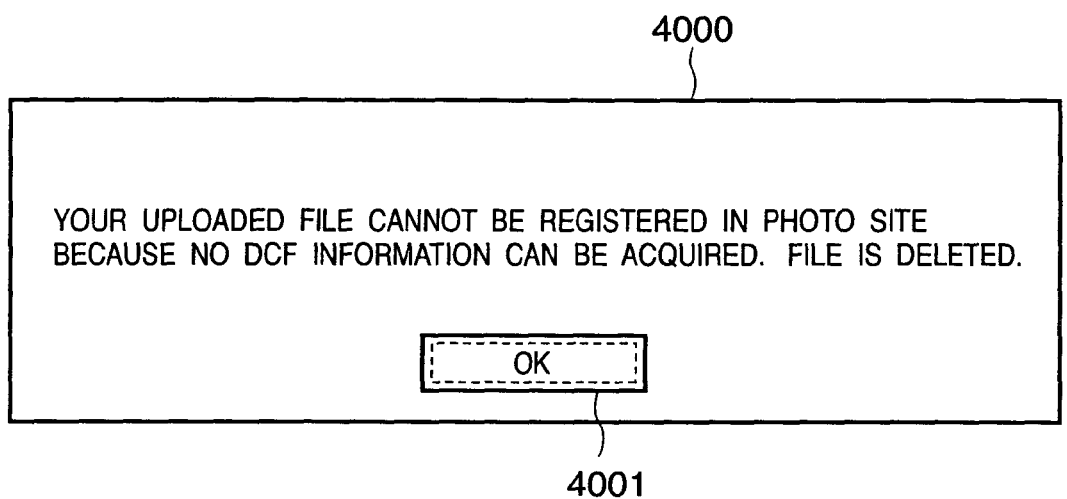
FIG. 28 is a view showing a warning window when a file that the photo site cannot cope with is uploaded in the embodiment of the present invention.

If I<=N in step S3707, it is determined in step S3708 whether the Ith transferred file is an image file that can be processed in the photo site 105. In this embodiment, only when the uploaded image is a JPEG file, and digital camera photographing information having a DFC format can be extracted from the header field, the image file is determined as usable in the photo site 105. Otherwise, a window 4000 shown in FIG. 28 is displayed in step S3709. In step S3710, the file loaded in the working area in the photo site 105 is deleted. The DFC information is used to execute color correction and the like for printing by using information such as a shutter speed or the presence/absence of use of an electronic flash when a print site 109A prints the image. When an OK button 4001 is clicked on, the flow advances to step S3715 to execute processing for uploading the next file.

When it is determined in step S3708 that the uploaded file is an image file having a predetermined format, the flow advances to step S3711. A thumbnail display image corresponding to the image is generated and stored from the working area in the photo site 105 to the image file server 209.

Next, it is determined in step S3712 whether the file can be added. This determination is done by determining whether the total data capacity should exceed the upper limit of usable disk capacity when the file under processing is registered. If NO in step S3712, the window 3800 shown in FIG. 26 is displayed in step S3713. All the image files in the working area in the photo site 105, which are not registered yet in the file server 209, are deleted. The window 2900 is displayed in step S3716.

If YES in step S3712, the image information is registered in the database 208 in step S3714. More specifically, the image information data table 900 shown in FIG. 9 is generated for the uploaded image file. As the image ID 901 of the added image, a value is generated by adding one to the maximum image ID registered so far. The file path is set in the original image file path 904. The file paths for the newly generated thumbnail image and display image are set in the thumbnail file path 905 and display image file path 906, respectively. In addition, "0" is set as the number 908 of times of browsing, and "0" is set as the number 909 of time of printing. The album image data table 800 is registered in which the album ID of the selected album is set in the album ID 801, the image ID is set in the image ID 802, and a value obtained by adding 1 to the number of images in the album is set in the image display number 803.

I is increment by one in step S3715. The flow returns to step S3707. While I is smaller than N, the processing in steps S3707 to S3715 is repeated. With this processing, the uploaded images are registered on the database as much as possible.

(Album Notification)

FIG. 29 is a view showing a window displayed when the notification button 2905 in the window 2900 is clicked on.

In the window 3300, the user inputs a transmission destination mail address 3302, a sender mail address 3303, a mail title 3304, and a message 3305 and then clicks on a "notify" button 3306. The photo site 105 combines the contents with a mail text created in the photo site 105 and issues album notification mail to the transmission destination mail address.

FIG. 30 shows an example of album notification mail. The URL and album ID contained in the notification mail are the same as the URL in the window 3300 and the contents displayed in an open album ID display region 3308. A user who has received the mail can browse the album by designating the URL described in the mail. He/she can also browse the same album as in the above case even by inputting the album ID described in the mail to the album ID input region 1905 of the window 1900 and clicking on the "GO!" button 1906. The value of the parameter "AlbumID=" described in the URL is the same as the album ID of the open album.

(Open Album ID Generation)

The ID of an open album will be described next. An open album ID is generated by encrypting the album ID managed in the photo site 105. Accordingly, it becomes difficult for a third party to imagine the original album ID 701 from the number or character string of the open album ID or estimate the open album ID of another album.

(Print Order from PC 102)

Figure 51:
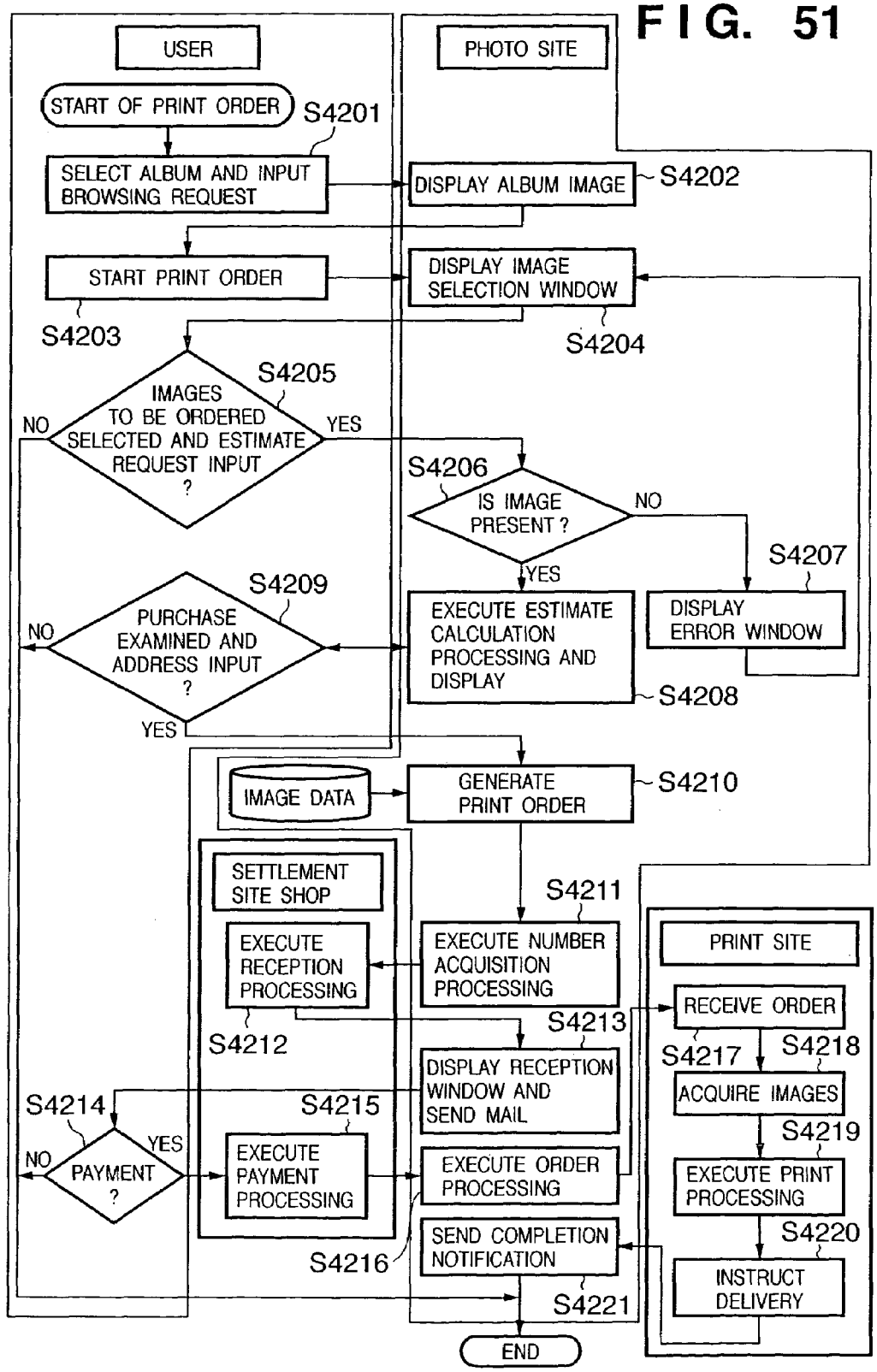
FIG. 51 is a flow chart showing the flow of processing among the client PC, the photo site, and the print site when a print order is to be placed using the photo site according to the embodiment of the present invention.

FIG. 51 is a flow chart showing the flow of processing among the user PC 102, the photo site 105, and the print site 109 when the user should place a print order by using the photo site 105. When the user clicks on the print order button 2909 in the window 2900, he/she can give an order for printing an image in an album selected in the photo site 105.

When the user inputs an album browsing request in step S4201, the photo site 105 reads out album images and presents them to the user PC 102 in step S4202. More specifically, images in an album corresponding to an album selection button in the album selection region 2910 of the window 2900 are displayed in the region 2923. In step S4203, the user inputs a print order instruction. The print order instruction is issued when the print order button 2909 in the window 2900 is clicked on.

Figure 52:
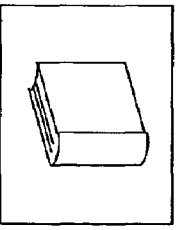
FIG. 52 is a view showing an image print order window according to the embodiment of the present invention.

When the print order instruction is issued, the flow advances to step S4204. The photo site 105 generates data that displays an image selection window 4400 shown in FIG. 52 and transmits the data to the user PC 102. In addition, the photo site 105 issues a new order number and generates a record for a new order in the order information table 1000 in the database 118. At this time, the order status 1014 is set to "0" (before an order is given to the print site).

The window 4400 has a selection region 4401 in which the print type (with or without border) of photos to be generated by the print site 109 is selected, a region 4402 in which the thumbnail images in the album are displayed, a selection region 4403 in which the print size is selected, an input region 4404 in which the number of prints is designated, an estimate request button 4405, and a cancel button 4406. The number of thumbnail image display regions 4402, the number of size selection regions 4403, and the number of print count input regions 4404 are the same as the number of image data.

In step S4205, the user selects images to be ordered from the order window 4400, inputs the sizes and the numbers of prints, and clicks on the estimate button 4405. The photo site 105 generates, in the order image data table 1100, records equal in number to the selected images and stores the input contents. The flow advances to step S4206. When no estimate request is input in step S4202, i.e., when the cancel button 4406 is clicked on in the window 4400, the processing is ended, and the display returns to the window 2900.

Figure 53:
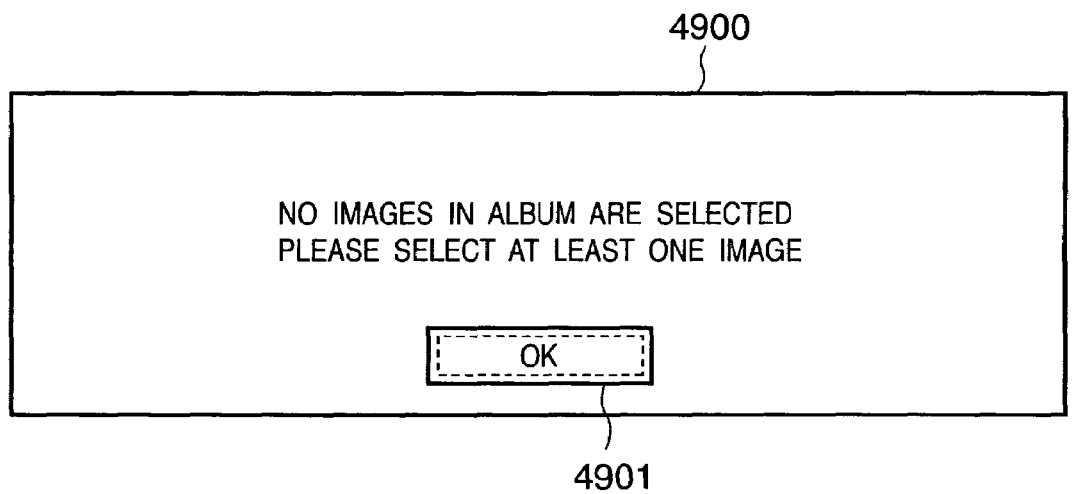
FIG. 53 is a view showing a warning window that is displayed when no images are selected at the time of image print order according to the embodiment of the present invention.

When an estimate request is input, it is confirmed first in step S4206 whether images to be printed are set. If NO in step S4206, data that displays an error window 4900 shown in FIG. 53 is generated and transmitted to the user PC 102 in step S4207. If YES in step S4206, calculation processing is executed in step S4208. Estimate data to be displayed in an estimate window 4500 shown in FIG. 54 is generated and transmitted to the user PC 102. In addition, a new record is generated in the order settlement data table 1200, and the calculated estimate data is stored in the record. At this time, the status 1208 is set to "0" (payment order is unsettled). The estimate amount may be derived either by calculation or by preparing a table that stores calculation results and reading out the amount from the table.

In step S4209, the user executes purchase examination processing. When the user confirms the price, the flow further advances to orderer information input shown in FIG. 55 and delivery destination input processing shown in FIG. 56. When a cancel button 4502, 4602, or 4702 is clicked on, the processing is ended. The photo site 105 generates a new record in the orderer data table 1300 and stores the input orderer information in the record. The photo site 105 also stores the input delivery destination information in the record in the order information table 1000 generated a little while ago.

In this embodiment, the transportation charge for delivery has a flat rate, and the flow described above is employed. If the charge changes depending on the delivery destination, it may be displayed before the estimate calculation processing in step S4209.

When the user places an order, pieces of information such as the image data to be printed in the photo site 105, the number of prints, the print format, the orderer information, the delivery destination, and the order amount are packaged into one file to generate a print order file in step S4210. After the print file is generated, the use amount is sent to the settlement site 120 in step S4211. In step S4212, the settlement site 120 executes processing for receiving the requested use amount and notifies the photo site 105 of the confirmation number. Upon receiving this notification, the photo site 105 changes the status 1208 of the corresponding record in the order settlement data table 1200 to "1" (outstanding order is pending).

Subsequently, in step S4213, the photo site 105 generates data that displays a window shown in FIG. 57 including the confirmation number and transmits the data to the user PC 102. The photo site 105 also sends mail shown in FIG. 58 to the user.

Upon acquiring the confirmation number, the user goes to the shop 121, presents the confirmation number, and pays the use amount in step S4214. The settlement site 120 that has received the money through the shop 121 executes receipts processing and sends a payment notification to the photo site 105 in step S4215. Upon receiving the payment notification, the photo site 105 executes receipts processing for changing the status 1208 in the corresponding record in the order settlement data table 1200 to "2" (settlement is completed). In addition, the photo site 105 sends the print order file prepared in step S4210 to the print site and issues a formal print order to the print site 109. The photo site 105 changes the status 1014 in the corresponding record in the order information table 1000 to "1" (order giving to the print site has already been done).

Upon receiving the formal print order, the print site 109 executes order reception processing in step S4217. In step S4218, the print site 109 executes image data print processing. When the print processing is ended, the print site 109 sends a delivery instruction and complete notification to the photo site 105 in step S4219. Then, the processing is ended. Upon receiving the notification, the photo site 105 changes the status 1014 in the corresponding record in the order information table 1000 to "2" (delivery has already been done), sends mail representing that the printed matter has been delivered to the user, and ends the processing in step S4221.

Although not illustrated in the flow chart in FIG. 51, the status of the print site 109 is returned to the photo site 105 when each of the processing operations in steps S4217 to S4219 is executed. The information is saved in the database 118 on the photo site 105.

(Album Display Processing)

Figure 31:
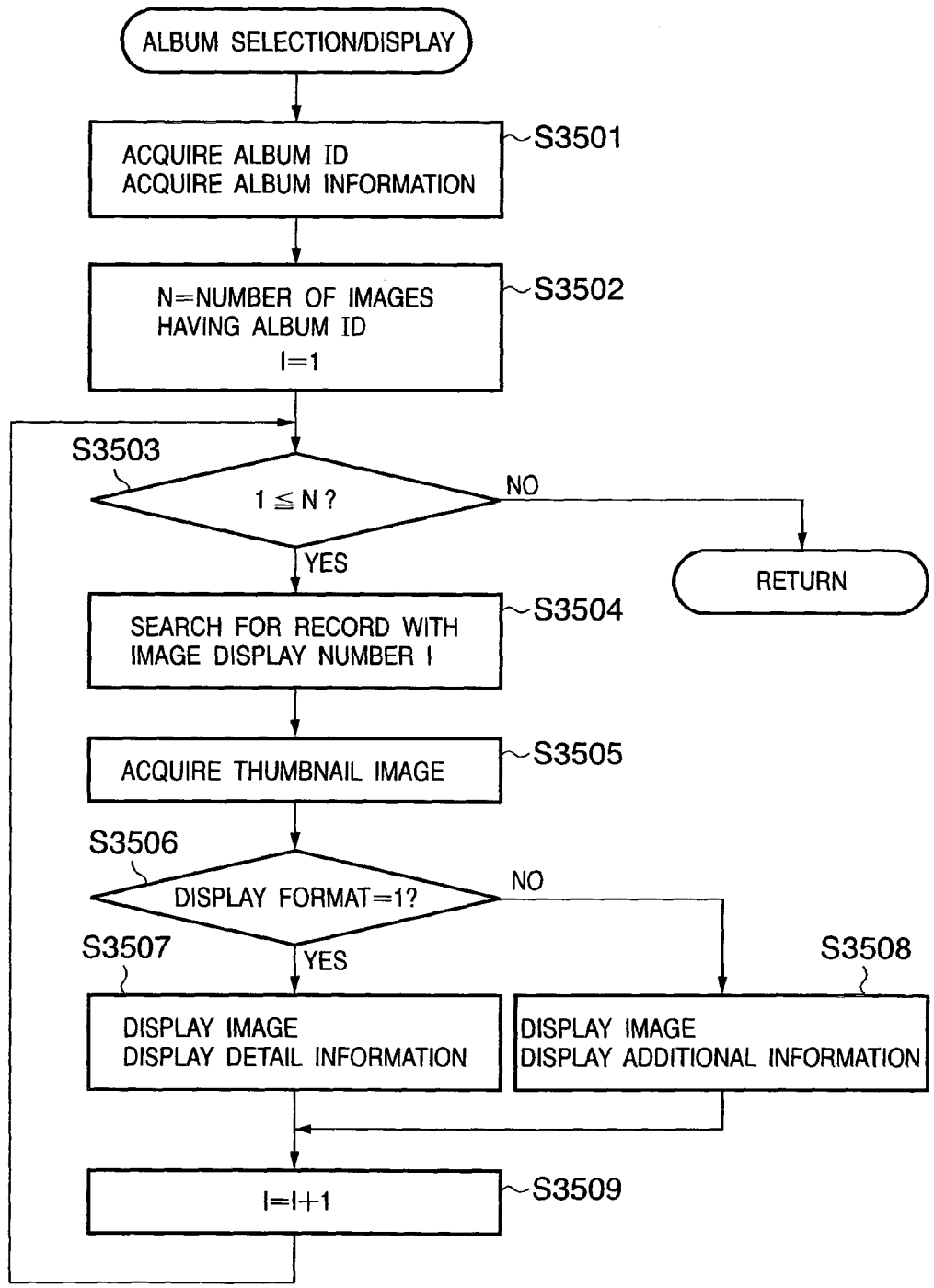
FIG. 31 is a flow chart showing processing related to selection and display of an album when one of album selection buttons of the photo site is clicked on in the embodiment of the present invention.

FIG. 31 is a flow chart showing processing related to selection and display of an album when one of the album selection buttons 2911 to 2915 in the album selection region 2910 of the window 2900 is clicked on.

First, in step S3501, the ordinal number of the clicked button is checked. The customer album data table 600 that has the number as the display order number 603 is searched for from the database 208. The user ID 601 is acquired as the AlbumID. In addition, the album information data table 700 is specified from the user ID 601, and album information is derived.

In step S3502, all records of the album image data tables 800, which have the AlbumID obtained in step S3501 as the album IDs 801, are searched for from the database 208. The number of records hit as a result of search is defined as N, and "1" is substituted into the image count processing variable I.

In step S3503, it is determined whether I<=N. While I<=N, the processing in steps S3504 to S3506 is repeated. With this processing, all the images in the album are displayed.

In step S3504, the album image data table 800 having I as the image display number 803 is searched for from the records detected in step S3502. The image ID 802 of the image is obtained. When the image ID 802 is obtained, a record of the image information data table 900 whose image ID 901 has the image ID 802 is searched for from the database 208. In step S3505, the path 905 to the thumbnail file of the image is acquired from the record obtained in step S3504.

In step S3506, it is determined from the album information data table 700 acquired in step S3501 whether the value of the display format number 709 is "1". In this embodiment, "0" indicates thumbnail display, and "1" indicates detail display.

If YES in step S3506, the thumbnail image and detailed information of the image are displayed in step S3507. In this embodiment, as the detailed information, the image name, comment, number of times of browsing, and number of times of printing are displayed from the image information data table 900. In addition, a check box for image editing is displayed. A window 3600 shown in FIG. 32 is an example of album display in the detail display mode. The functions of the window 3600 are the same as those of the window 2900 except the manner the image display region 2923 is displayed, and a detailed description thereof will be omitted.

If NO in step S3506, the thumbnail image, image name, and check box for image editing are displayed in step S3508. The window 2900 shown in FIG. 18 is an example of such simple display.

When I>N in step S3503, it is regarded that all the images in the album are displayed, and the processing is ended.

In the above embodiment, only two display formats have been described as display formats. However, the number of display formats may be three or more.

(Album Browsing Processing)

Figure 33:
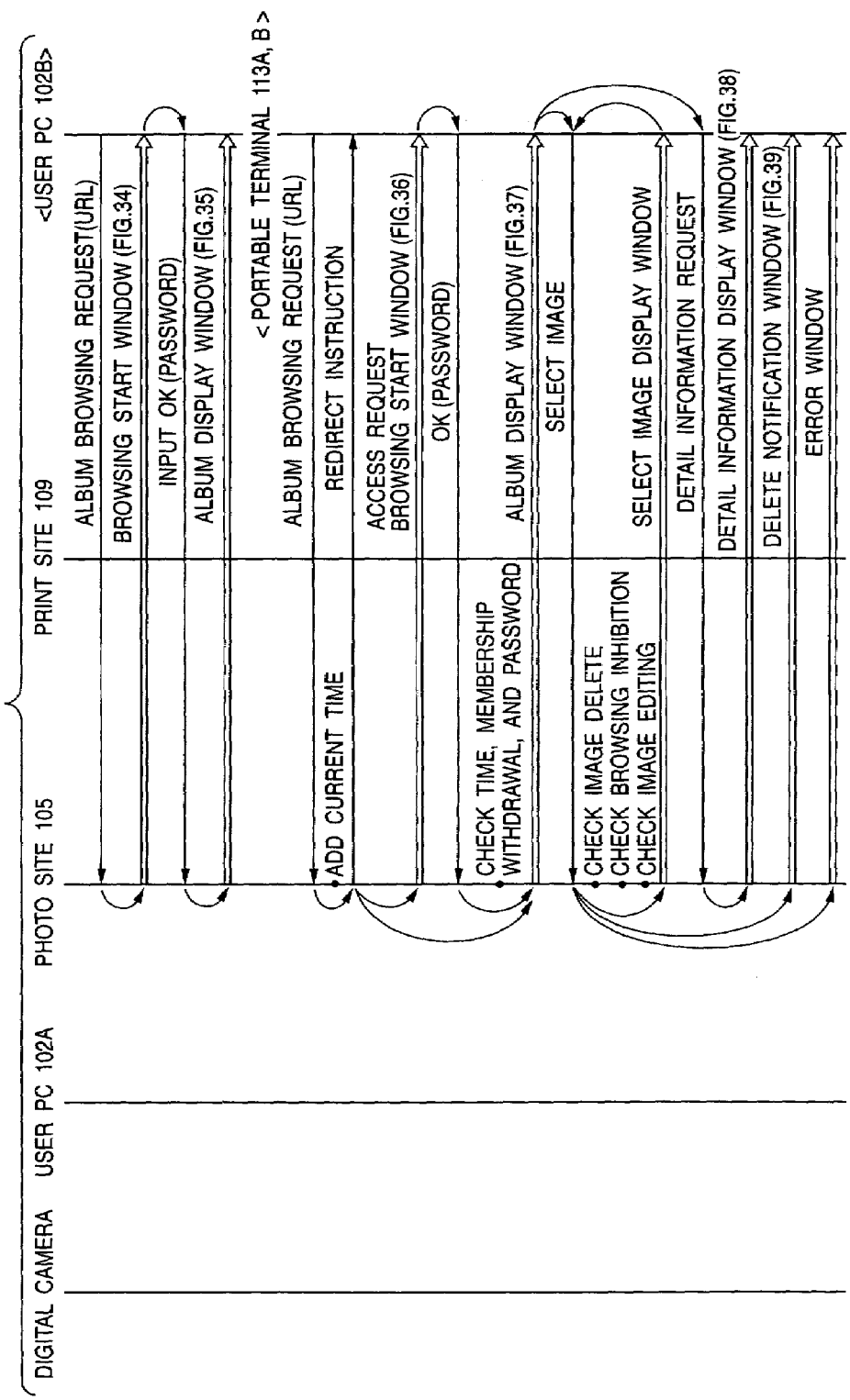
FIG. 33 is a chart showing communication when the user PC or portable terminal sends an album browsing instruction to the photo site in the embodiment of the present invention.

FIG. 33 shows communication between the photo site 105 and the user PC 102B or the portable terminal 113A or 113B when an album saved in the photo site 105 is to be browsed from the user PC 102B or the portable terminal 113A or 113B.

[Album Browsing from User PC]

Figure 34:
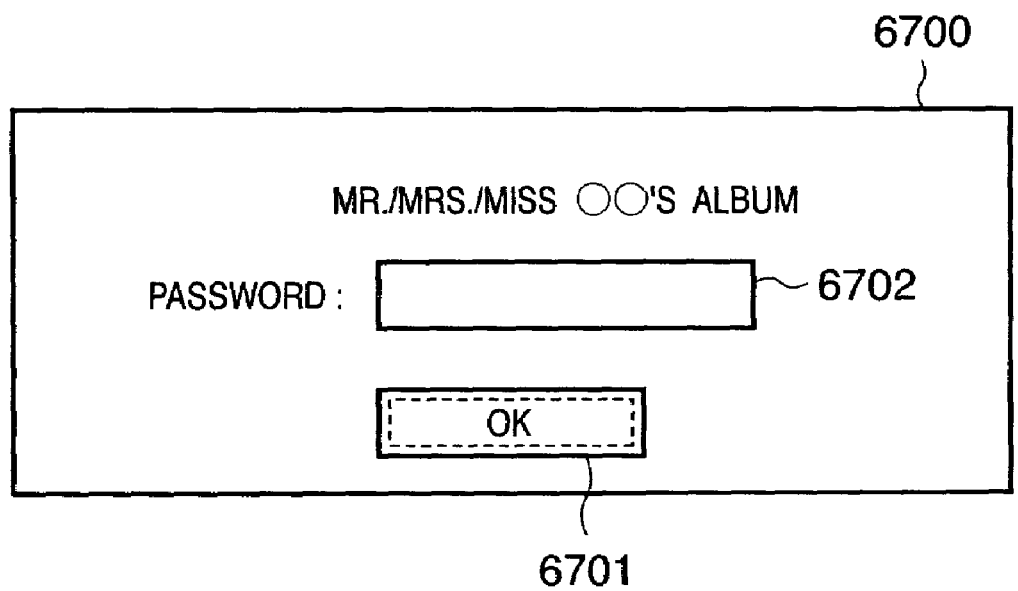
FIG. 34 is a view showing an album browsing start window according to the embodiment of the present invention.

A user who has received the notification mail shown in FIG. 30 can display an album browsing start window 6700 shown in FIG. 34 by designating an URL 6201 described in the mail text. This window can also be displayed even by inputting an album ID 6203 described in the notification mail to the album ID input region 1905 of the window 1900 and clicking on the "GO!" button 1906.

The photo site 105 analyzes the AlbumID of the parameter portion of the input URL or the album ID input to the album ID input region 1905. When the album is present, the name (family name) 405 is displayed in the window 6700 shown in FIG. 34. When the password enable/disable flag 705 of the detected album information data table 700 indicates that a password is set for the album, a password input region 6702 is displayed. The password input region 6702 is not displayed for an album having no password setting.

Figure 35:
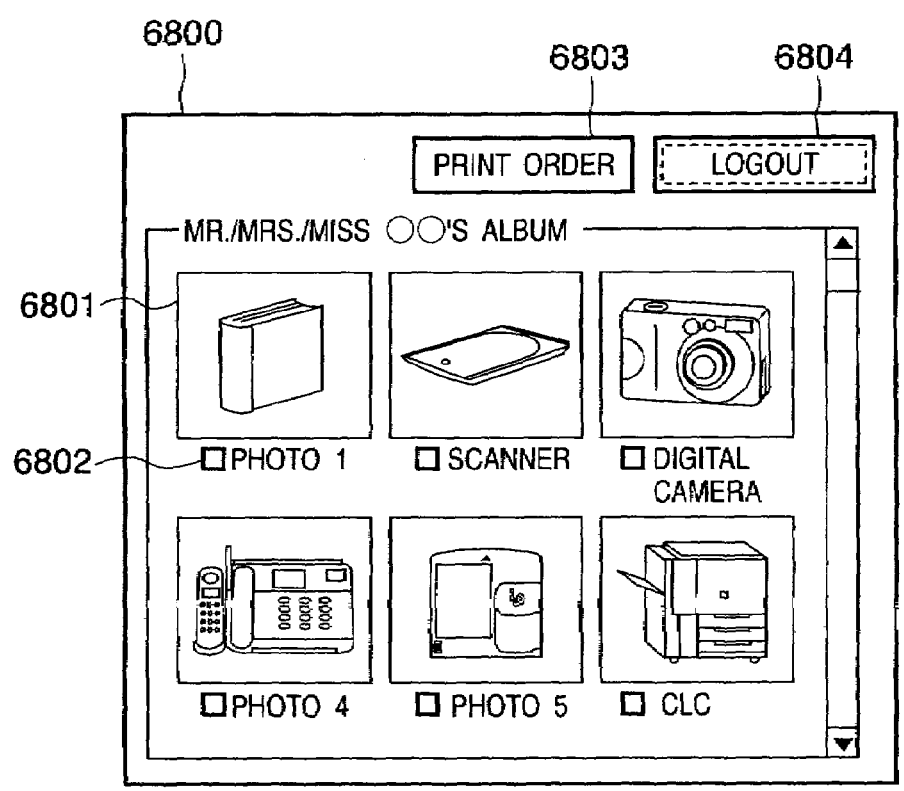
FIG. 35 is a view showing an album browsing window according to the embodiment of the present invention.

When an "OK" button 6701 is clicked on, a window 6800 shown in FIG. 35 is displayed for an album having no password setting or an album for which the correct password has been input. The contents are the same as in the image display region 2923 of the window 2900. If the input password is not correct, an error window is displayed.

In addition, the value of the print enable/disable flag 707 is acquired from the album information data table 700. For a printable album, a button 6803 is displayed, and a print order can be placed. In this case, the flow of print order processing is almost the same as the flow of login user processing (processing executed when the button 2902 in the window 2900 shown in FIG. 18 is clicked on) except no point is added in the photo site 105.

[Album Browsing from Portable Terminal]

The structure of the portable terminal database 41c and the operation of the photo site accessed from a portable terminal will be described below.

{Portable Terminal Database}

FIGS. 40 to 42 are views showing the contents of tables managed in the database 208 by the application server 204.

These tables are generated by the application server 204 for an access from the portable terminal 113 and used to control the display contents or service to the portable terminal 113. The portable terminal may also be referred to as an MB (mobile) hereinafter.

FIG. 40 is a view showing a table which manages access from a specific portable terminal.

As an MB session information table 7000, one record is registered in the database 208 in correspondence with each new access. At this time, a uniquely defined session ID is assigned as the identification information of the portable terminal user who has accessed the photo site. The session ID is stored in the table together with the user ID (the same as the user ID 501) of the album user who has sent invitation mail (7001 and 7004). A session ID is session information which is given when the user's portable terminal accesses a specific top page of the application server 204 of the photo site 105. The same session ID as described above is given to the URL of a related page that links to the top page. For this reason, the server can determine the session of the access by analyzing the URL transmitted from the portable terminal. That is, in this specification, a session has a wider concept than a general session (a logical connection relationship of communication which is set to exchange data between two systems). More specifically, a flow in which a user browses images, specifies images to be printed, and places an order is defined as one session. Hence, the database can be referred to by using one session ID for a plurality of accesses.

The MB session information table 7000 also stores a date/time 7003 of new access and a final access date/time 7002 for the same session ID. The application server 204 periodically searches the MB session information table 7000 in the database 208 and sets a flag in a record attribute 7005 of a record for which a predetermined time has elapsed from the final access date/time. The application server 204 handles access from the portable terminal using the session ID in the same record as timeout and refuses the access. When an order is received in the session, an order number is stored in an order number field 7006. The order number is uniquely assigned when a print order link 7409 is selected in an image browsing window 7400 shown in FIG. 37.

FIG. 41 is a view showing a table which stores the information of an album that is designated when album browsing is requested from the portable terminal.

As an MB album information table 7100, one record is registered in the database 208 in correspondence with each new access. At this time, the table stores a session ID 7101 stored in the MB session information table 7000, an album ID 7102 designated from the portable terminal, and a partial copy (e.g., an album name 7103 or album comment 7104) of the contents of the album information data table 700.

FIG. 42 is a view showing a table which stores image information in the album designated when album browsing is requested from the portable terminal.

As an MB image information table 7200, records equal in number to the images in the album are registered in the database 208 in correspondence with each new access. At this time, the table stores a session ID 7201 stored in the MB session information table 7000, and a partial copy (e.g., an album ID 7203 from the album information data table 700, and an image ID 7202, image name 7204, and image comment 7205 from the image information data table 900) of the contents of the album information data table 700 and image information data table 900. In addition, the application server 204 temporarily acquires images in the file server 209 indicated by the thumbnail file path 905 in the image information data table 900 and copies the images to a temporary area in the file server 209 which is exclusively used by the application server 204. The copy destination image file path is stored in an image path 7206 in the MB image information table 7200. An image number 7207, image size 7208, and number 7209 of times of printing are data related to a print order from the portable terminal.

FIG. 70 shows the temporary area (file system) in the file server 209, which is exclusively used by the application server 204. In this area, images in the file server 209 indicated by the thumbnail file path 905 in the image information data table 900 are temporarily acquired and stored. When accessed from a portable browsing user, the application server 204 generates image reference time directories 7011 to 7013. The images to be browsed are stored in these directories. Each directory name indicates the access time of the portable browsing user. More specifically, each directory name indicates "month/day/time" by numbers. For example, an image that is accessed Jul. 23, 16:00 to 17:00 is stored in the directory 7012 named "072316". FIG. 70 shows the three directories 7011 to 7013 as an example. This is merely an example, and an additional directory is generated every time the portable browsing user accesses the application server 204.

{MB Session Monitoring Processing}

MB session monitoring processing will be described next. This processing is related to erase of a session of the album browsing service from a portable terminal. This processing is started simultaneously when the application server 204 is activated.

For a new session from the portable terminal, the application server 204 stores information necessary for album browsing in new records of the MB session information table 7000, MB album information table 7100, and MB image information table 7200.

In the MB session monitoring processing, records of the MB session information table 7000, MB album information table 7100, and MB image information table 7200, which can be determined as related to the same session by checking, e.g., the value in the session ID field of each record, are invalidated or deleted every predetermined time on the basis of MB session monitoring initial information.

More specifically, when the MB session monitoring processing is valid, records that are stored in the MB session information table 7000, MB album information table 7100, and MB image information table 7200 shown in FIG. 40 and can be determined as "related to the same session" by checking the value in the session ID field of each record are invalidated or deleted every predetermined time.

Figure 71:
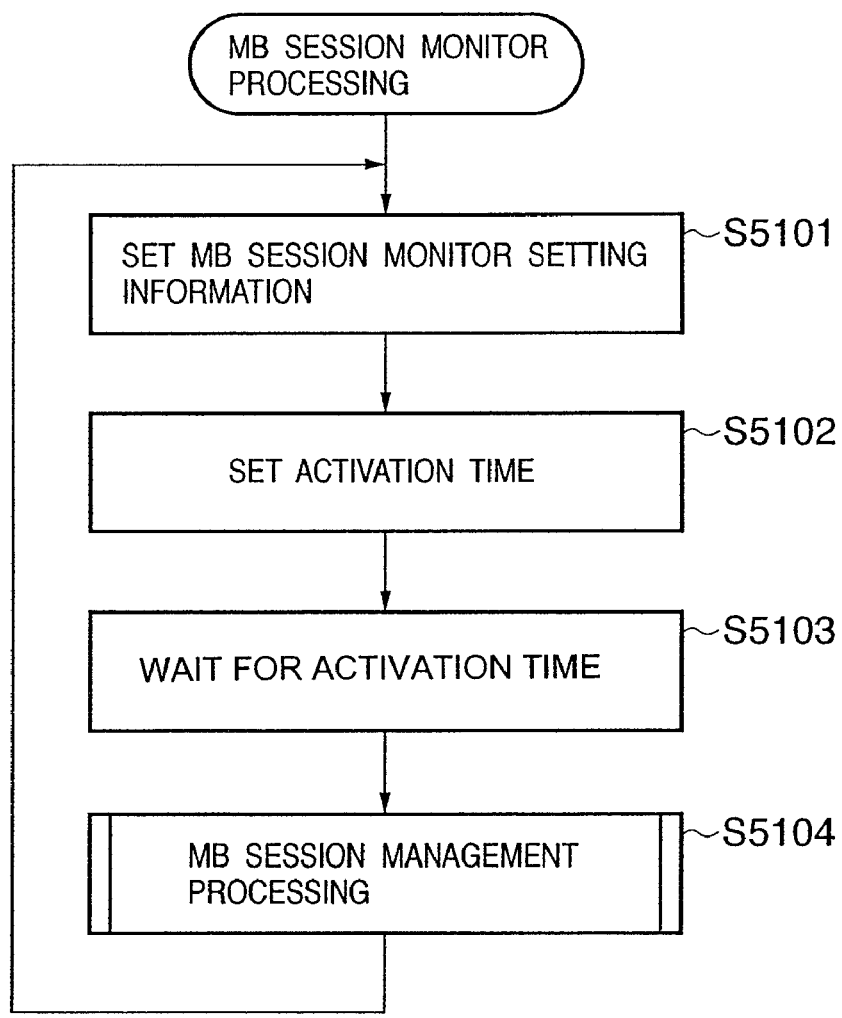
FIG. 71 is a flow chart showing portable terminal session monitoring processing on the application server according to the embodiment of the present invention.

FIG. 71 is a flow chart showing the MB session monitoring processing on the application server 204.

When the MB session monitoring processing starts, MB session monitoring setting information is set first (step S5101). The MB session monitoring setting information contains the following elements.
- session timeout time
- erase enable/disable flag
- erase day of week
- erase time The MB session monitoring processing exists in an application initialization file in the file system of the application server 204.

Next, the current time is acquired. A time until activation of the MB session management processing is set (step S5102). The MB session monitoring processing is set in a standby state (step S5103). When the set time has elapsed, MB session management processing is executed (step S5104). When the MB session management processing is ended, the flow returns to step S5101, and the above processing is repeated. The time set in step S5102 may be either pure standby time (e.g., 30 min) from the current time or time obtained by adding the standby time to the current time (e.g., when the current time is 11:00 am, and the standby time is 30 min, the set time is 11:30 am).

Figure 72:
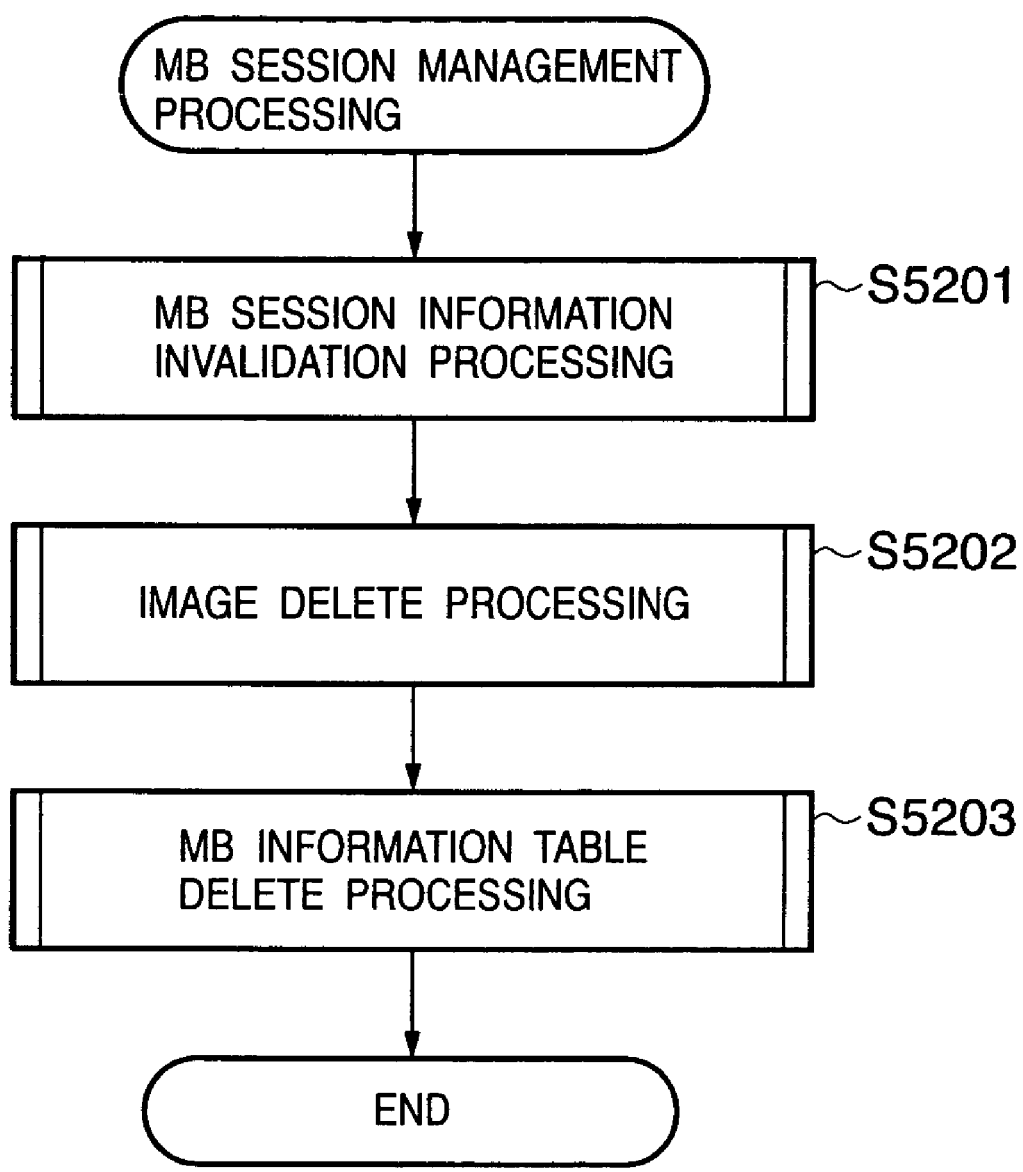
FIG. 72 is a flow chart showing processing related to session management of the portable terminal according to the embodiment of the present invention.

FIG. 72 is a flow chart showing detailed contents of the MB session management processing in step S5104 in FIG. 71.

The MB session management processing is executed every predetermined time after the MB session monitoring processing, i.e., every time the standby time set in step S5102 elapses. When the MB session management processing starts, MB session information invalidation processing (step S5201), image delete processing (step S5202), and MB information table delete processing (step S5203) are sequentially executed. Processing in these steps will be sequentially described below in detail.

Figure 73:
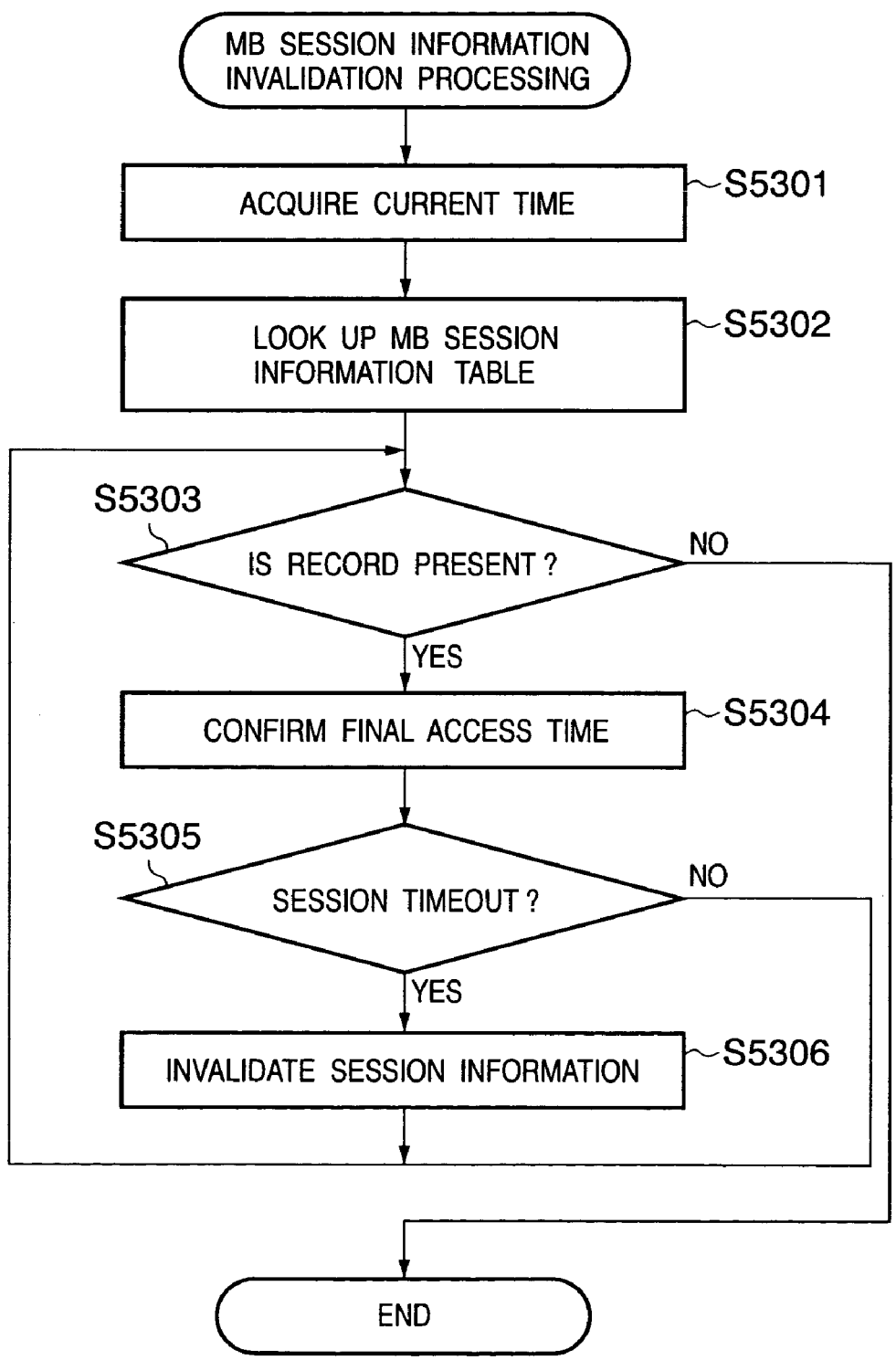
FIG. 73 is a flow chart showing processing related to session information invalidation of the portable terminal according to the embodiment of the present invention.

FIG. 73 is a flow chart of the MB session information invalidation processing in step S5201 in FIG. 72.

When the MB session information invalidation processing starts, the current time is acquired first (step S5301). Next, the MB session information table 7000 shown in FIG. 40 is looked up (step S5302), and unconfirmed records that exist are sequentially confirmed (step S5303). Unconfirmed records mean records that have not undergo processes in the following steps S5304 to S5306 yet.

If there is no unconfirmed record, the MB session information invalidation processing is ended. If an unconfirmed record is present, the final access date/time field in the MB session information record is referred to (step S5304). The elapse time until the current time is calculated. If a time more than the session timeout time in the MB session monitoring setting information has elapsed, session timeout is determined (step S5305). A flag is set in the record attribute 7005 of the MB session information table 7000 that is currently being looked up, thereby invalidating the session information (step S5306).

Figure 74:
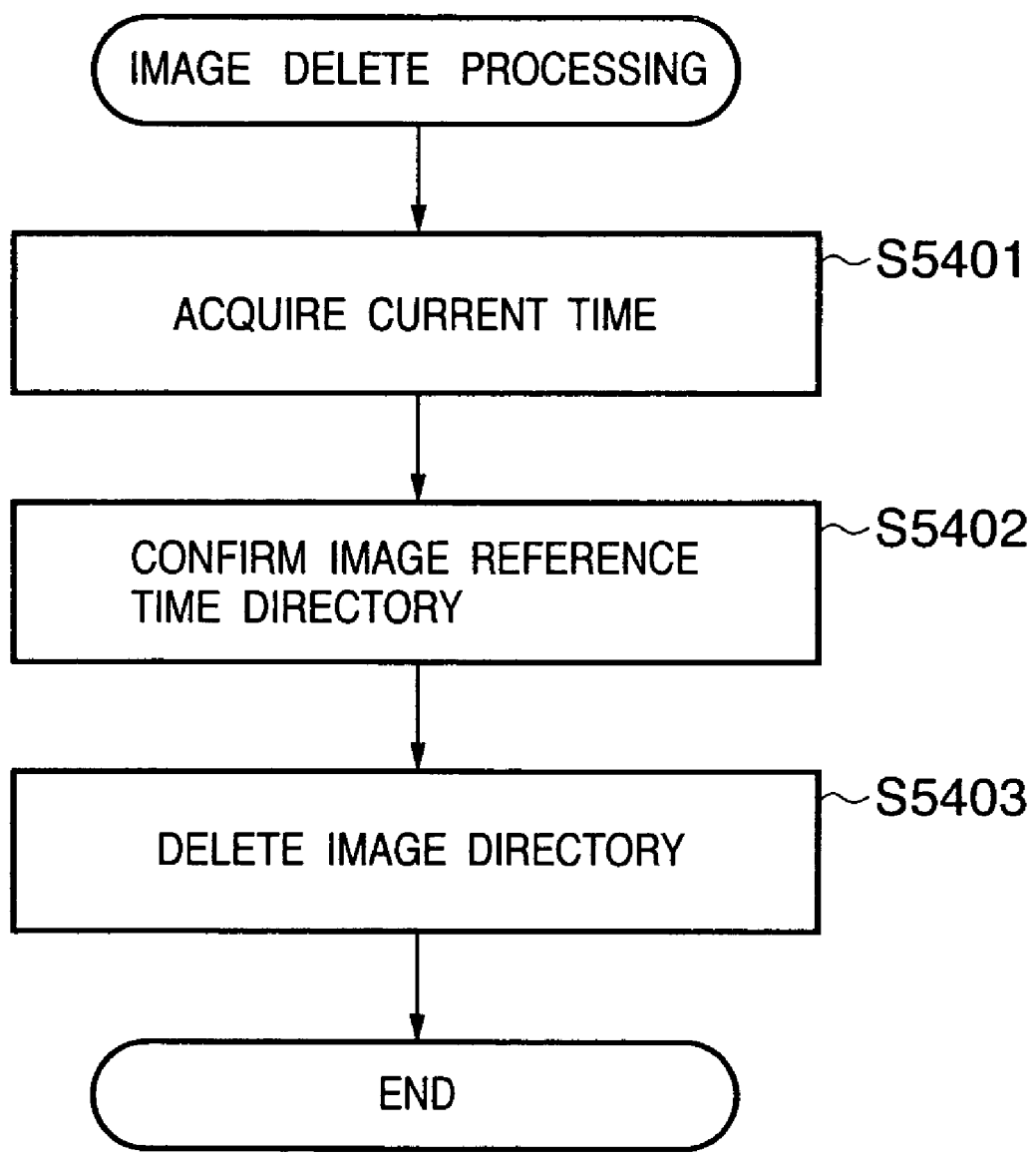
FIG. 74 is a flow chart showing image delete processing according to the embodiment of the present invention.

FIG. 74 is a flow chart showing details of the contents of image delete processing in step S5202 in FIG. 72.

When the image delete processing starts, the current time is acquired first (step S5401). Next, the image reference time directories 7011 to 7013 shown in FIG. 70 are confirmed (step S5402). The image reference time indicated by each directory name is compared with the current time. The elapse time from the image reference time is calculated in hours. If a time more than (session timeout time in MB session monitoring setting information+1 hr) has elapsed, the directory is deleted (step S5403).

In this embodiment, the image delete processing is executed on the basis of the elapse time from a browsing request (from the start of a session) regardless of whether the session validly continues. Hence, thumbnail images may be deleted while a session validly continues. In this case, MB information table delete processing copy processing is executed again. At this time, the directory name has a character string that indicates the date/time of copy.

Figure 75:
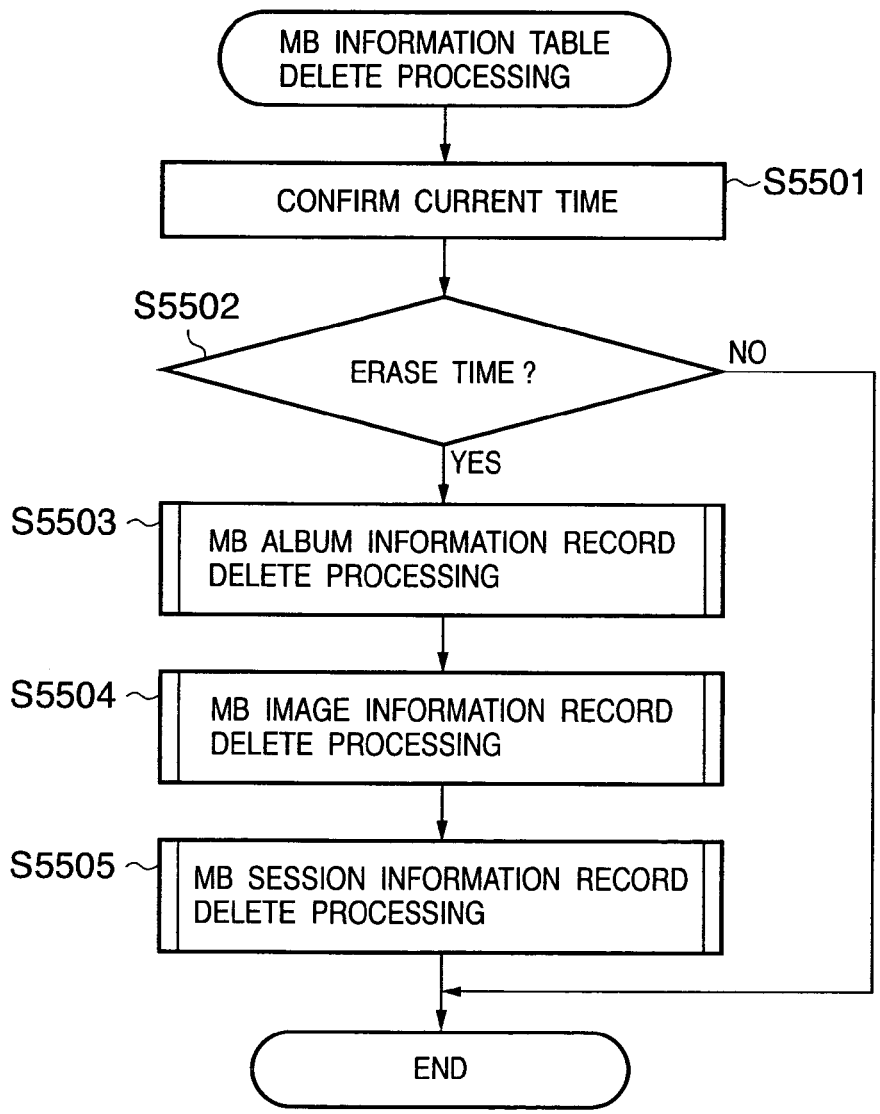
FIG. 75 is a flow chart showing processing related to information table deletion of the portable terminal according to the embodiment of the present invention.

FIG. 75 is a flow chart showing details of the contents of MB information table delete processing in step S5203 in FIG. 72.

When the MB information table delete processing starts, the current time is acquired first (step S5501). Next, the erase time is confirmed by referring to the MB session monitoring setting information. If the current time acquired in step S5501 has not reached the erase time, processing is not performed and is ended. However, if the current time acquired in step S5501 has reached the erase time (step S5502), MB album information record delete processing (step S5503), MB image information record delete processing (step S5504), and MB session information record delete processing (step S5505) are sequentially executed. Processing in steps S5503 to S5505 will be sequentially described below in detail.

Figure 76:
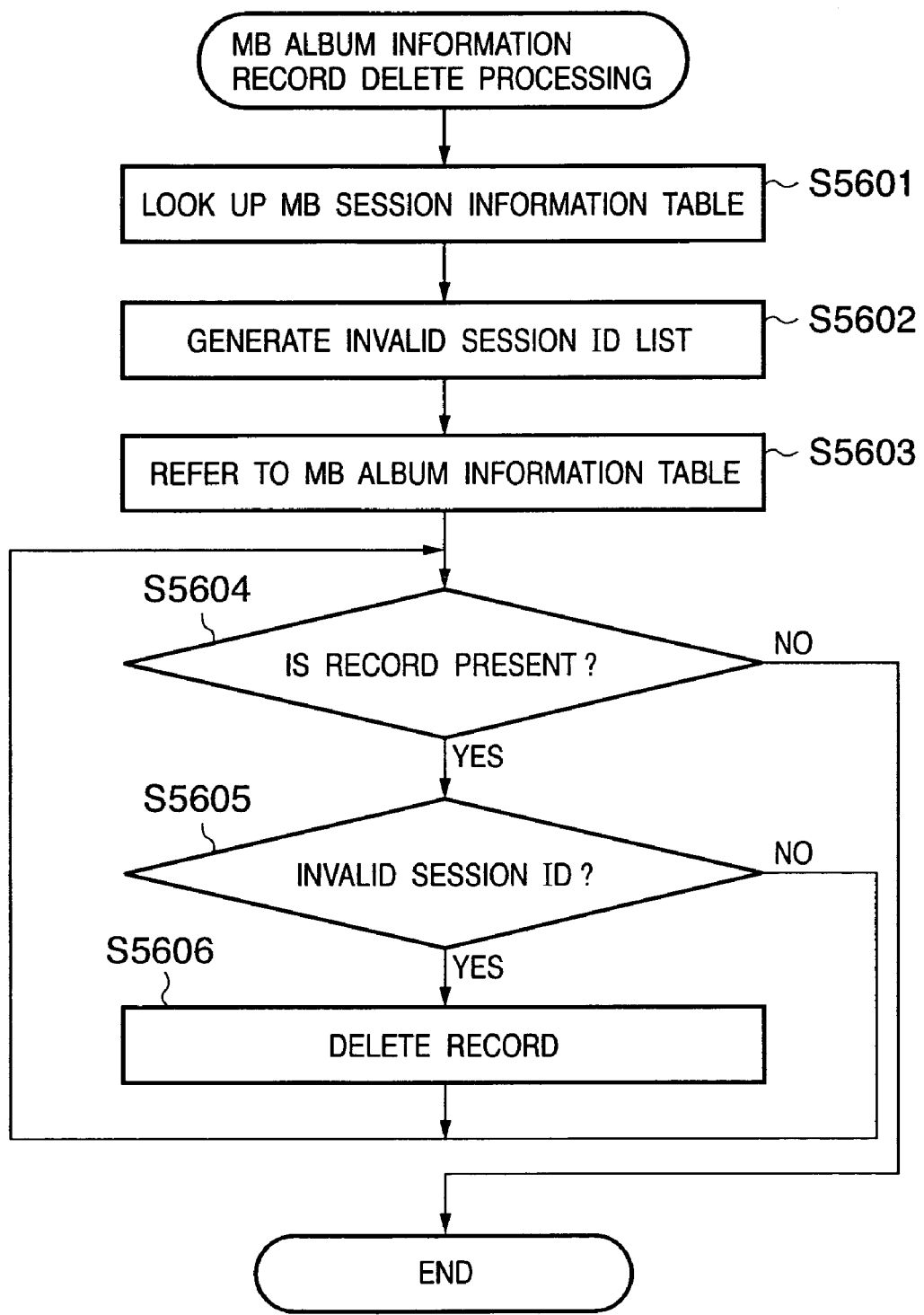
FIG. 76 is a flow chart showing processing related to album information record deletion of the portable terminal according to the embodiment of the present invention.

FIG. 76 is a flow chart of MB album information record delete processing in step S5503 in FIG. 75.

When the MB album information record delete processing starts, the MB session information table 7000 shown in FIG. 40 is looked up first (step S5601). Of all records of the current MB session information table 7000, records which have "1" as the record attributes 7005 are determined as invalid sessions. A session ID value list of invalid sessions is generated (step S5602).

In the MB album information record delete processing, next, the MB album information table 7100 is looked up (step S5603), and unconfirmed records that exist are sequentially confirmed (step S5604). Unconfirmed records mean records that have not undergo processes in the following steps S5605 and S5606 yet.

If there is no unconfirmed record, the MB album information record delete processing is ended. If an unconfirmed record is present, the invalid session ID list generated in step S5602 is referred to. If the session ID in the record that is currently being referred to is the invalid session ID (step S5605), the record that is currently being referred to is deleted (step S5606). The flow returns to step S5604 to refer to the next record. If the session ID in the record that is currently being referred to is not the invalid session ID, the flow directly returns to step S5604 to refer to the next record. In this way, the session IDs of all the records are confirmed, and the processing is ended.

Figure 77:
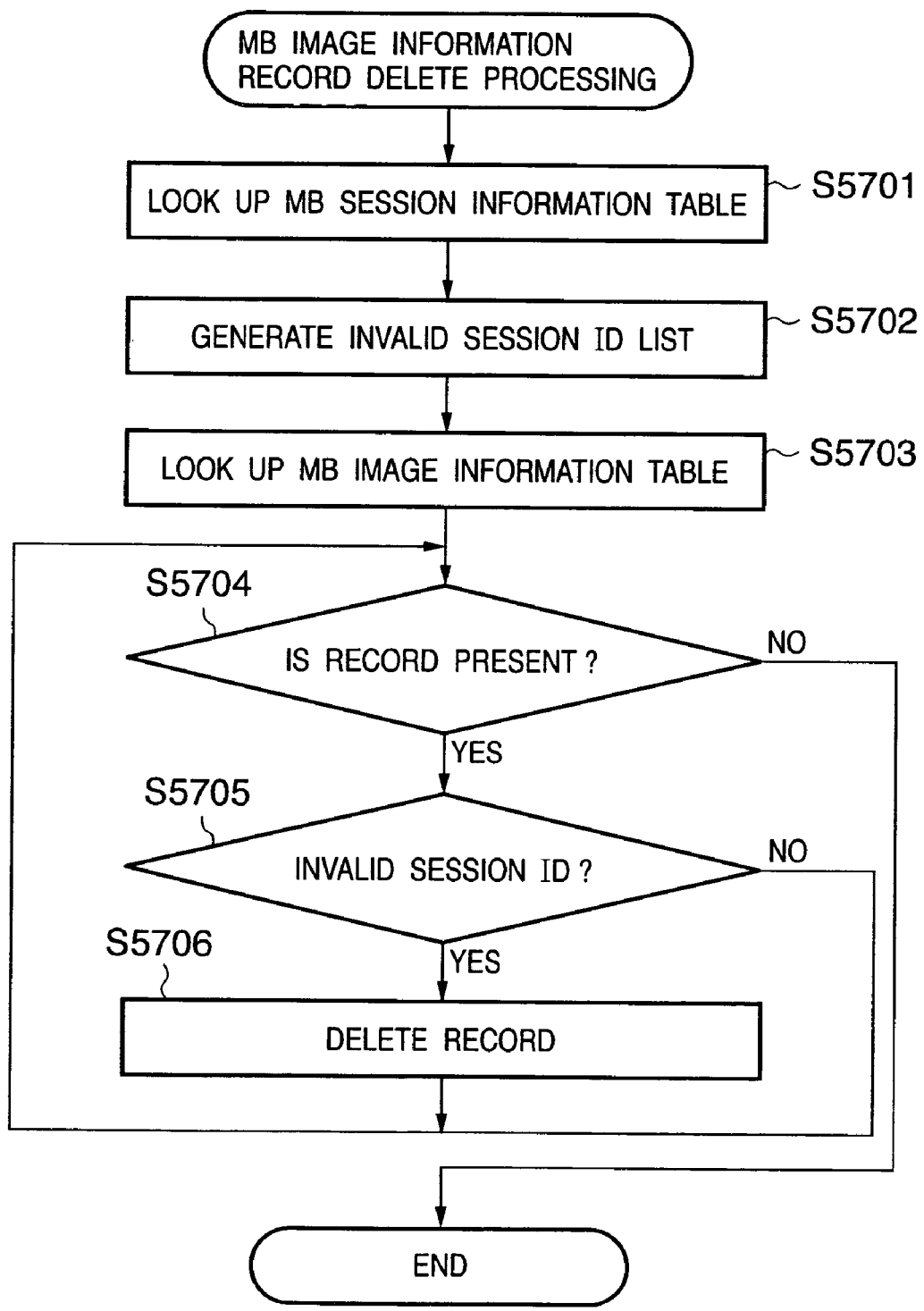
FIG. 77 is a flow chart showing processing related to image information record deletion of the portable terminal according to the embodiment of the present invention.

FIG. 77 is a flow chart of MB image information record delete processing in step S5504 in FIG. 75.

When the MB image information record delete processing starts, the MB session information table 7000 is looked up first (step S5701). Of all records of the current MB session information table 7000, records which have "1" as the record attributes 7005 are determined as invalid sessions. A session ID value list of invalid sessions is generated (step S5702).

In the MB image information record delete processing, next, the MB image information table 7200 is looked up (step S5703), and unconfirmed records that exist are sequentially confirmed (step S5704). Unconfirmed records mean records that have not undergo processes in the following steps S5705 and S5706 yet.

If there is no unconfirmed record, the MB image information record delete processing is ended. If an unconfirmed record is present, the invalid session ID list generated in step S5702 is referred to. If the session ID in the record that is currently being referred to is the invalid session ID (step S5705), the record that is currently being referred to is deleted (step S5706). The flow returns to step S5704 to refer to the next record. If the session ID in the record that is currently being referred to is not the invalid session ID, the flow directly returns to step S5704 to refer to the next record. In this way, the session IDs of all the records are confirmed, and the processing is ended.

Figure 78:
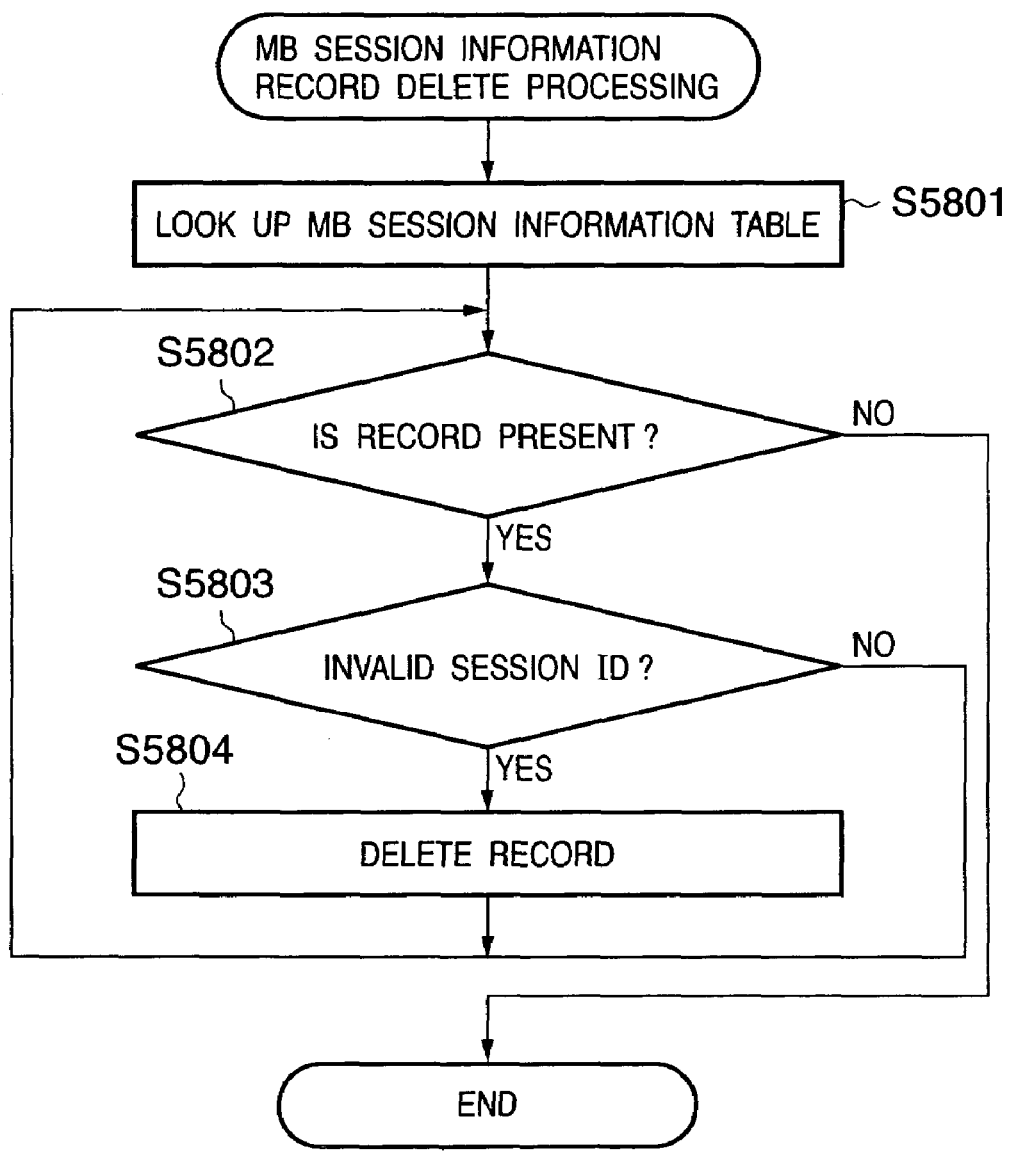
FIG. 78 is a flow chart showing processing related to session information record deletion of the portable terminal according to the embodiment of the present invention.

FIG. 78 is a flow chart of MB session information record delete processing in step S5505 in FIG. 75.

When the MB session information record delete processing starts, the MB session information table 7000 is looked up first (step S5801), and unconfirmed records that exist are sequentially confirmed (step S5802). Unconfirmed records mean records that have not undergo processes in the following steps S5803 and S5804 yet.

If there is no unconfirmed record, the MB session information record delete processing is ended. If an unconfirmed record is present, the record attribute in the record that is currently being referred to is confirmed. If the record attribute is "1" (step S5803), the record that is currently being referred to is deleted (step S5804). If the record attribute in the record that is currently being referred to is not "1", the record is not deleted. The flow returns to step S5802 to refer to the next record. In this way, the record attributes 7005 of all the records are confirmed, and the processing is ended.

In the above description, an invalid session ID list is generated in each of the MB session information record delete processing, MB information table delete processing, and MB album information record delete processing. However, the invalid session ID list generated in the MB session information record delete processing in step S5503 may also be used in the subsequent MB image information record delete processing and MB session information record delete processing.

{Operation When Album Browsing is Executed from Portable Terminal}

FIG. 33 shows communication between the portable terminal 113A or 113B and the photo site 105 when an album saved in the photo site 105 is to be browsed from the portable terminal 113A or 113B. The application server 204 in browsing an album from the portable terminal will be described below in detail.

The windows shown in FIGS. 36 to 39 are display examples of windows displayed on the display of the portable terminal 113 at the time of browsing from the portable terminal. The display layout changes as needed in accordance with the difference in character alignment depending on the window size that changes for each portable terminal or the size of the image to be displayed.

Figure 36:
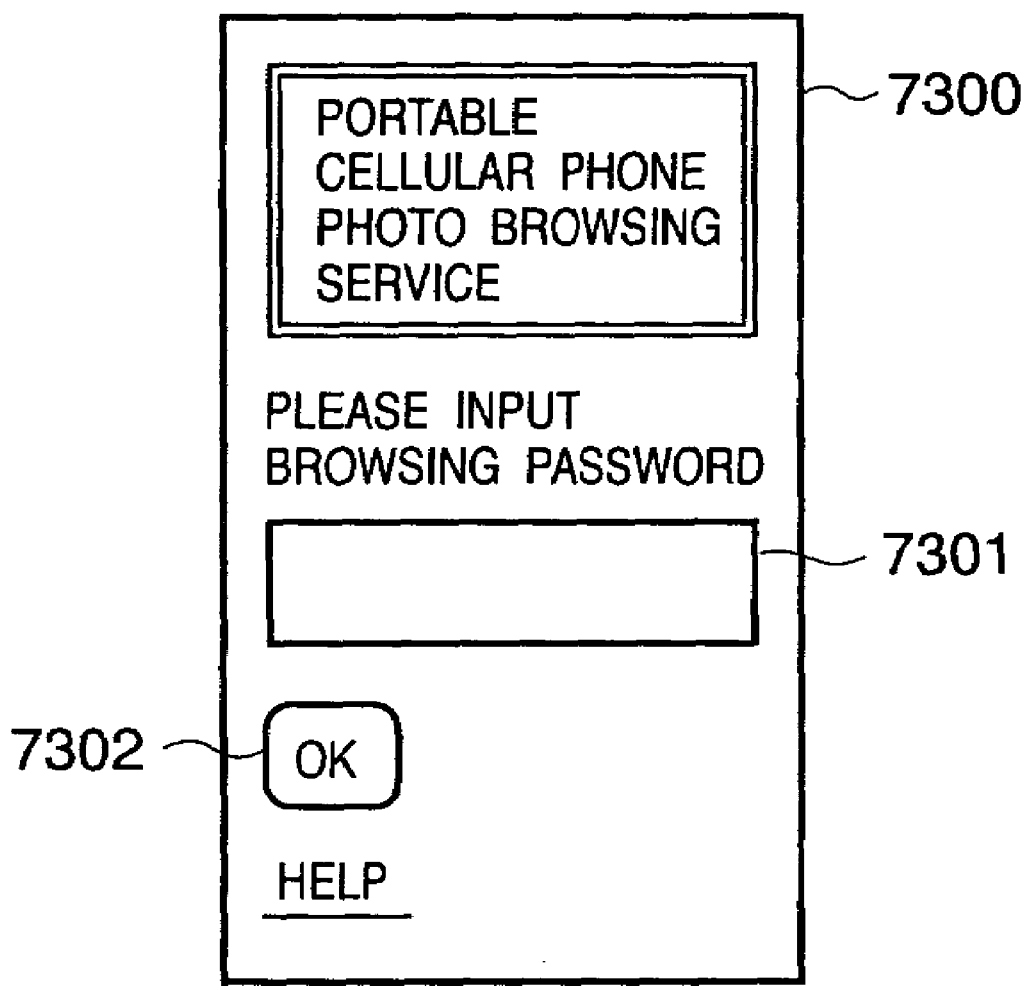
FIG. 36 is a view showing a login window that is displayed when an album is to be browsed from the portable terminal according to the embodiment of the present invention.

Upon receiving the notification mail shown in FIG. 30, the portable terminal user can display an album browsing start window 7300 shown in FIG. 36 by designating the URL described in the mail text. The URL used when the album is to be browsed from the user PC 102B and that used when the album is to be browsed from the portable terminal 113A or 113B. In the load balancer 202 of the photo site 105, it is determined on the basis of the User-Agent field value contained in the HTTP request header whether it is access from the user PC request or a request from the portable terminal. For a request from the portable terminal, the processing is distributed to the MobileApps application server 204.

Such processing distribution may be done using not the information in the HTTP request header but the presence/absence of cookies at the request source.

Figure 37:
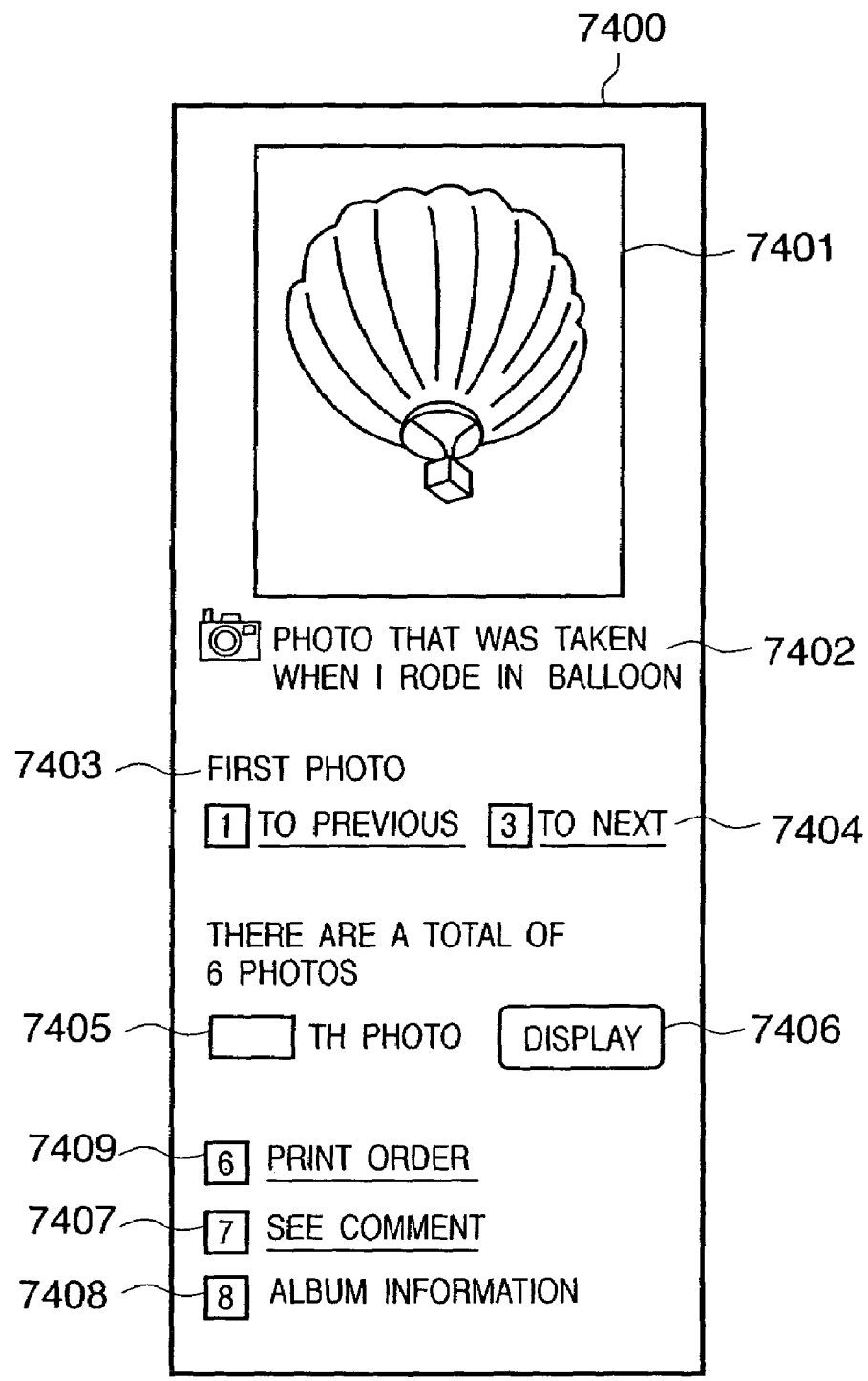
FIG. 37 is a view showing the first window that is displayed when an album is to be browsed from the portable terminal according to the embodiment of the present invention.
Figure 38:
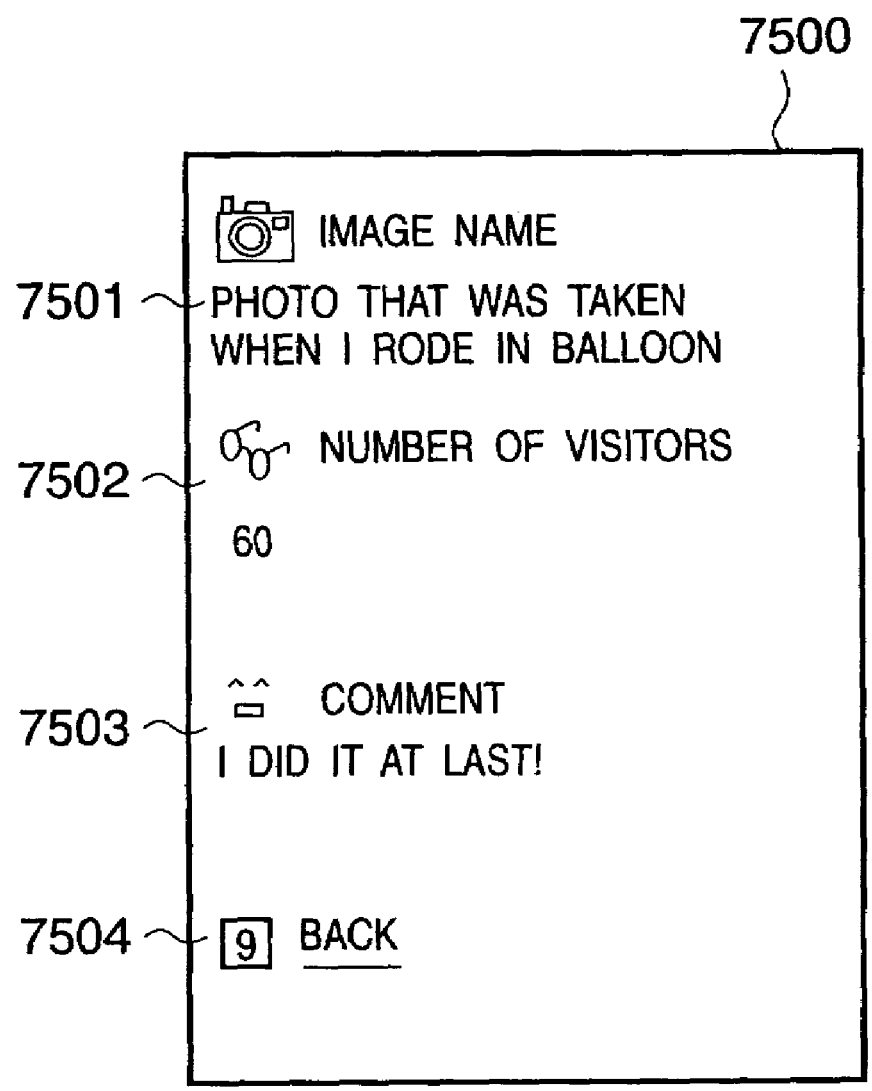
FIG. 38 is a view showing a detail page related to detail information such as an image and comment, which is displayed when an album is to be browsed from the portable terminal according to the embodiment of the present invention.

Upon receiving an access request for the URL described in the mail text from the portable terminal 113, the application server 204 temporarily adds the current time in the system to the URL parameter and issues a redirect instruction to the portable terminal 113. Upon receiving the instruction, the portable terminal 113 issues an access request to the application server 204 again. Upon receiving the access request, the application server 204 analyzes the AlbumID in the URL parameter portion. If it is determined by the processing flow to be described later that an album corresponding to the AlbumID can be browsed, it is further determined whether a password is set for the album. When a password is set, the album browsing start window 7300 is displayed. When no password is set, the window 7400 shown in FIG. 37 is displayed.

When the portable terminal user inputs a password to an input region 7301 of the album browsing start window 7300 and clicks on an OK button 7302, the application server 204 displays the image browsing window 7400 only when determining that the input password is correct. On the other hand, when timeout occurs, or the input password is not correct, an error window is displayed.

In the image browsing window 7400, an image 7401 having a reduced image size, a name 7402 of the image, an image order 7403 in the album, a link 7404 with which an image to be displayed is selected, a total number 7405 of images in the album, an input field & input determination button 7406 in which an image to be displayed is designed by an image ordinal number, a link 7407 with which an image information display window 7500 is displayed, a link 7408 with which an album information display window is displayed, and a link 7409 with which a print order is placed.

When the portable terminal user clicks on the link 7404, an image before or after the image that is currently being displayed is displayed at the display portion of the image 7401. In addition, a corresponding image name is displayed at the display portion of the name 7402. When the portable terminal user inputs an image ordinal number to the input field 7406 and clicks the "display" button, the image with the image ordinal number is displayed at the display portion of the image 7401. In addition, a corresponding image name is displayed at the display portion of the name 7402.

When the portable terminal user clicks on the link 7407, the image information display window 7500 is displayed to display detailed information such as the image name, comment, and the number of image browsers. When the portable terminal user clicks on the link 7408, an album information display window (not shown) is displayed to display detailed information such as the album name, comment, and the number of album browsers. When the portable terminal user clicks on the link 7409, an all print order window 7800 in which a print order for the album that is being browsed can be placed is displayed. The application server 204 checks the state in the album when the link 7404 or "display" button 7406 is clicked on. If the image to be displayed next has already been deleted from the album, a window 7600 is displayed. When browsing of the image is inhibited, an error window is displayed. In the image information display window 7500, a detailed image name 7501, a number 7502 of image browsers, a comment 7503, and a link 7504 to return to the image browsing window 7400 are displayed. In the album information display window (not shown), the same elements as in the image information display window 7500 are displayed except that an album name is displayed in place of the image name, the number of album browsers is displayed in place of the number of image browsers, and a comment for the album is displayed in place of the comment of the image.

In the window 7600, a comment 7601 "this image has been deleted" is displayed instead of display of the image 7401 and name 7402 of the image browsing window 7400. The link to be used to display the image information display window 7500 is not displayed. The remaining display contents are the same as in FIG. 37, and a description thereof will be omitted.

(Browsing and Print Order Control Flow Chart)

Figure 43:
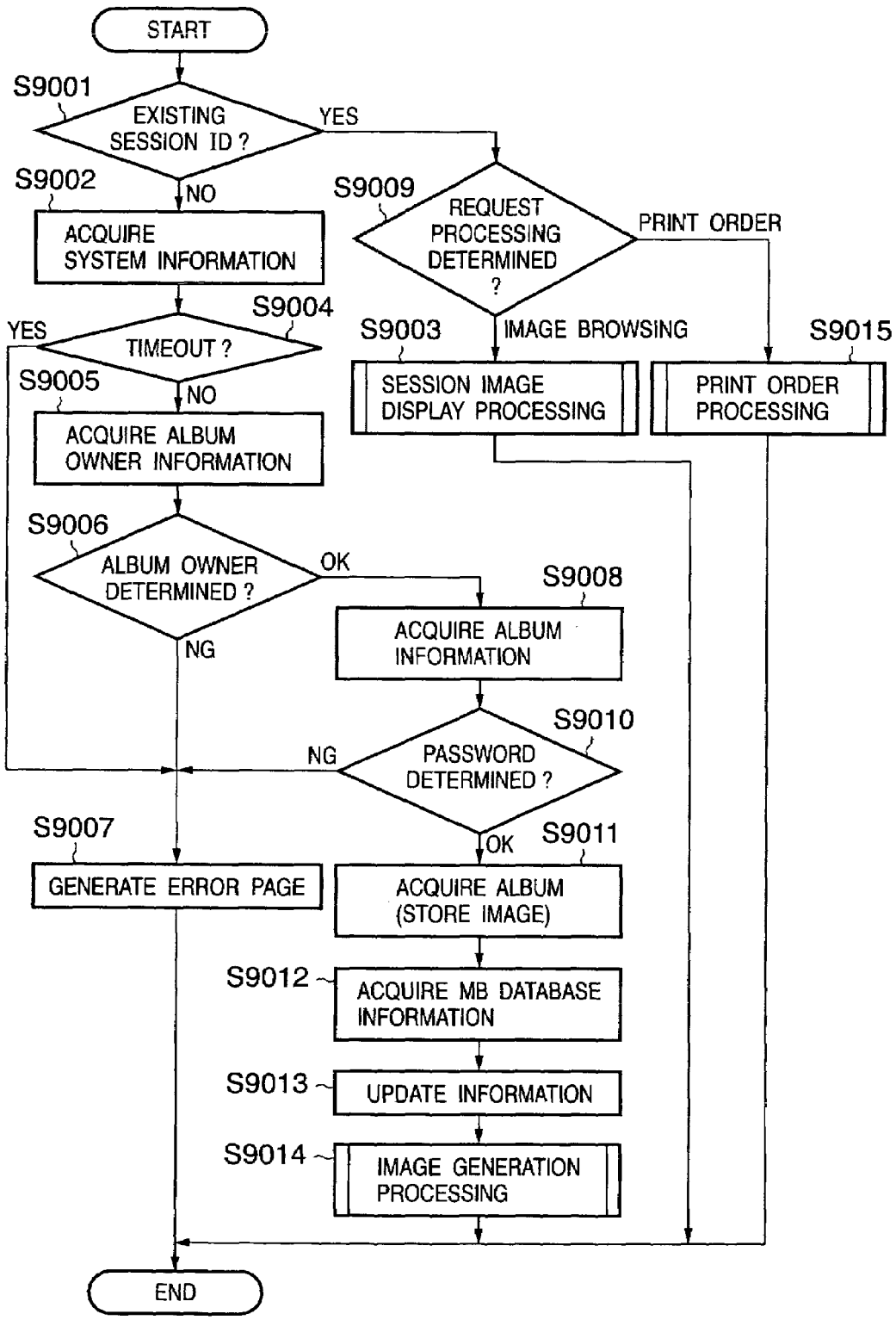
FIG. 43 is a flow chart showing processing related to display of an image browsing window 7400 shown in FIG. 37.

FIG. 43 is a flow chart showing processing procedures for causing the application server 204 for the portable terminal transmits display data of the image browsing window 7400 or the windows (windows 7800 to 8500) related to print order (to be described later).

Upon receiving an album browsing request from the portable terminal user, the application server 204 detects a session ID from the URL parameter portion of the album browsing request in step S9001. It is determined by searching the MB session information table 7000 whether the session ID is an existing session ID.

If YES in step S9001, it is determined that the access is second or subsequent access using the same session ID. Next, in step S9009, the contents of the request from the portable terminal user are analyzed. When it is determined that the request contents indicate album browsing, session image display processing in step S9003 is executed. On the other hand, when it is determined that the request contents indicate print order, print order processing in step S9015 (to be described later) is executed.

When no session ID is detected, it is determined that the access is image browsing display for the first time. In step S9002, the standard time in the site is acquired by acquiring system information. In step S9004, time information added to the URL parameter portion is compared with the time acquired in step S9002. If it is access before a predetermined time or more, timeout is determined In step S9007, an error page is displayed. With this processing, access with the bookmarked URL in the portable terminal 113 can be avoided so that updated information can be distributed.

If NO in step S9004, the AlbumID added to the URL parameter portion is analyzed in step S9005. By using the AlbumID as a key, the customer album data table 600 and customer information data table 400 are searched for and acquired. It is checked in step S9006 whether the album owner has not withdrawn his/her membership, i.e., whether the user registration state 417 of the customer state data table is not "0". If the user registration state is "0", i.e., the album owner has withdrawn his/her membership (or use of the album is inhibited due to another reason), an error page is generated in step S9007 and transmitted to the portable terminal.

When the user registration state 417 is "1", i.e., the album owner is usable, the album information data table 700 is acquired in step S9008 from the acquired information. In step S9010, information in the URL parameter and the password are determined, and the album open enable/disable state and album browsing enable/disable state are confirmed. When an error occurs, an error page is generated in step S9007 and transmitted to the portable terminal.

If no error occurs, the album image data table 800 and the image information data table 900 which is information related to images in the album are acquired from the information in the acquired album information data table 700 in step S9011. The images in the file server 209 indicated by the thumbnail file path 905 are temporarily acquired and copied to the temporary area (in the file server 209) exclusively used for portable access. Only the image of the first page is copied by referring to the image display number 803 in the album image data table 800.

Next, in step S9012, the MB session information table 7000, MB album information table 7100, and MB image information table 7200 are generated. The acquired information and copied image path information are stored. As the management information of the user who has accessed the application server, an intentionally defined session ID is assigned and stored together with the user ID (the same as the user ID 501) of the owner who has sent the invitation mail.

In step S9013, the access count from the portable terminal is reflected on the number of times of browsing in the album information data table 700 and image information data table 900. In step S9014, the display data of the window 7400 is generated and transmitted to the portable terminal.

Session Image Display Processing: S9003

Figure 44:
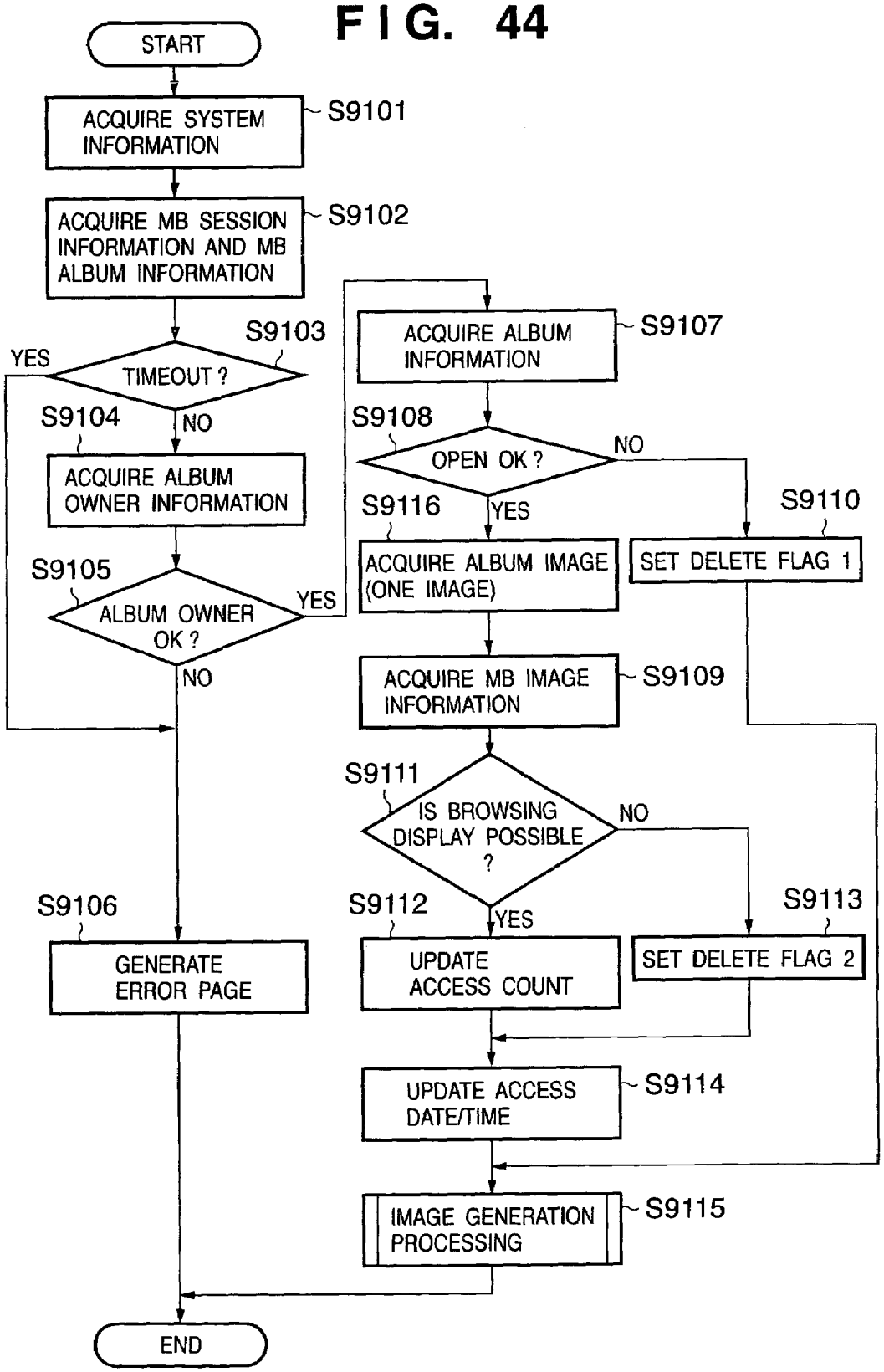
FIG. 44 is a flow chart showing details of processing (S9003) when session information has already been created in FIG. 43.

FIG. 44 is a flow chart showing details of processing (S9003) when session information has already been created when the image browsing window 7400 shown in FIG. 43 is to be displayed.

First, in step S9101, the standard time in the site is acquired by acquiring system information. In step S9102, the session ID added to the URL parameter portion is acquired. By using the session ID as a key, the MB session information table 7000 and MB album information table 7100 are searched for and acquired. These tables also contain the AlbumID and user ID. The URL parameter portion also contains the image display number that is currently being referred to.

In step S9103, the record attribute of a corresponding record in the MB session information table 7000 is referred to. If a flag is set, it is determined that the session is already in a timeout state. An error page is generated and transmitted to the portable terminal in step S9106. With this processing, access with the bookmarked URL in the portable terminal 113 can be avoided so that updated information can be distributed. By using the user ID acquired in step S9102, the customer information data table 400 is searched for and acquired in step S9104. It is confirmed in step S9105 whether the album owner has not withdrawn his/her membership (whether use of the album is not inhibited). If YES in step S9105 (when the album owner is usable), the album information data table 700 is acquired from the session information. In step S9108, the album open enable/disable state and browsing enable/disable state are confirmed. If the album is set in the open disable state in step S9108, the delete flag 1 in the data storage area 31 is set in step S9110. The flow advances to window generation processing in step S9115.

If the album is set in the open enable state, the album image data table 800 and the image information data table 900 which is information related to the album are acquired on the basis of the AlbumID and image display number acquired in step S9102.

The images in the file server 209 indicated by the thumbnail file path 905 are temporarily acquired and copied to the temporary area (in the file server 209) exclusively used for portable access. One copy of the image that is currently being referred to is created by referring to the image display number 803 in the album image data table 800. In step S9109, the MB image information table 7200 is acquired. If the album is inhibited from being made open, the delete flag 1 is set, and the flow advances to image generation processing in step S9115.

It is confirmed in step S9111 whether the image is present in the image information data table 900 and whether the image can be browsed, thereby determining whether browsing display of the image is possible. When the image is present in the image information data table 900, and browsing display is possible, the access count from the portable terminal is updated in step S9112. If the image is not present in the image information data table 900, or the image is set in the browsing inhibited state, it is determined that the image has been deleted. The delete flag 2 in the data storage area 31 is set in step S9113.

In step S9114, the access date/time is reflected on the final login date/time of the MB session information table 7000. The flow advances to window generation processing in step S9115 to generate information of the image browsing window 7400 for the second or subsequent image display request by the user operation.

Image Generation Processing: S9014 and S9115

FIG. 45 is a flow chart showing details of processing (S9014 and S9115) for generating the data of the image browsing window 7400.

In steps S9201 and S9203, the delete flags 1 and 2 are inspected. When the delete flags are set, error display character strings are set in steps S9202 and S9204. As the error display character string, for example, a message "you cannot browse this album" may be used.

In step S9201, the delete flag 1 in the data storage area 31 is inspected. If the delete flag 1 is set, for example, an error message "you cannot browse this album" is set in the display character string in step S9202. The flow advances to step S9212. Display image data is generated and transmitted to the mobile terminal together with other information. If the delete flag 1 is not set, the delete flag 2 is inspected in step S9203. If the delete flag 2 is set, for example, an error message "the image has been deleted" is set in the display character string in step S9204. The flow advances to step S9211.

When neither delete flags are set, the number of characters stored in the image name item of the MB image information table 7200 is compared with a preset number of display characters (DispCh) in step S9205. The number of display characters may have either a value that changes depending on the carrier (service carrier) of the portable terminal or the form of the terminal or a fixed value. When the number of characters is equal to or smaller than the number of display characters, the contents of the image name item in the MB image information table 7200 are set as the character string of the image name 7402 in the image browsing window 7400 in step 9206. When the number of characters stored as the image name is larger than the number of display characters, characters corresponding to the first and second bytes next to the display characters (DispCh) are inspected. It is determined in step S9207 whether a 2-byte code character is located at the end of display characters (whether a 2-byte code character is separated at the first byte).

If a 2-byte code character is located at the end of display characters (DispCh) (when a 2-byte code character is separated at the first byte), characters corresponding to (number of display characters (DispCh)—2 bytes) obtained by removing the boundary character from the image name 7204 in the MB image information table 7200 are set as the image name 7402 in the image browsing window 7400. On the other hand, when a 2-byte code character is located at the end of display characters, in step S9202, characters corresponding to (number of display characters (DispCh)—1 byte) obtained by removing the boundary character from the image name 7204 in the MB image information table 7200 are set as the image name 7402 in the image browsing window 7400.

In step S9208, of the character string of the image name in the MB image information table 7200, characters corresponding to (number of display characters (DispCh)—1 byte), i.e., characters from the start to the end where the boundary character is removed are set as the character string of the image name 7402 in the 2-byte code window 7400. On the other hand, when no 2-byte code character is located at the end, in step S9209, of the character string of the image name in the MB image information table 7200, characters corresponding to (number of display characters (DispCh)), i.e., characters from the start to the end are set as the character string of the image name 7402 in the window 7400.

In the portable terminal such as a portable cellular phone, the amount of information (the amount of data) that can be displayed is limited because of the size of the display section or restrictions on the carrier side. Hence, when accessed from the portable terminal, the data amount to be sent is adjusted on the side of the application server 204 for the portable terminal. Accordingly, any display error or window display disable state on the portable terminal can be avoided.

The image name 7402 in the window 7400 shown in FIG. 37 is not completely displayed because the number of characters stored in the image name item in the MB image information table 7200 is larger than the number of display characters. In the corresponding comment information window (FIG. 38), the whole image name is displayed. That is, the image name 7402 shown in FIG. 37 indicates a state wherein the number of display characters is limited by a set value. In the corresponding detail information window (FIG. 38), the whole image name is displayed without omissions.

Figure 39:
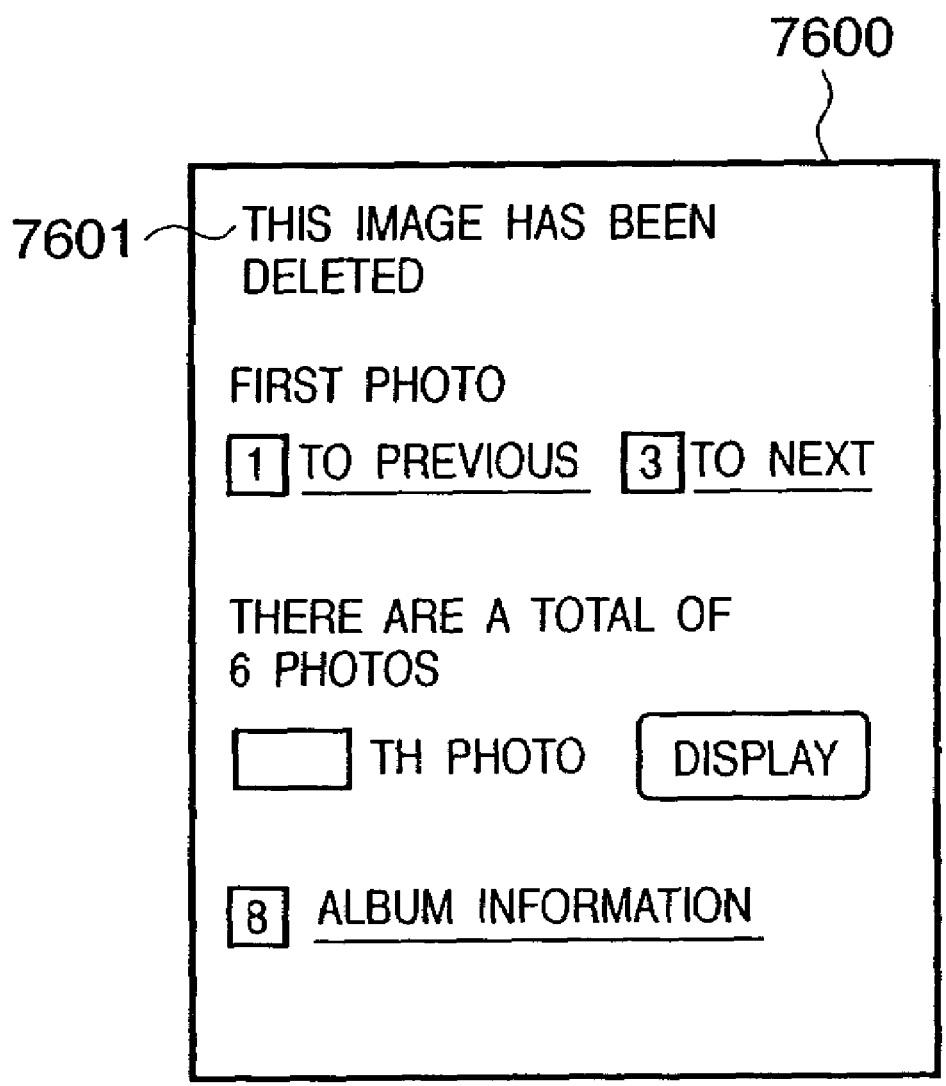
FIG. 39 is a view showing a page related to a case wherein an image is deleted or browsing of a specific image is inhibited, which is displayed when an album is to be browsed from the portable terminal according to the embodiment of the present invention.

In step S9210, the link information of the window 7407 is generated in a form including the session information. Additionally, in step S9211, parameters related to the URL, other link information, and form are generated in the window 7400 in a form including the session information. In step S9212, the display data of the window 7400 is generated and sent to the mobile terminal. When the flow jumps from step S9204 to step S9212 (when the image has been deleted), display data corresponding to the window 7600 shown in FIG. 39 is generated and transmitted to the mobile terminal.

(Print Order from Portable Terminal)

Figure 59:
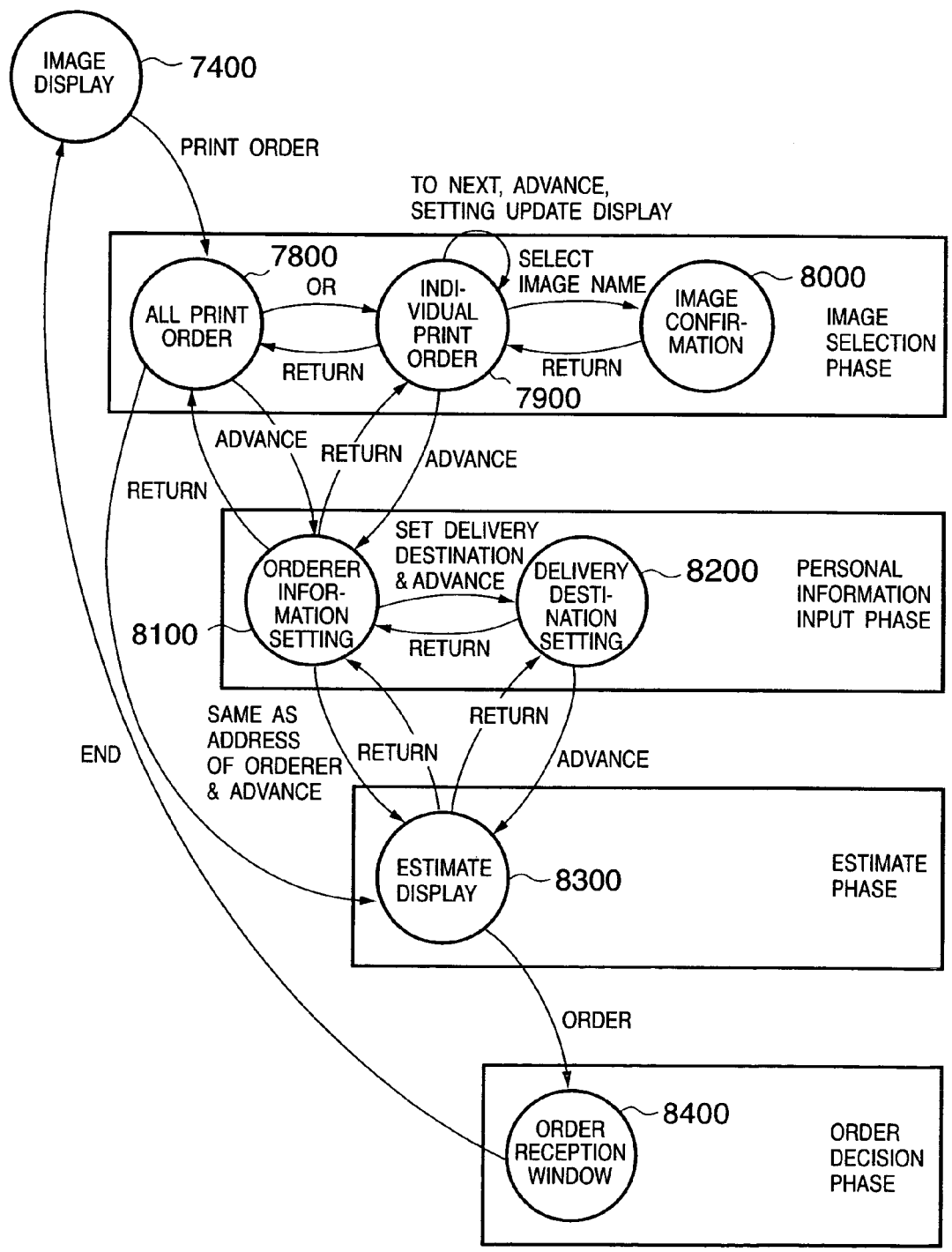
FIG. 59 is a view showing the transition relationship between the windows related to print order processing from the portable terminal according to the embodiment of the present invention.
Figure 60:
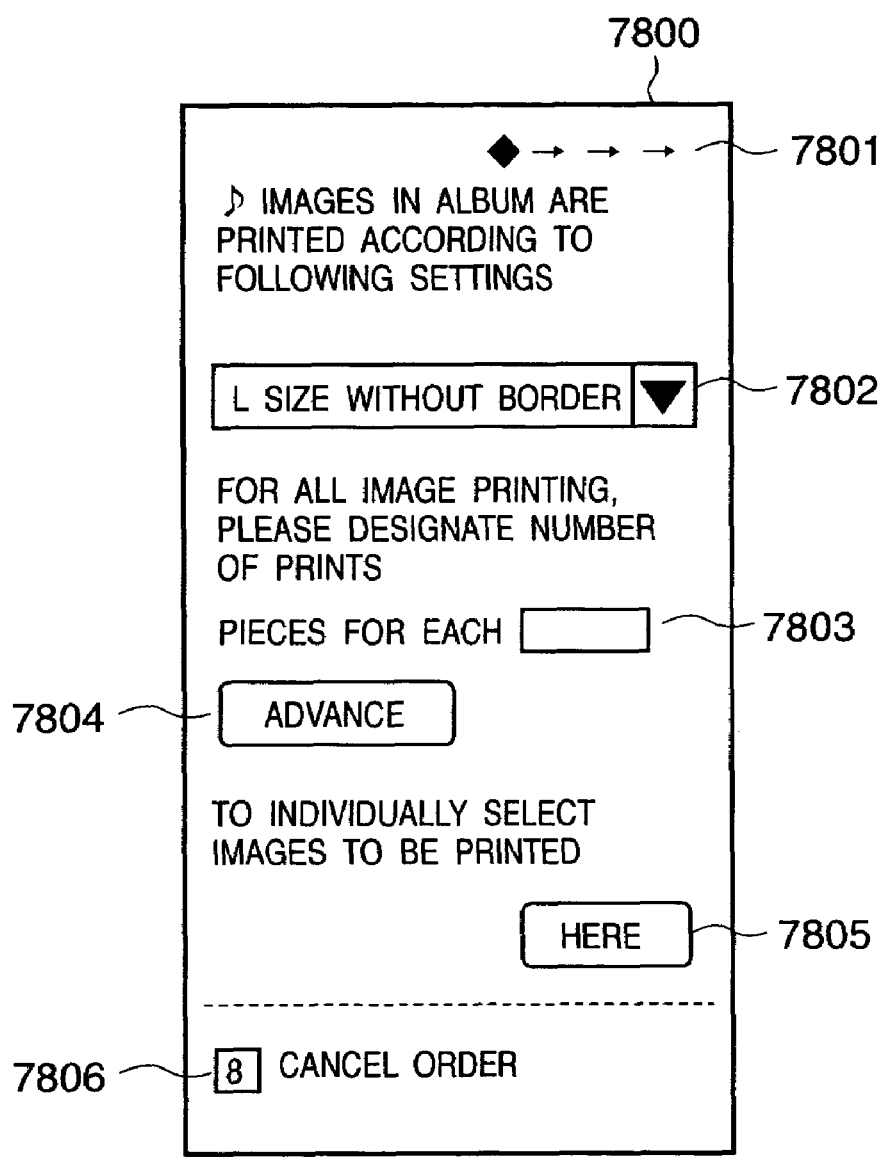
FIG. 60 is a view showing an all print order window in the print order processing from the portable terminal according to the embodiment of the present invention.

The windows shown in FIGS. 60 to 68 are display examples of windows displayed on the display of the portable terminal 113 when a print order is placed from the portable terminal. The display layout changes as needed in accordance with the difference in character alignment depending on the window size that changes for each portable terminal or the size of the image to be displayed. FIG. 59 is a view showing the transition relationship between the windows.

When the portable terminal user wants to place a print order for the album he/she is browsing, he/she clicks on the print order link 7409 in the image browsing window 7400 shown in FIG. 37 to request display of the all print order window 7800 (FIG. 60) (to be described later). Upon receiving this request, the application server 204 analyzes the request contents in step S9009 in accordance with the flow chart shown in FIG. 43. The application server 204 determines that the request is print order and executes print order processing in step S9015.

Figure 69:
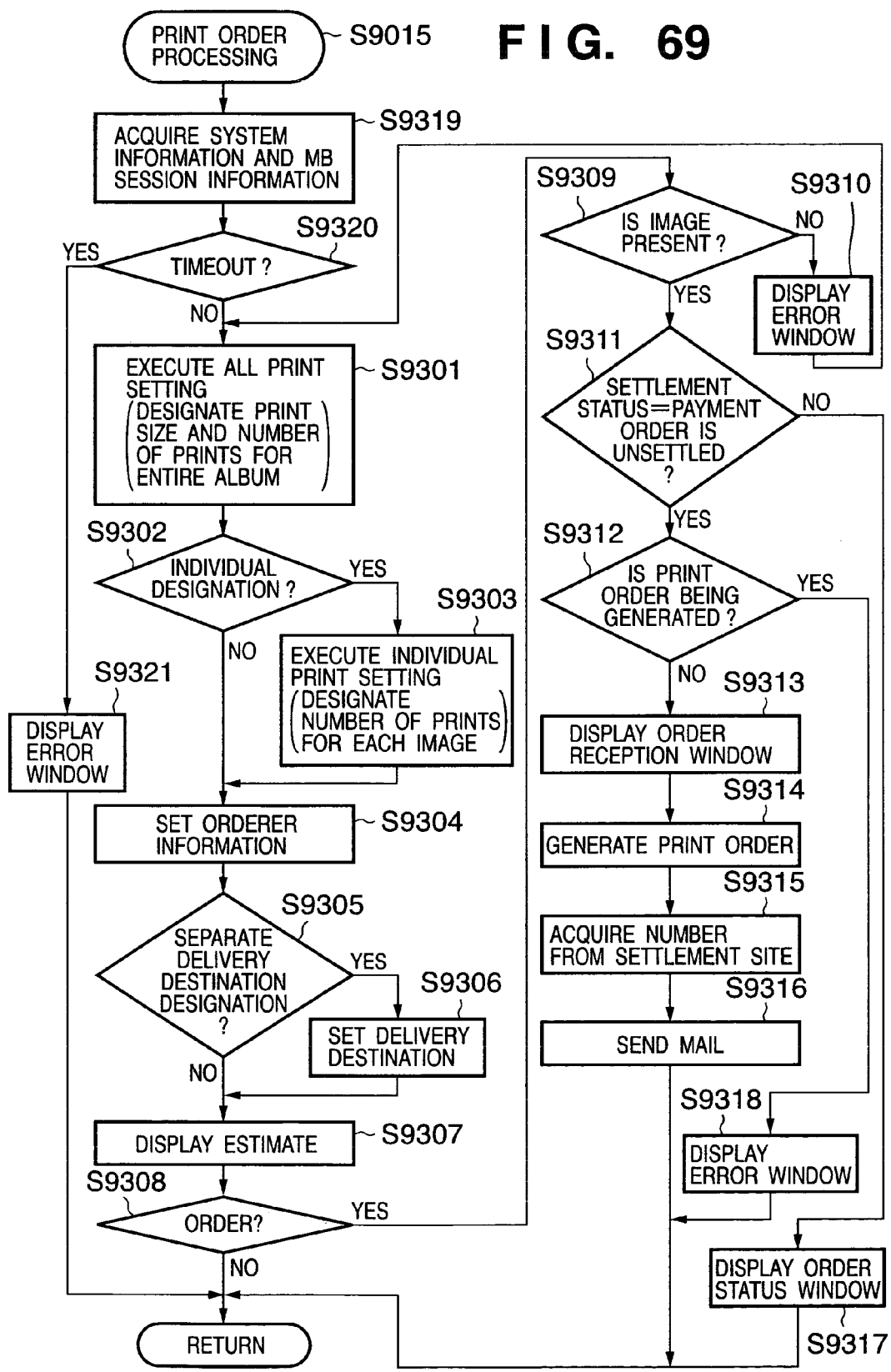
FIG. 69 is a flow chart showing the print order processing from the portable terminal according to the embodiment of the present invention.

FIG. 69 is a flow chart showing details of the print order processing. Processing on the side of the application server 204 related to the print order from the portable terminal will be described below in detail with reference to the flow chart.

When print order processing starts, in step S9319, the standard time in the site is acquired, and the session ID added to the URL parameter portion is acquired. By using the session ID as a key, a corresponding session information record is searched for from the MB session information table 7000. In step S9320, the record attribute of the record is referred to. If a flag is set, it is determined that the session is already in a timeout state. An error page is displayed in step S9321.

If no flag is set, it is determined that the session is valid, and the flow advances to step S9301. The all print order window 7800 is displayed on the portable terminal side to prompt the portable terminal user to designate the print size and the number of prints for all images in the album. Simultaneously, a new order number is issued. A record for new order is generated in the order information data table 1000 in the database 118. The order status 1014 is set to "0" (before an order is given to the print site). The issued order number is always added to various URL parameter portions embedded in the windows related to print order (to be described later).

When the portable terminal user clicks on a pull-down menu 7802, a list of selectable print sizes is displayed. The user can select a desired print size from the list. The selectable print sizes include a total of six types: DP size without border, DP size with border, L size without border, L size with border, 2L size without border, and 2L size with border.

In this embodiment, print size designation is done only in the all print order window 7800. That is, only one print size can be designated for all the image in the album. When the portable terminal user wants to print all the images in the album, he/she inputs the desired number of prints to a number input region 7803.

If a print order based on these settings can be placed, the portable terminal user clicks an "advance" button 7804 to cause transition to a next orderer information input window 8100.

When the portable terminal user wants to selectively print only several images instead of printing all the images or wants to set different numbers of prints for each image (step S9302), he/she clicks on a "click here" button 7805 to cause transition to an individual print order window 7900. In either case, the application server 204 generates records in number equal to the selected images in the order image data table 1100 and stores the print size and the number of prints.

When an order cancel link 7806 is clicked on, the print order processing can be canceled, and the display can be returned to the image browsing window 7400. The images displayed in the image browsing window 7400 are those displayed immediately before the start of print order processing.

At the uppermost portion of the all print order window 7800, an indicator 7801 that represents the window transition situation of the print order processing is displayed. In this embodiment, the window transition state has four phases (image selection, personal information input, estimate, and order decision) shown in FIG. 69. The indicator expresses the phase of the currently displayed window by ♦ mark. In the all print order window 7800, the ♦ mark is located at the leftmost position. The ♦ mark sequentially moves to the right side every time the phase changes. In a portable terminal having a limited display region, the window transition situation cannot be expressed by words and is therefore expressed by using this abstract method. With this indicator, the portable terminal user can roughly grasp the progress situation of the print order processing. The number of transition states is not limited to four. The display form is not limited to the above example, either.

Figure 61:
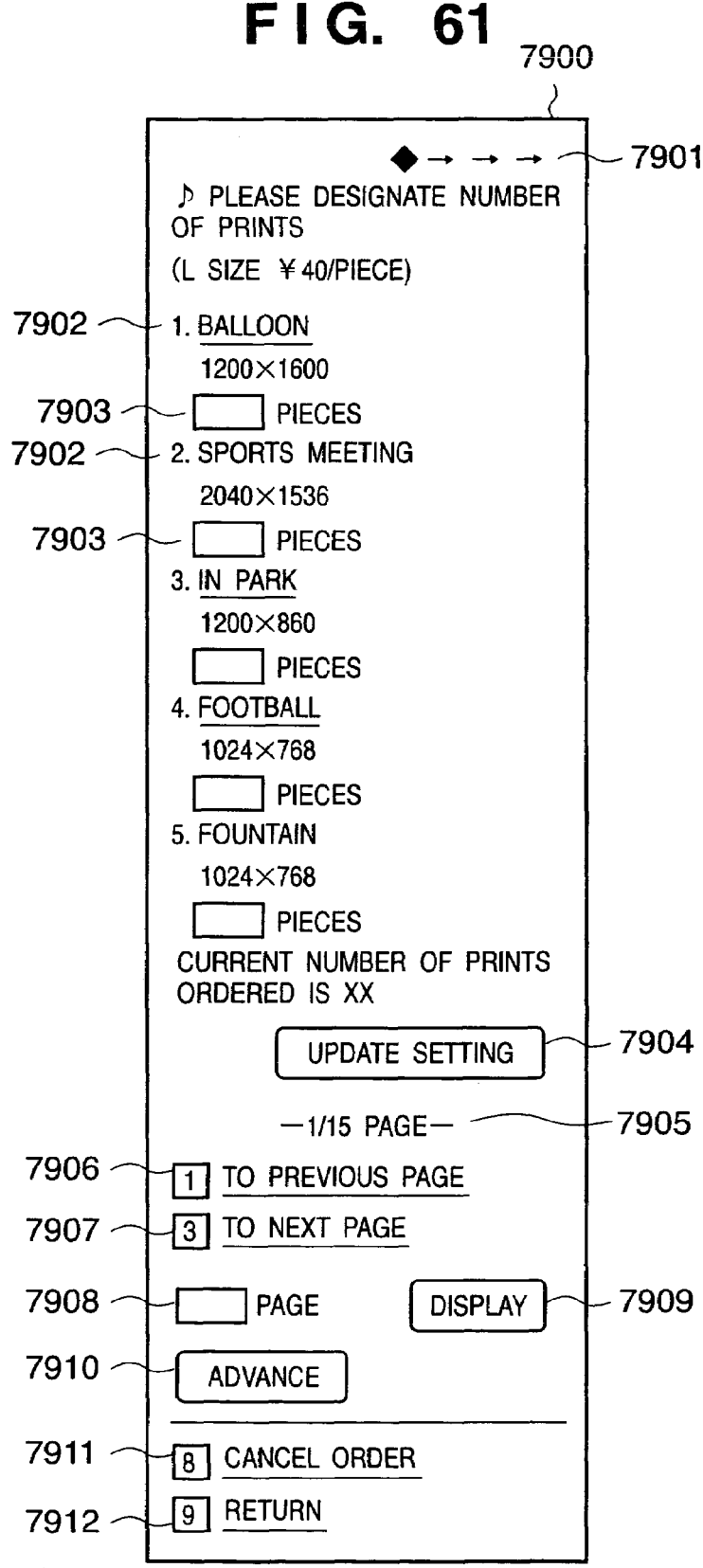
FIG. 61 is a view showing an individual print order window (having a plurality of pages) in the print order processing from the portable terminal according to the embodiment of the present invention.

When the individual print order window 7900 show in FIG. 61 is displayed in step S9303, the portable terminal user can select images to be printed from the album and designate the number of prints for each image. In the window, a list of image names 7902 of the images in the album is displayed. The portable terminal user inputs a desired number of prints to a number input region 7903 corresponding to each image to be printed. When a setting update button 7904 is clicked on, the input numbers of prints are sent from the portable terminal to the side of the application server 204 and stored in corresponding records (generated as needed) in the order image data table 1100 (FIG. 47). Hence, if transition to another window is caused by clicking on not the setting update button 7904 but a button or link to be described later, the application server 204 regards that input of the numbers of prints by the portable terminal user is not performed.

In this embodiment, designation of the print size is done in the all print order window 7800 and not in the individual print order window 7900. Five image names are displayed at maximum in one window. When the number of images in the album is six or more, the image name list is displayed over a plurality of pages. In this case, a page number 7905 indicates the page of the currently displayed page. When a "back" link 7906 or "next" link 7907 is clicked on, the page can be switched. When the page number of the moving destination is input to a page number designation region 7908, and a display button 7909 is clicked on, jump to the page with the designated page number occurs.

Each image name itself which is displayed on the window has a link. When the portable terminal user clicks on the link, transition to an image confirmation window 8000 occurs. When the portable terminal user completes designation of the number of prints for each image in the album and clicks on an "advance" button 7910, transition to the next orderer information input window 8100 occurs. When a "return" link 7912 is clicked on, transition to the all print order window 7800 occurs.

The phase of the individual print order window 7900 is the same as that of the all print order window 7800. In an indicator 7901 displayed at the uppermost portion of the window, the ♦ mark that represents the current phase is located at the leftmost position, as in the all print order window 7800.

A window 7950 shown in FIG. 62 is an individual print order window that is displayed when the number of images names in one window is five or less. This window is different from the window 7900 described above in that the setting update button 7904, "back" link 7906, "next" link 7907, page number designation region 7908, and display button 7909 are omitted. When the "advance" button 7910 is clicked on, the numbers of prints input by the portable terminal user are sent from the portable terminal to the side of the application server 204 and stored in corresponding records (generated as needed) of the order image data table 1100.

Figure 63:
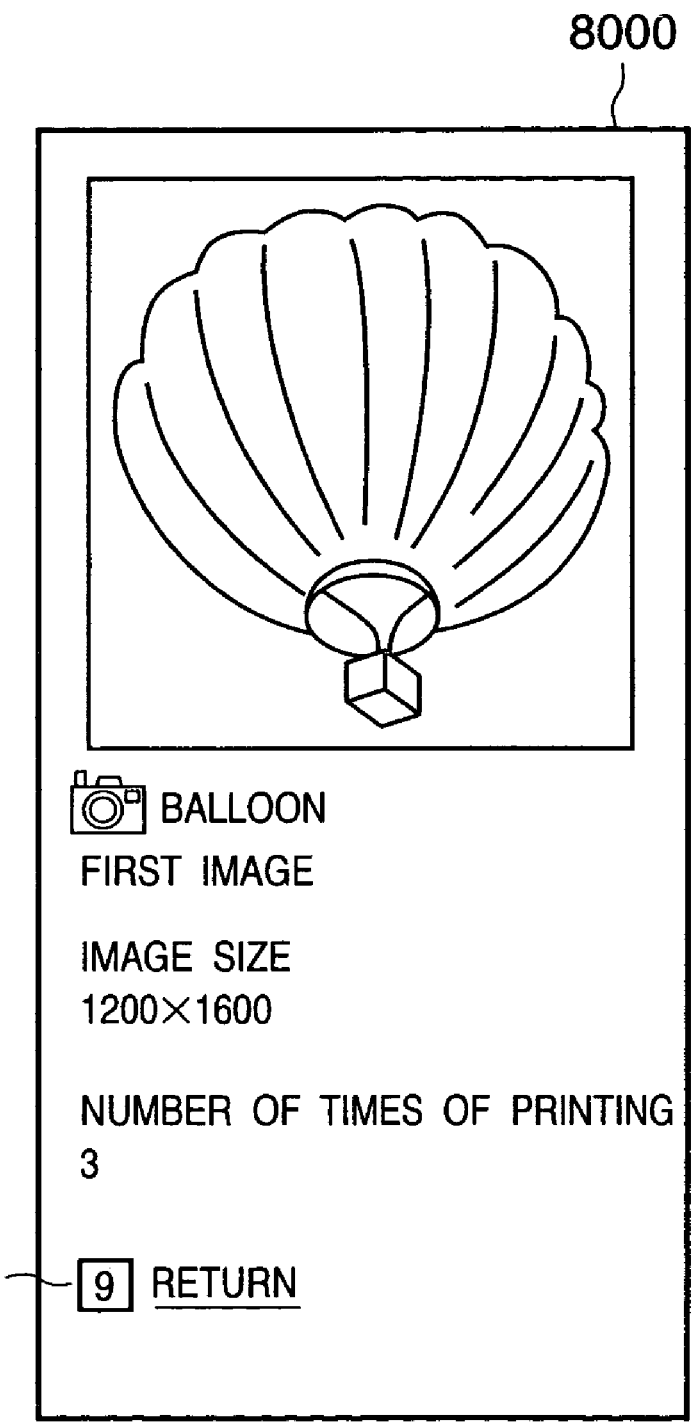
FIG. 63 is a view showing an image confirmation window in the print order processing from the portable terminal according to the embodiment of the present invention.

The image confirmation window 8000 shown in FIG. 63 is a window in which the portable terminal user actually sees and confirms the images to be printed. This window displays an image, image name, image page number, image size, and number of times of printing. These pieces of information are read out from a corresponding record of the image information data table 900. When a "return" link 8001 is clicked on, transition to the individual print order window 7900 occurs.

In step S9304, the orderer information input window 8100 shown in FIG. 64 is displayed on the portable terminal side to prompt the portable terminal user to input personal information.

At this time, by using the session ID as a key, a record corresponding to the current session is searched for from the MB session information table 7000. In addition, by using the order number in the record as a key, a corresponding order information record is searched for from the order information data table 1000. It is checked whether an orderer ID is stored in the orderer ID field 1002 in the record. If an orderer ID is stored, a corresponding orderer information record is searched for from the orderer data table 1300 by using the orderer ID as a key. Personal information in the orderer information record is displayed on the orderer information input window 8100. When a print order is to be placed a plurality of number of times in the same session, the orderer personal information that is input immediately before is displayed in advance on the orderer information input window 8100. For this reason, the user need not input the personal information again.

That is, the order number is stored in the MB session information table 7000, and the order information data table 1000 can be invoked from the order number. Hence, the personal information as order information is managed such that it can be transmitted to the portable terminal under a predetermined condition. The predetermined condition here is that the same session ID is present. When an order window in the same session from the portable terminal is displayed again, the order information is read out from the order information data table 1000, transmitted to the portable terminal, and presented to the user.

The portable terminal user inputs names, phonetic transcriptions of the names, postal code, address, telephone number, mail address, delivery method, and delivery destination in accordance with the window instruction and clicks on an "advance" button 8114. The application server 204 checks that the pieces of input information are in order, generates a new record in the orderer data table 1300, and stores the input personal information. A newly assigned orderer ID is stored in the orderer ID 1301 in the newly generated record. In this embodiment, when the personal information is stored, prefecture information is stored as a prefecture code defined by JIS. The application server 204 recognizes the character string input to a prefecture input region 8107, converts the character string into a prefecture code, and then stores the code in the record. In addition, the application server 204 stores the newly assigned orderer ID in the orderer ID field 1002 in the record of the order information data table 1000 which is generated in step S9301. Furthermore, an order number corresponding to the order that is currently being processed is stored in the order number field 7006 in the MB session information table 7000 corresponding to the current session. This order number is contained in the URL parameter when the orderer information input window 8100 is invoked. The order number is issued in step S9301 described above. Accordingly, order information in the corresponding order information data table 1000 or orderer information in the orderer data table 1300 can be traced from the session information in the MB session information table 7000. If an order number has already been stored in the order number field 7006, the newly issued order number is overwritten.

If the pieces of input information are not in order because of the absence of some information or input of undesignated character types, an error window is displayed on the portable terminal side to prompt the user to re-input the personal information.

When the portable terminal user selects "same as the orderer" as a delivery destination 8113 and clicks on the "advance" button 8114, transition to an estimate display window 8300 shown in FIG. 66 as the next phase occurs. On the other hand, when the user selects "designate delivery destination" and clicks on the "advance" button 8114, transition to a delivery destination input window 8200 shown in FIG. 65 occurs (step S9305). When a "return" link 8116 is clicked on, transition to the all print order window 7800 or individual print order window 7900 displayed immediately before occurs.

The phase of the orderer information input window 8100 is a personal information input phase. The ♦ mark in an indicator 8101 displayed at the uppermost portion of the window is located at the second position from the left.

When transition to the delivery destination input window 8200 occurs in step S9305, a delivery destination can be designated separated from the input orderer information. As in the above case, by using the session ID as a key, a record corresponding to the current session is searched for from the MB session information table 7000. In addition, by using the order number in the record as a key, a corresponding order information record is searched for from the order information data table 1000. When pieces of deliverer information are stored in the delivery destination information fields 1003 to 1011 in the record, these piece of information are displayed on the delivery destination input window 8200. When a print order is to be placed a plurality of number of times in the same session, the personal information of the delivery destination that is input immediately before is displayed in advance on the delivery destination input window 8200. For this reason, the user need not input the delivery destination again.

The portable terminal user inputs names, phonetic transcriptions of the names, postal code, address, telephone number, and mail address in accordance with the window instruction and clicks on an "advance" button 8212. The application server 204 checks that the pieces of input information are in order and stores the input delivery destination information in the record of the order information data table 1000 already generated in step S9306. At this time, the application server 204 recognizes the character string input to a prefecture input region 8207, converts the character string into a prefecture code, and then stores the code in the record, as in the processing in the orderer information input window 8100. If the pieces of input information are not in order because of the absence of some information or input of undesignated character types, an error window is displayed on the portable terminal side to prompt the user to re-input the personal information.

When the portable terminal user clicks on the "advance" button 8212, transition to the estimate display window 8300 occurs. When a return link 8214 is clicked on, transition to the orderer information input window 8100 occurs.

The phase of the delivery destination input window 8200 is the same as that of the orderer information input window 8100. In an indicator 8201 displayed at the uppermost portion of the window, the ♦ mark that represents the current phase is located at the second position from the left, as in the orderer information input window 8100.

In step S9307, the estimate display window 8300 shown in FIG. 66 is displayed on the portable terminal side to prompt the portable terminal user to confirm the contents of the print order. For this purpose, the merchandise price, transportation charge, various kinds of commissions, and total use amount are calculated and displayed in the window together with the orderer information and delivery destination information. In addition, a new record is generated in the order settlement data table 1200 (FIG. 48), and the calculated estimate data is stored. At this time, the status 1208 is set to "0" (payment order is unsettled). In the display example of the window 8300, the delivery destination is the same as in the orderer information. For this reason, "same as the orderer" is displayed in the delivery destination display field. When the delivery destination is different from that of the orderer information, the delivery destination information is displayed in the delivery destination display field.

When the portable terminal user clicks on an "order" button 8302 in step S9308, the flow advances to step S9309. When a return link 8304 is clicked on, transition to the orderer information input window 8100 or delivery destination input window 8200 displayed immediately before occurs. When an order cancel link 8303 is clicked on, the print order processing can be canceled, and the display can be returned to the image browsing window 7400. The images displayed at this time are those displayed immediately before the start of print order processing.

The phase of the estimate display window 8300 is an estimate phase. The ♦ mark in an indicator 8301 displayed at the uppermost portion of the window is located at the third position from the left.

In step S9309, the application server 204 checks whether the images selected by the portable terminal user are present in the image information data table 900 in the DB. If NO in step S9309, an error window is displayed on the portable terminal side (step S9310). After that, the all print order window 7800 is displayed again to prompt the portable terminal user to select images. When all the images are present in the table, the flow advances to step S9311.

It is checked in step S9311 whether the print order request from the portable terminal is a request that has already been received in the past. This processing is necessary for setting the same URL for an order reception window 8400 and order status window 8500 to improve the operability for the portable terminal user, as will be described later. On the basis of the order number contained in the print order request (contained in the URL parameter) sent to the application server 204 when the "order" button 8302 in the estimate display window 8300 on the portable terminal is clicked on, a corresponding record is searched for from the order settlement data table 1200, and the status 1208 in the table is referred to.

When this status represents that payment order is unsettled, it is determined that the print order request has not undergone at least order reception processing, and the flow advances to step S9312. When the status represents any state other than the unsettled payment order, it is determined that the print order request has already undergone the order reception processing. In this case, the order status window 8500 shown in FIG. 68 is displayed in step S9317.

It is checked in step S9312 whether the print order request that has not undergone at least order reception processing is really the print order request for the first time. This processing is necessary for preventing the application server from receiving a print order request a plurality of number of times even when the "order" button 8302 in the estimate display window 8300 is clicked on twice. More specifically, this determination is done by determining whether print order generation processing (to be described later) (step S9313) for the received print order request is being executed. If YES in step S9312, it is determined that the print order request is received for the second or subsequent time. An error window is displayed in step S9318, and the print order processing is ended. If NO in step S9312, it is determined that the print order request is received for the first time, and the flow advances to step S9313.

Figure 67:
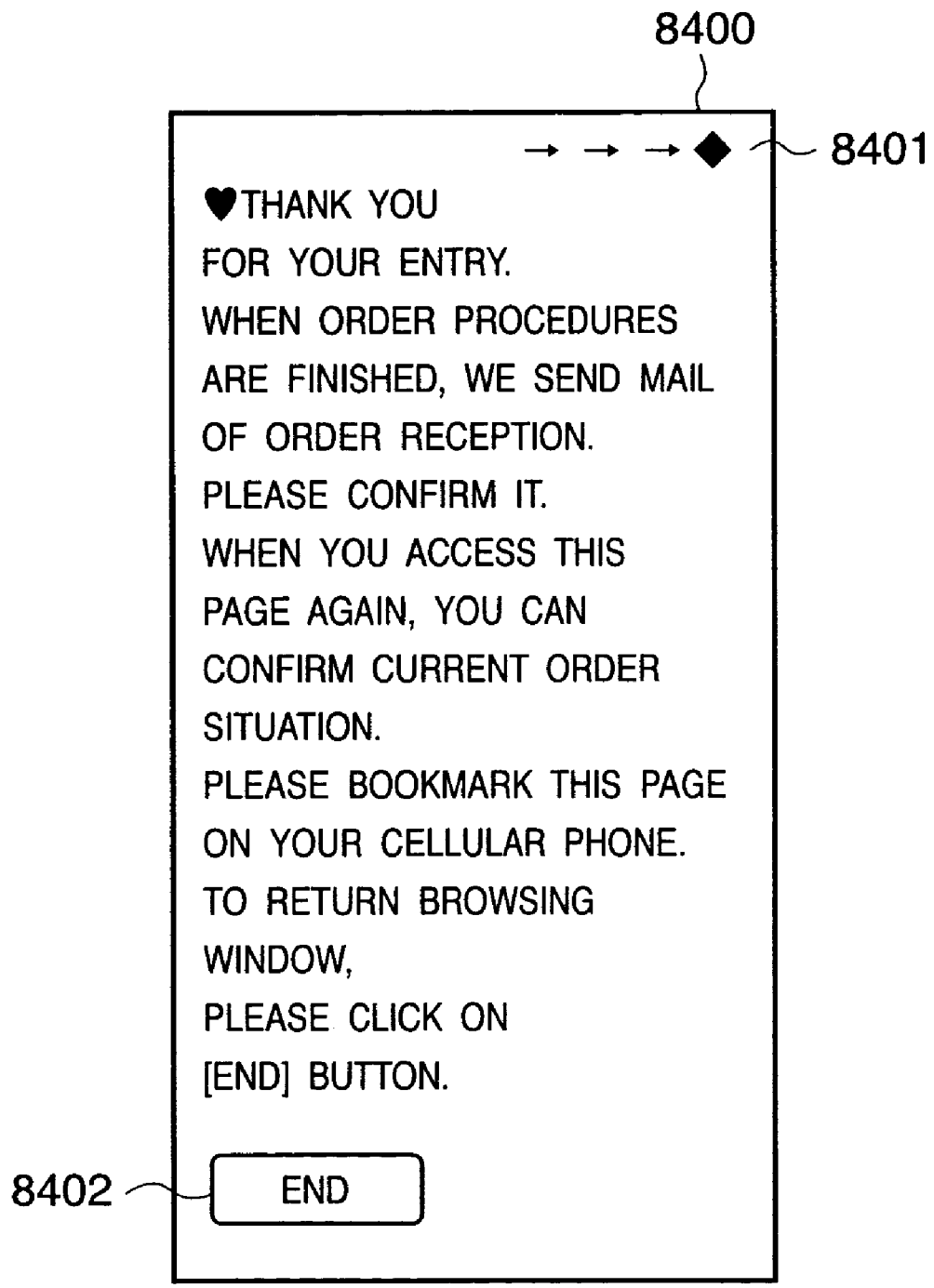
FIG. 67 is a view showing an order reception window in the print order processing from the portable terminal according to the embodiment of the present invention.

In step S9313, the order reception window 8400 shown in FIG. 67 is displayed on the portable terminal side. The user is notified that the print order request is received. This window also indicates that a message should be sent to the portable terminal user in step S9315 (to be described later) to notify him/her that the order reception processing is completed. The window also indicates that when the URL of the order reception window 8400 is stored in the portable terminal and accessed later, the order status window 8500 (to be described later) can be displayed.

This window has an end button 8402. When the portable terminal user clicks on this button, the print order processing can be ended, and the display can be returned to the image browsing window 7400. The images displayed at this time are those displayed immediately before the start of print order processing.

The phase of the order reception window 8400 is an order decision phase. The ♦ mark in an indicator 8401 displayed at the uppermost portion of the window is located at the rightmost position.

The application server 204 displays the order reception window 8400 in step S9313 and executes print order file generation processing in step S9314. For the file generated here, pieces of information such as the image data to be printed in the photo site 105, number of prints, print format, orderer information, delivery destination, and order amount are packaged into one file. If the number of images to be printed is enormous, or the image data size is large, a considerably long time is required for this print order file generation processing.

Subsequently, the application server 204 notifies the settlement site 120 of the use amount in step S9315. The settlement site 120 executes processing for receiving the notified use amount and then notifies the application server 204 of the confirmation number. Upon receiving this notification, the application server 204 changes the status 1208 of a corresponding record in the order settlement data table 1200 to "1" (outstanding order is pending). In step S9316, mail shown in FIG. 58 is sent to the portable terminal user.

The subsequent processing is the same as in steps S4214 to S4221 (FIG. 51) in the above-described print order processing for the PC, and a description thereof will be omitted.

The order status window 8500 displayed in step S9317 is a window that is provided on the side of the application server 204 in order to allow the portable terminal user who has placed the print order to confirm the subsequent processing situation. In this window, the orderer name, use amount, processing status, ordered merchandise information, and the like are displayed. Examples of the processing statuses are "standby for payment", "overdue", "standby for printing" "completion of printing", and "completion of delivery". The status display is changed as needed in synchronism with the state of the status 1014 in the order information data table 1000 or the status 1208 in the order settlement data table 1200.

The portable terminal user can access this window by storing the URL of the above-described order reception window 8400 itself in the portable terminal and using the URL or using the URL of the order status window, which is described in the mail sent to the portable terminal user in step S9316 described above. Independently of the access method used by the user, the above-described processing in step S9311 is executed. As a result, the order status window 8500 is displayed on the portable terminal.

An additional description will be made about a large difference between the processing flow for a print order from a PC and that for a print order from a portable terminal.

For a print order from a PC (FIG. 51), when the user places the print order, a print order file is always generated in step S4210. Subsequently, a number is acquired from the settlement site in step S4211, and the reception window is displayed in step 4213. However, the print order file generation processing or number acquisition processing can be very time consuming depending on the number of images or data size to be processed or the network state between the settlement site and the photo site.

On the other hand, for a print order from a portable terminal, when the user places the print order, the reception window is displayed in step S9313 first. Subsequently, a print order file is generated in step S9314, and a number is acquired from the settlement site in step S9315. In communication with the portable terminal, the timeout time until a response is returned from the photo site to the request from the portable terminal is often set to be relatively short. In consideration of this condition, when a print order is received from the portable terminal, the reception window is immediately returned as a response to the print order request. Then, processing that may take a long time is executed. Accordingly, communication timeout between the portable terminal and the photo site can be prevented as much as possible.

As described above, according to this embodiment, a high-quality service that reduces the service usage load of users can be provided. In addition, information that can be determined as related to the same session is invalidated or deleted every predetermined time. For this reason, in providing the image browsing service, the image data or character data can be managed, and the browsing images can be efficiently sent.

[Other Embodiment]

In this embodiment, an image network service using a digital camera has been exemplified. However, the present invention can also be applied to a service which distributes images and their information.

As described above, the present invention is not limited to an image browsing system and can widely be applied in a portable cellular phone service connected to an external apparatus such as a server through a communication line. The present invention incorporates these scopes.

The object of the present invention can also be achieved by supplying a storage medium (or a recording medium) which stores software program codes for implementing the functions of the above-described embodiment to a system or apparatus and causing the computer (or a CPU or MPU) of the system or apparatus to read out and execute the program codes stored in the storage medium. In this case, the program codes read out from the storage medium implement the functions of the above-described embodiment by themselves, and the storage medium which stores the program codes constitutes the present invention. The functions of the above-described embodiment are implemented not only when the readout program codes are executed by the computer but also when the operating system (OS) running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, it stores program codes including program codes corresponding to the above-described flow charts.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus that stores images and provides a communication terminal with the stored images, the apparatus comprising:
    an issuing unit configured to issue a uniquely defined session ID to the communication terminal which accesses the information processing apparatus in order to browse the stored images;
    a storage unit configured to store the session ID and personal information of a user of the communication terminal to which the session ID is issued by the issuing unit;
    a receiving unit configured to receive, from the communication terminal, a printing request, together with the session ID issued by the issuing unit, to print images stored by the information processing apparatus;
    a determination unit configured to determine whether or not the session ID received with the printing request is stored in the storage unit;
    a transmission unit configured to, in a case where the determination unit determines that the session ID is stored in the storage unit, and determines that the session ID is stored with the personal information of the user, transmit the personal information to the communication terminal in order to request confirmation of the personal information by the user;
    an obtaining unit configured to, in a case where the determination unit determines that the session ID is not stored in the storage unit, obtain personal information of the user of the communication terminal which has sent the printing request, in order to store the personal information with the session ID in the storage unit; and
    a print processing unit configured to print the stored images designated in the printing request after the user confirms the personal information transmitted by the transmission unit, or after storing the personal information in the storage unit obtained by the obtaining unit.

2. The apparatus according to claim 1 further comprising a managing unit configured to manage an effective term of the session ID.

3. The apparatus according to claim 1, wherein the issuing unit sends the session ID to the communication terminal as a part of a URL.

4. A method for an information processing apparatus that stores images and provides a communication terminal with the stored images, comprising:
    an issuing step of issuing a uniquely defined session ID to the communication terminal which accesses the information processing apparatus in order to browse the stored images;
    a storage step of storing, in a storage unit, the session ID and personal information of a user of the communication terminal to which the session ID is issued by the issuing step;
    a receiving step of receiving, from the communication terminal, a printing request, together with the session ID issued by the issuing step, to print images stored by the information processing apparatus;
    a determination step of determining whether or not the session ID received with the printing request is stored in the storage unit by the storage step;
    a transmission step of, in a case where the determination step determines that the session ID is stored in the storage unit, and determines that the session ID is stored with the personal information of the user, transmitting the personal information to the communication terminal in order to request confirmation of the personal information by the user;
    an obtaining step of, in a case where the determination step determines that the session ID is not stored in the storage unit by the storage step, obtaining the personal information of the user of the communication terminal which has sent the printing request, in order to store the personal information with the session ID in the storage unit; and
    a print processing step of performing a process to print the stored images designated in the printing request after the user confirms the personal information transmitted by the transmitting step, or after storing the personal information in the storage unit obtained by the obtaining step.

5. A computer-readable storage medium on which is stored a computer program that implements a method for an information processing apparatus that stores images and provides a communication terminal with the stored images, the method comprising:
    an issuing step of issuing a uniquely defined session ID to the communication terminal which accesses the information processing apparatus in order to browse the stored images;
    a storage step of storing, in a storage unit, the session ID and personal information of a user of the communication terminal to which the session ID is issued by the issuing step;
    a receiving step of receiving, from the communication terminal, a printing request, together with the session ID issued by the issuing step, to print images stored by the information processing apparatus;
    a determination step of determining whether or not the session ID received with the printing request is stored in the storage unit by the storage step;
    a transmission step of, in a case where the determination step determines that the session ID is stored in the storage unit, and determines that the session ID is stored with the personal information of the user, transmitting the personal information to the communication terminal in order to request confirmation of the personal information by the user;
    an obtaining step of, in a case where the determination step determines that the session ID is not stored in the storage unit by the storage step, obtaining the personal information of the user of the communication terminal which has sent the printing request, in order to store the personal information with the session ID in the storage unit; and
    a print processing step of performing a process to print the stored images designated in the printing request after the user confirms the personal information transmitted by the transmitting step, or after storing the personal information in the storage unit obtained by the obtaining step.

* * * * *

UNITED STATES PATENT AND TRADEMARK OFFICE
CERTIFICATE OF CORRECTION

| | |
|---|---|
| PATENT NO. | : 7,284,040 B2 |
| APPLICATION NO. | : 10/660654 |
| DATED | : October 16, 2007 |
| INVENTOR(S) | : Kobayashi et al. |

It is certified that error appears in the above-identified patent and that said Letters Patent is hereby corrected as shown below:

SHEET 26:
FIG. 26, "ANY MORE." should read -- ANYMORE. --.

SHEET 66:
FIG. 66, In Reference Numeral 8300, "ORDERE" should read -- ORDERER --.

COLUMN 3:
Line 65, "conformation" should read -- confirmation --.

COLUMN 7:
Line 36, "executes" should read -- execute --.

COLUMN 10:
Line 31, "any time" should read -- anytime --.

COLUMN 14:
Line 62, "akey." should read -- a key. --.

COLUMN 16:
Line 63, "embodiments," should read -- embodiment, --.

COLUMN 17:
Line 59, "not" should read -- nor --.

COLUMN 18:
Line 45, "1900;" should read -- 1900, --; and
Line 45, "are" should read -- is --.

COLUMN 19:
Line 15, "900" should read -- 90° --.

COLUMN 21:
Line 10, "are displayed" should be deleted.

COLUMN 28:
Line 27, "undergo" should read -- undergone --.

UNITED STATES PATENT AND TRADEMARK OFFICE
CERTIFICATE OF CORRECTION

PATENT NO. : 7,284,040 B2
APPLICATION NO. : 10/660654
DATED : October 16, 2007
INVENTOR(S) : Kobayashi et al.

It is certified that error appears in the above-identified patent and that said Letters Patent is hereby corrected as shown below:

COLUMN 29:
Line 21, "undergo" should read -- undergone --; and
Line 47, "undergo" should read -- undergone --.

COLUMN 30:
Line 1, "undergo" should read -- undergone --.

COLUMN 32:
Line 24, "access" should read -- accessed --; and
Line 25, "determined" should read -- determined. --.

COLUMN 36:
Line 25, "show" should read -- shown --.

COLUMN 39:
Line 21, "piece" should read -- pieces --.

COLUMN 40:
Line 10, "8200 displayed immediately before" should read -- 8200 is displayed immediately before it --.

COLUMN 42:
Line 3, "4213." should read -- S4213. --.

Signed and Sealed this

Twenty-fourth Day of June, 2008

JON W. DUDAS
*Director of the United States Patent and Trademark Office*